US009924139B2

(12) United States Patent
Olsson et al.

(10) Patent No.: US 9,924,139 B2
(45) Date of Patent: Mar. 20, 2018

(54) PORTABLE PIPE INSPECTION SYSTEMS AND APPARATUS

(71) Applicants: Mark S. Olsson, La Jolla, CA (US); James F. Kleyn, Santee, CA (US); Michael E. Turgeon, San Diego, CA (US)

(72) Inventors: Mark S. Olsson, La Jolla, CA (US); James F. Kleyn, Santee, CA (US); Michael E. Turgeon, San Diego, CA (US)

(73) Assignee: SEESCAN, INC., San Diego, CA (US)

(*) Notice: Subject to any disclaimer, the term of this patent is extended or adjusted under 35 U.S.C. 154(b) by 104 days.

(21) Appl. No.: 14/961,754

(22) Filed: Dec. 7, 2015

(65) Prior Publication Data

US 2017/0163940 A1 Jun. 8, 2017

Related U.S. Application Data

(63) Continuation of application No. 13/676,018, filed on Nov. 13, 2012, now Pat. No. 9,222,809.

(60) Provisional application No. 61/559,107, filed on Nov. 13, 2011.

(51) Int. Cl.
*G01D 11/30* (2006.01)
*H04N 7/18* (2006.01)
*H04N 5/225* (2006.01)

(52) U.S. Cl.
CPC ............ *H04N 7/183* (2013.01); *G01D 11/30* (2013.01); *H04N 5/2253* (2013.01); *H04N 2005/2255* (2013.01)

(58) Field of Classification Search
CPC ........... G01D 11/30; H04N 2005/2255; H04N 5/2253; H04N 7/183
USPC .......................................................... 348/84
See application file for complete search history.

(56) References Cited

U.S. PATENT DOCUMENTS

| 3,832,724 | A | 8/1974 | Duval |
| 5,195,392 | A | 3/1993 | Moore et al. |
| 6,958,767 | B2 | 10/2005 | Olsson et al. |
| 7,143,659 | B2 | 12/2006 | Stout et al. |
| 9,222,809 | B1* | 12/2015 | Olsson ................... B65H 75/00 |
| 9,448,376 | B2* | 9/2016 | Chapman ............... H01B 11/22 |
| 9,477,147 | B2* | 10/2016 | Chapman ................. F16C 1/10 |
| 9,829,783 | B1* | 11/2017 | Chapman ............. G03B 37/005 |
| 2006/0287835 | A1* | 12/2006 | Sheth .................. G01M 5/0025 702/35 |
| 2010/0208056 | A1* | 8/2010 | Olsson ................... H04N 7/185 348/84 |

(Continued)

OTHER PUBLICATIONS

Nassiraei et al, Concept and design of a fully autonomous sewer pipe inspection mobile robot "KANTARO", Apr. 10-14, 2007.*

(Continued)

*Primary Examiner* — Shan E Elahi
(74) *Attorney, Agent, or Firm* — Steven C. Tietsworth, Esq.

(57) ABSTRACT

An intelligent cable storage drum system for use in a pipe inspection system may include a cable storage drum, a video push-cable disposed on the cable storage drum having a proximal end and a distal end for coupling to a camera, and a transceiver module operatively coupled to an output at the distal end of the camera for providing camera output signals to the transceiver module.

20 Claims, 35 Drawing Sheets

(56) References Cited

U.S. PATENT DOCUMENTS

| | | | | |
|---|---|---|---|---|
| 2014/0073238 A1* | 3/2014 | Henn | .................... | G06T 1/0007 |
| | | | | 455/7 |
| 2014/0147086 A1* | 5/2014 | Chapman | ............... | H01B 11/22 |
| | | | | 385/101 |
| 2014/0167766 A1* | 6/2014 | Olsson | ................... | G01V 3/165 |
| | | | | 324/329 |
| 2014/0176696 A1* | 6/2014 | Chapman | ............. | H04N 5/2251 |
| | | | | 348/84 |
| 2014/0204197 A1* | 7/2014 | Olsson | ................ | G03B 37/005 |
| | | | | 348/84 |
| 2014/0210989 A1* | 7/2014 | Olsson | ................... | H04N 5/232 |
| | | | | 348/84 |
| 2014/0320133 A1* | 10/2014 | Olsson | ..................... | G01V 3/10 |
| | | | | 324/329 |
| 2014/0320631 A1* | 10/2014 | Olsson | ................ | G01N 21/954 |
| | | | | 348/84 |
| 2014/0340505 A1* | 11/2014 | Olsson | ............... | G01N 21/8803 |
| | | | | 348/84 |
| 2016/0373619 A1* | 12/2016 | Olsson | ................ | H04N 5/2252 |
| 2017/0024872 A1* | 1/2017 | Olsson | ............... | G02B 23/2484 |

OTHER PUBLICATIONS

Nagashima et al, Measurement of wireless communication characteristics in sewer pipes for sewer inspection systems using multiple wireless sensor nodes, 2015.*

* cited by examiner

Example Video and Lucid Battery System Embodiment

Example Lucid Battery System Embodiment with Non-Intelligent Dock/Shoe and Lucid Battery Control Interface)

Example Lucid Battery System Embodiment with Non-Intelligent (Lucid) Dock/Shoe with Serial Interface Module with I²C, SPI, CAN, Proprietary Single Wire Interface, Etc.

Example Lucid Battery System Embodiment with
Intelligent Dock/Shoe and Lucid Data Out Example Lucid Battery System Embodiment with Intelligent (Lucid) Dock/Shoe with
Serial Interface Module with I²C, SPI, CAN, Proprietary Single Wire Interface, Etc.

PORTABLE PIPE INSPECTION SYSTEMS AND APPARATUS

CROSS-REFERENCE TO RELATED APPLICATIONS

This application is a continuation of and claims priority to co-pending U.S. Utility patent application Ser. No. 13/676,018, filed Nov. 13, 2012, entitled PORTABLE PIPE INSPECTION SYSTEMS AND APPARATUS, which claims priority under 35 U.S.C. § 119(e) to U.S. Provisional Patent Application Ser. No. 61/559,107, filed Nov. 13, 2011, entitled PORTABLE PIPE INSPECTION SYSTEMS AND APPARATUS and U.S. Provisional Patent Application Ser. No. 61/654,713, filed Jun. 1, 2012, entitled SYSTEMS AND METHODS INVOLVING A SMART CABLE STORAGE DRUM AND NETWORK NODE FOR TRANSMISSION OF DATA. The content of each of these applications is incorporated by reference herein in its entirety for all purposes.

FIELD

This disclosure relates generally to mobile pipe inspection systems and related accessories and apparatus. More specifically, but not exclusively, this disclosure relates to a portable pipe inspection system for examining pipes, conduits, and other cavities, the system including an outer housing, cable storage drum assembly, a wheel assembly, and a pull-handle to facilitate transportation, usage, and storage of the system. The system may further include other elements such as a video camera, an electrically, wirelessly, and/or optically-connected transceiver and/or a Lucid battery and battery shoe. The inspection system may further include a wired or wireless network device such as a base station or hub, which may be disposed in the cable storage drum assembly or elsewhere in the portable pipe inspection system.

BACKGROUND

Pipe inspection systems are frequently employed for determining the presence and location of obstructions in pipes, sewers, conduits, and the like. Existing pipe inspection systems may include a reel or drum used for sending a camera head coupled to a push-cable along the length of a pipe, and for rewinding the push-cable for stowage.

Diagnosis of complex problems often requires multiple inspections from different access points; thus it is often necessary to transport the pipe inspection system between such access points. When the inspection has concluded, it is frequently desirable to quickly transport the pipe inspection system to a service vehicle or another location. Thus, there are situations where it is advantageous to provide a user with a pipe inspection system with improved portability and compact stowage.

Accordingly, there is a need in the art to address the above-described as well as other problems.

SUMMARY

This disclosure relates generally to mobile pipe inspection systems and related accessories and apparatus. More specifically, but not exclusively, this disclosure relates to a portable pipe inspection system for examining pipes, conduits, and other cavities, the system including an outer housing, cable storage drum assembly, a wheel assembly, and a pull-handle to facilitate transportation, usage, and storage of the system. The system may further include other elements such as a video camera, an electrically, wirelessly, and/or optically-connected transceiver and/or a Lucid battery and battery shoe. The inspection system may further include a wired or wireless network device such as a base station or hub, which may be disposed in the cable storage drum assembly or elsewhere in the portable pipe inspection system.

For example, in one aspect, the disclosure relates to a portable pipe inspection system. The pipe inspection system may include, for example, a detachable pull-handle, an outer housing assembly including a plurality of vents, the outer housing assembly configured to contain a removable cable storage drum assembly, a handle accessory mount for removably attaching the pull-handle to the outer housing assembly, a handle stowage assembly coupled to the outer housing assembly, a cable storage drum including a hub, and a wheel assembly including an axle, an axle cap, and a plurality of wheels, wherein the wheel assembly is configured to be removably attached to the outer housing assembly using the axle cap.

In another aspect, the disclosure relates to a detachable wheel assembly for use on a portable pipe inspection system. The wheel assembly may include, for example, an axle, a pair of wheels coupled to the axle, one or more axle caps disposed around the axle, one or more retaining plates, and attachment hardware to couple the axle caps and retaining plates through an outer housing assembly of the pipe inspection system. The wheel assembly may be coupled through vents in the outer housing assembly.

In another aspect, the disclosure relates to a pull-handle assembly for use on a portable pipe inspection system. The pull-handle assembly may include, for example, a detachable pull-handle and a handle accessory mount for removably attaching the pull-handle to an outer housing assembly of the pipe inspection system. The handle accessory mount may be configured to be attached to a retaining plate through one or more vents in an outer housing of the pipe inspection system. The pull-handle assembly may further include a handle stowage assembly configured to be coupled to an outer housing of the pipe inspection system. The handle stowage assembly may be configured to be attached to a retaining plate through one or more vents in the outer housing.

In another aspect, the disclosure relates to a smart cable storage drum. The smart cable storage drum may include a push-cable, an inspection camera coupled to the push cable and configured to capture video, and a network transceiver configured to send and receive information from the inspection camera to and from one or more remote computing devices using a network. The network transceiver may be local area network transceiver, and the network may be a local area network. The local area network may be a wired network. The local area network may be a wireless network. The local area network may be a WiFi (802.11) network or an Ethernet network. The network may be a wide area network. The wide area network may be a cellular or other wide area network, such as a WiMax network. The storage drum may further include a processing element and a memory device for storing data and video information. The local area network transceiver may be configured to send and receive information to and from one or more remote computing devices using a Bluetooth connection.

In another aspect, the disclosure relates to a computer-implemented method for controlling an inspection device using a first remote computing device. The computer-implemented method may include, for example, receiving first inspection data from a first cable storage drum or a first inspection device, displaying at least some of the first inspection data via a web browser or other software application, and receiving at least a first input from a user of the remote computing device.

In another aspect, the disclosure relates to an apparatus for viewing information from or controlling an inspection device. The apparatus may include, for example, a display configured to present a user interface, wherein the user interface is configured to receive input from a user that causes a change in an operation of the inspection device and a processing element in communication with the inspection device over a network. The processing element may be configured to cause the display to present inspection data received from the inspection device in the user interface on the display and cause an instruction based on the input from the user to be sent to the inspection device.

In another aspect, the disclosure relates to a computer program product comprising a non-transitory computer-readable medium having a computer readable program code embodied therein. The computer readable program code may be adapted to implement a method for viewing information from or controlling an inspection device, the method including receiving inspection data from a cable storage drum or an inspection device, displaying at least some of the inspection data on a user interface provided by a web browser or other software application, and receiving a plurality of inputs from a user of the remote computing device, wherein a first input modifies the inspection data, a second input creates data associated with the inspection data, and a third input causes a change in an operation of the inspection device.

Various additional aspects, details, features, and functions are described below in conjunction with the appended Drawing figures.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1:
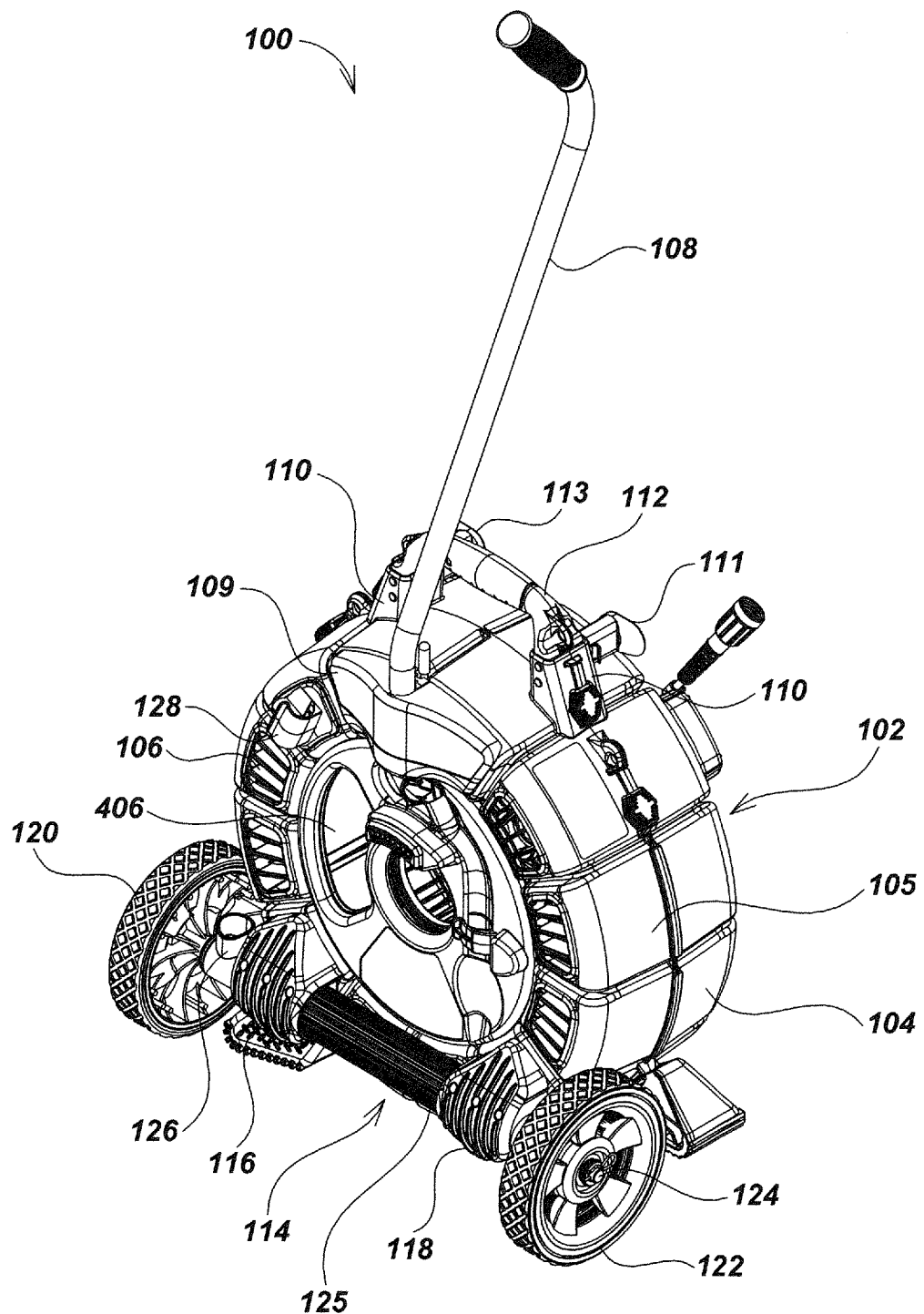
FIG. 1 is a front perspective view of an embodiment of a wheeled pipe inspection system.

This disclosure relates generally to mobile pipe inspection systems and related accessories and apparatus. More specifically, but not exclusively, this disclosure relates to a portable pipe inspection system for examining pipes, conduits, and other cavities, the system including an outer housing, cable storage drum assembly, a wheel assembly, and a pull-handle to facilitate transportation, usage, and storage of the system. The system may further include other elements such as a video camera, an electrically, wirelessly, and/or optically-connected transceiver and/or a Lucid battery and battery shoe. The inspection system may further include a wired or wireless network device such as a base station or hub, which may be disposed in the cable storage drum assembly or elsewhere in the portable pipe inspection system.

Various aspects and details of elements which may be used in embodiments of the present invention in conjunction with the disclosure herein are described in co-assigned patent applications, including U.S. patent application Ser. No. 13/534,721, entitled MODULAR BATTERY PACK APPARATUS, SYSTEMS, AND METHODS, filed Jun. 25, 2012, U.S. Patent Application Ser. No. 61/663,617, entitled MODULAR BATTERY PACK APPARATUS, SYSTEMS, AND METHODS, INCLUDING VIRAL DATA AND/OR CODE TRANSFER, filed Jun. 25, 2012, U.S. patent application Ser. No. 13/214,208, entitled ASYMMETRIC DRAG FORCE BEARINGS FOR USE WITH PUSH-CABLE STORAGE DRUMS, filed Aug. 21, 2011, U.S. patent application Ser. No. 12/704,808, entitled PIPE INSPECTION SYSTEM WITH REPLACEABLE CABLE STORAGE DRUM, filed Feb. 12, 2010, U.S. patent application Ser. No. 12/399,859, entitled PIPE INSPECTION SYSTEM WITH REPLACEABLE CABLE STORAGE DRUM, filed Mar. 6, 2009, U.S. patent application Ser. No. 12/371,540, entitled PUSH-CABLE FOR PIPE INSPECTION SYSTEM, filed Feb. 13, 2009, and U.S. Provisional Patent Application Ser. No. 61/152,662, entitled HIGH PERFORMANCE PIPE INSPECTION SYSTEM, filed Feb. 13, 2009. The content of each of these applications is incorporated by reference herein in its entirety. The applications may be referenced herein as the "Incorporated Applications" for brevity.

In one aspect, the disclosure relates to a portable pipe inspection system. The pipe inspection system may include, for example, a detachable pull-handle, an outer housing assembly including a plurality of vents, the outer housing assembly configured to contain a removable cable storage drum assembly, a handle accessory mount for removably attaching the pull-handle to the outer housing assembly, a handle stowage assembly coupled to the outer housing assembly, a cable storage drum including a hub, and a wheel assembly including an axle, an axle cap, and a plurality of wheels, wherein the wheel assembly is configured to be removably attached to the outer housing assembly using the axle cap.

The handle accessory mount may, for example, be coupled to the outer housing using attachment hardware including one or more connectors passing through the vents. The one or more connectors may be screws or bolts. The wheel assembly may be coupled to the outer housing assembly using one or more connectors that pass through the vents. The one or more connectors may be screws or bolts. The pull-handle may be attached to a front side of the outer housing assembly. The pull-handle may be attached to a back side of the outer housing assembly. The wheel assembly may be attached to a front side of the outer housing assembly. The wheel assembly may be attached to a back side of the outer housing assembly.

The wheel assembly may, for example, include a rubber grommet configured to provide shock isolation to the axle. The detachable pull-handle may include a mounting alignment mechanism. The mounting alignment mechanism may include an alignment pin configured to engage a formed groove of the handle accessory mount. The detachable pull-handle may include a hole configured to engage a lower pin of the handle accessory mount. The handle accessory mount may include a seating mechanism for fixing the pull-handle. The seating mechanism may include a formed groove for receiving an alignment pin of the pull-handle. The seating mechanism may include a molded insert. The seating mechanism may include a spring-loaded toggle and a lower pin coupled to the toggle.

The handle stowage assembly may include, for example, a stowage cup for receiving the detachable pull-handle. The handle stowage assembly may include a clip for securing the detachable pull-handle to the outer housing assembly. The stowage cup may be disposed on the wheel assembly.

The wheel assembly may further include one or more retaining plates and attachment hardware to couple the axle caps and retaining plates through the outer housing assembly. The wheels may be coupled to the axle, and the one or more axle caps may be disposed around the axle. The attachment hardware may couple the axle caps and retaining plates through one or more vents in the outer housing assembly. The attachment hardware may include a plurality of screws. The attachment hardware may include plurality of bolts and a corresponding plurality of nuts.

The handle stowage assembly may, for example, be coupled to the outer housing assembly through one or more vents of the housing assembly. The wheel assembly may be coupled to the outer housing assembly through one or more vents of the housing assembly. The pull-handle may be in a substantially circular or oval shape. The pull-handle may be in a substantially rectangular shape.

The portable pipe inspection system may further include, for example, one or more wireless network transceivers or other wireless base stations or hubs, which may be disposed in the cable storage drum or elsewhere in the portable pipe inspection system, such as in the housing. In an exemplary embodiment the wireless network transceiver may be disposed in the hub of the cable storage drum or elsewhere in the cable storage drum. The wireless network transceiver may be a WiFi (802.11) transceiver or other wireless local area network transceiver. The wireless network transceiver may be a cellular or other wide area network wireless transceiver. The wireless network transceiver may be a Bluetooth or other short range wireless network transceiver. The wireless network transceiver may send battery data to a separate electronic computing device. The electronic computing device may be a notebook or tablet computer. The electronic computing device may be a personal digital assistant (PDA) or cellular or smart phone device.

The portable pipe inspection system may further include an intelligent battery shoe. The intelligent battery shoe may be a Lucid battery shoe. The intelligent battery shoe may be configured to provide viral data transfer to or from a coupled intelligent battery. The coupled intelligent battery may be a Lucid battery or other intelligent battery. The intelligent battery shoe may include an electrical or optical connection to the wireless network transceiver. The electrical or optical connection may be used to provide data from a coupled battery to the wireless network transceiver. The data may alternately be provided to the wireless network transceiver via a wireless connection from the intelligent battery or battery shoe. The system may further include an intelligent battery coupled to the battery shoe. Data from the intelligent battery may be communicated to the wireless network transceiver through the battery shoe. The electrical connection may includes a slip-ring connector to provide a slip-ring electrical connection to the hub or other areas of the cable storage drum.

In another aspect, the disclosure relates to a detachable wheel assembly for use on a portable pipe inspection system. The wheel assembly may include, for example, an axle, a pair of wheels coupled to the axle, one or more axle caps disposed around the axle, one or more retaining plates, and attachment hardware to couple the axle caps and retaining plates through an outer housing assembly of the pipe inspection system. The wheel assembly may be coupled through vents in the outer housing assembly.

In another aspect, the disclosure relates to a pull-handle assembly for use on a portable pipe inspection system. The pull-handle assembly may include, for example, a detachable pull-handle and a handle accessory mount for removably attaching the pull-handle to an outer housing assembly of the pipe inspection system. The handle accessory mount may be configured to be attached to a retaining plate through one or more vents in an outer housing of the pipe inspection system. The pull-handle assembly may further include a handle stowage assembly configured to be coupled to an outer housing of the pipe inspection system. The handle stowage assembly may be configured to be attached to a retaining plate through one or more vents in the outer housing.

In another aspect, the disclosure relates to a smart cable storage drum. The smart cable storage drum may include a push-cable, an inspection camera coupled to the push cable and configured to capture video, and a network transceiver configured to send and receive information from the inspection camera to and from one or more remote computing devices using a network. The information may include audio or video data or other data or information about the cable storage drum, coupled inspection system, or power supply element such as batteries. The network transceiver may be a local area network transceiver, and the network may be a local area network. The local area network may be a wired network. The local area network may be a wireless network. The local area network may be a WiFi (802.11) network or an Ethernet network or other local area network. The network may be a wide area network. The wide area network may be a cellular or other wide area network, such as a WiMax network. The storage drum may further include a processing element and a memory device for storing data and video information. The local area network transceiver may be configured to send and receive information to and from one or more remote computing devices using a Bluetooth connection.

In some embodiments, at least some of the information sent to the one or more remote computing devices may, for example, be used by a web browser or an installable software application to display the captured video on the one or more remote computing devices. At least some of the information sent to the one or more remote computing devices may be used by a web browser or an installable software application to display a user interface for controlling the inspection camera at the one or more remote computing devices. At least some of the information received from the one or more remote computing devices may be used to change at least one operation of the inspection camera. A pipe inspection record and corresponding captured audio, video and/or battery data, system, or other information may be stored on a memory of the smart cable storage drum.

In another aspect, the disclosure relates to a computer-implemented method for controlling an inspection device using a first remote computing device. The computer-implemented method may include, for example, receiving first inspection data from a first cable storage drum or a first inspection device, displaying at least some of the first inspection data via a web browser or other software application, and receiving at least a first input from a user of the remote computing device.

The first inspection data may be received via a wireless local area network hosted by the first cable storage drum or the first inspection device. The method may further include creating, based on the first input, an instruction configured to control one or more operations of the first inspection device, and sending the instruction to the first cable storage drum or the first inspection device. The first input may include one or more edits to the first inspection data. The first input may include additional data related to the first inspection data.

The computer-implemented method may further include, for example, sending the first input to a second remote computing device. The method may further include receiving data related to a second input from a second user of a second remote computing device, and displaying the data related to the second input. The method may further include receiving second inspection data from a second cable storage drum or a second inspection device, and displaying at least some of the second inspection data via the web browser or other software application. The second inspection data and the first inspection data may be simultaneously displayed. The method may further include receiving data from a backend database, comparing the data from the backend database with the first inspection data, and displaying, based on the comparison, at least some of the data from the backend database simultaneously with the first inspection data via the web browser or other software application. The first inspection data may be received via a wireless network hosted by the first remote computing device. The first inspection data may be received via the Internet.

In another aspect, the disclosure relates to an apparatus for viewing information from or controlling an inspection device. The apparatus may include, for example, a display configured to present a user interface, wherein the user interface is configured to receive input from a user that causes a change in an operation of the inspection device and a processing element in communication with the inspection device over a network. The processing element may be configured to cause the display to present inspection data received from the inspection device in the user interface on the display, and cause an instruction based on the input from the user to be sent to the inspection device.

In another aspect, the disclosure relates to a computer program product comprising a non-transitory computer-readable medium having a computer readable program code embodied therein. The computer readable program code may be adapted to implement a method for viewing information from or controlling an inspection device, the method including receiving inspection data from a cable storage drum or an inspection device, displaying at least some of the inspection data on a user interface provided by a web browser or other software application, and receiving a plurality of inputs from a user of the remote computing device, wherein a first input modifies the inspection data, a second input creates data associated with the inspection data, and a third input causes a change in an operation of the inspection device.

Various additional aspects, details, features, and functions are described below in conjunction with the appended Drawing figures.

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

Referring to FIG. 1, an embodiment of a pipe inspection system 100 in accordance with aspects of the present disclosure is shown. Pipe inspection system 100 may include an outer housing assembly, such as the outer clamshell housing assembly 102 as shown, or a housing of a similar or equivalent configuration for providing an enclosure for a cable storage drum (not shown in FIG. 1), which may be configured to store a push-cable for deployment in, or retrieval from, a pipe or other object or cavity. In addition, pipe inspection system 100 may include one or more vents and one or more access ports in the housing assembly, a detachable wheel assembly, feet or pedestal elements, and/or a detachable handle assembly, such as further described below.

Various elements of pipe inspection system 100 may be constructed in accordance with details of pipe inspection system and apparatus embodiments described in, for example, U.S. patent application Ser. No. 13/532,721, filed Jun. 25, 2012, entitled MODULAR BATTERY PACK APPARATUS, SYSTEMS, AND METHODS, U.S. Patent Application Ser. No. 61/663,617, filed Jun. 25, 2012, entitled MODULAR BATTERY PACK APPARATUS, SYSTEMS, AND METHODS, INCLUDING VIRAL DATA AND/OR CODE TRANSFER, which includes various details of embodiments of intelligent or "Lucid" batteries and battery coupling systems, and battery control and monitoring systems, as well as "viral" data transfer mechanisms as may be used in a system such as system 100, U.S. patent application Ser. No. 13/214,208, filed Aug. 21, 2011, entitled ASYMMETRIC DRAG FORCE BEARINGS FOR USE WITH PUSH-CABLE STORAGE DRUMS, which includes details of embodiments of bearings and related components that may be used in a system such as system 100, U.S. patent application Ser. No. 12/704,808, filed Feb. 12, 2010, entitled PIPE INSPECTION SYSTEM WITH REPLACEABLE CABLE STORAGE DRUM, which includes details of embodiments of storage drums, housings, and related components that may be used in a system such as system 100, U.S. patent application Ser. No. 12/399,859, filed Mar. 6, 2009, entitled PIPE INSPECTION SYSTEM WITH REPLACEABLE CABLE STORAGE DRUM, which includes details of embodiments of storage drums, housings, and related components that may be used in a system such as system 100, U.S. patent application Ser. No. 12/371,540, filed Feb. 13, 2009, entitled PUSH-CABLE FOR PIPE INSPECTION SYSTEM, which includes details of embodiments of push-cables, storage drums for the push-cables, housings, and related components that may be used in a system such as system 100, and U.S. Provisional Patent Application Ser. No. 61/152,662, filed Feb. 13, 2009, entitled HIGH PERFORMANCE PIPE INSPECTION SYSTEM, that includes various details of embodiments of components that may be used in a system such as system 100. Each of these applications are incorporated by reference in their entirety herein. Various embodiments of the present invention may be implemented with elements that are the same as or similar to the embodiment details disclosed in these applications, with additional wheel assemblies, housings, pull-handles, batteries and battery shoes, wireless transmitter and receivers, such as WiFi (802.11), Bluetooth, cellular, or other wireless devices, GPS or other location or positioning devices, and/or other features as are described subsequently herein.

Still referring to FIG. 1, outer clamshell housing 102 may include a front clamshell housing element 105 and a rear clamshell housing element 104, which may be mated or coupled to enclose a cable storage drum (not shown in FIG. 1) for storing a push-cable, which may be coupled to other components such as a camera element, pipe clearing elements, such as cutting tools or jetting tools, and/or other components configured to be deployed on a push-cable. The cable storage drum may include a hub (not shown in FIG. 1), which may further include electronics and/or related components, such as a wireless transceiver, one or more processing elements, video and/or data processing circuits, and other components. The electronics and/or related components may also be disposed in other areas of the cable storage drum in some embodiments, or elsewhere in the portable inspection system, such as in the housing. The hub may be coupled to cabling of the portable inspection system using a slip-ring or other electrical, optical, or wireless connection.

The housing elements may be coupled by a hinge mechanism, pins, latches, clamps, adhesives, and/or other attachment mechanisms. In some embodiments, one or more alternate housing assembly configurations may be used, such as housing assemblies including additional housing elements (beyond those shown) and/or alternate element connection mechanisms.

One or more apertures or vents, such as vents 106, may be disposed in the outer housing assembly, such as on one or both of the front clamshell housing element 105 and rear clamshell housing element 104, and may be used for draining fluids to allow ventilation for drying, etc., from the interior volume of clamshell housing 102, and/or for mounting various accessories such as clips, assemblies, and the like. In an exemplary embodiment, a wheel assembly and/or a pull-handle assembly may be mounted to a housing such as housing 102 through vents such as vents 106. In some embodiments, other accessories, such as, for example, batteries, power cables, push-cable deployment or recovery mechanisms such as powered deployment and/or retractor mechanisms, display or monitor mounts and/or displays or monitors, computer components, and/or other components or accessories may be similarly mounted to a housing such as housing 102 through vents such as vents 106. As described subsequently herein, mounting mechanisms may include brackets and other components that may be positioned on opposite sides of the housing and may be coupled by a bolt, screw, or other attachment mechanism passing through the housing via the vents.

A detachably removable pull-handle, such as pull-handle 108, may be used for moving, positioning, raising or lowering, and/or otherwise manipulating the pipe inspection system during transport and use. Pull-handle 108 may be removably mounted for use, such as by being secured in a seating mechanism in handle accessory mount 109, where it may be fixed in place during use and readily removable for stowing. Although pull-handle embodiment 108 is shown as a single handle tubular pull-handle, in other embodiments alternate pull-handle shapes may be used, such as, for example, a looped pull-handle which may be in a circular or oval-like shape or a rectangular-shape, and may be connected to system 100 at two or more points.

Housing 102 may include a front side, corresponding to a side where a push-cable and accessories such as a camera are deployed, and a back or rear side, corresponding to a side opposite the front side. While the pull-handle 108 is shown on the front side of housing 102 in the illustrated embodiment, in other embodiments, the pull-handle may be mounted on the back side or on other sides or positions of the pipe inspection system 100.

In embodiments of pull-handles configured in circular, oval, or rectangular shapes, the pull-handle may be configured to be foldable onto both the front and back sides of the housing to allow different positioning depending on a particular inspection operation. In addition, in some embodiments, a pull-handle may be configured to be partially folded to provide a tripod-like support in addition to support provided by wheels or feet/pedestals of the system. In this way, the pipe inspection system may be angled to the ground to allow easier control, cable deployment or retraction, and/or display viewing in embodiments using a display or monitor device.

Likewise, while the wheel assembly 114 is shown mounted to the front side of housing 102 in the exemplary embodiment shown in FIG. 1, in other embodiments, wheel assemblies may be mounted to the back side or to other positions on the outer housing.

In a stowage configuration, pull-handle 108 may be secured using a stowage assembly. For example, the stowage assembly may include a fastener or clip, such as handle stowage clip 128, which may be disposed on or in the housing, such as on the front clamshell housing element 105 as shown. Alternately, or in addition, the stowage assembly may include a handle stowage cup 126, which may be disposed on the axle 124 or on other elements of pipe inspection system 100. For example, as show in FIG. 3, pull-handle 108 may be stowed in stowage cup 126 and secured using stowage clip 128 in a stowage configuration.

A lifting mechanism, such as lifting handle 112, may be coupled to the clamshell housing 102, such as by using a pair of mount supports 110 or other attachment mechanisms, such as screws, adhesives, and the like. One or more cord wraps, such as a right cord wrap 111 and a left cord wrap 113 as shown, may be disposed on mount supports 110 and/or elsewhere on the outer housing assembly for stowing a system connection cable (not shown in FIG. 1), which may connect the pipe inspection system 100 to a camera control unit, monitor (not shown in FIG. 1), power supply, computing system, or other device or system.

Figure 3:
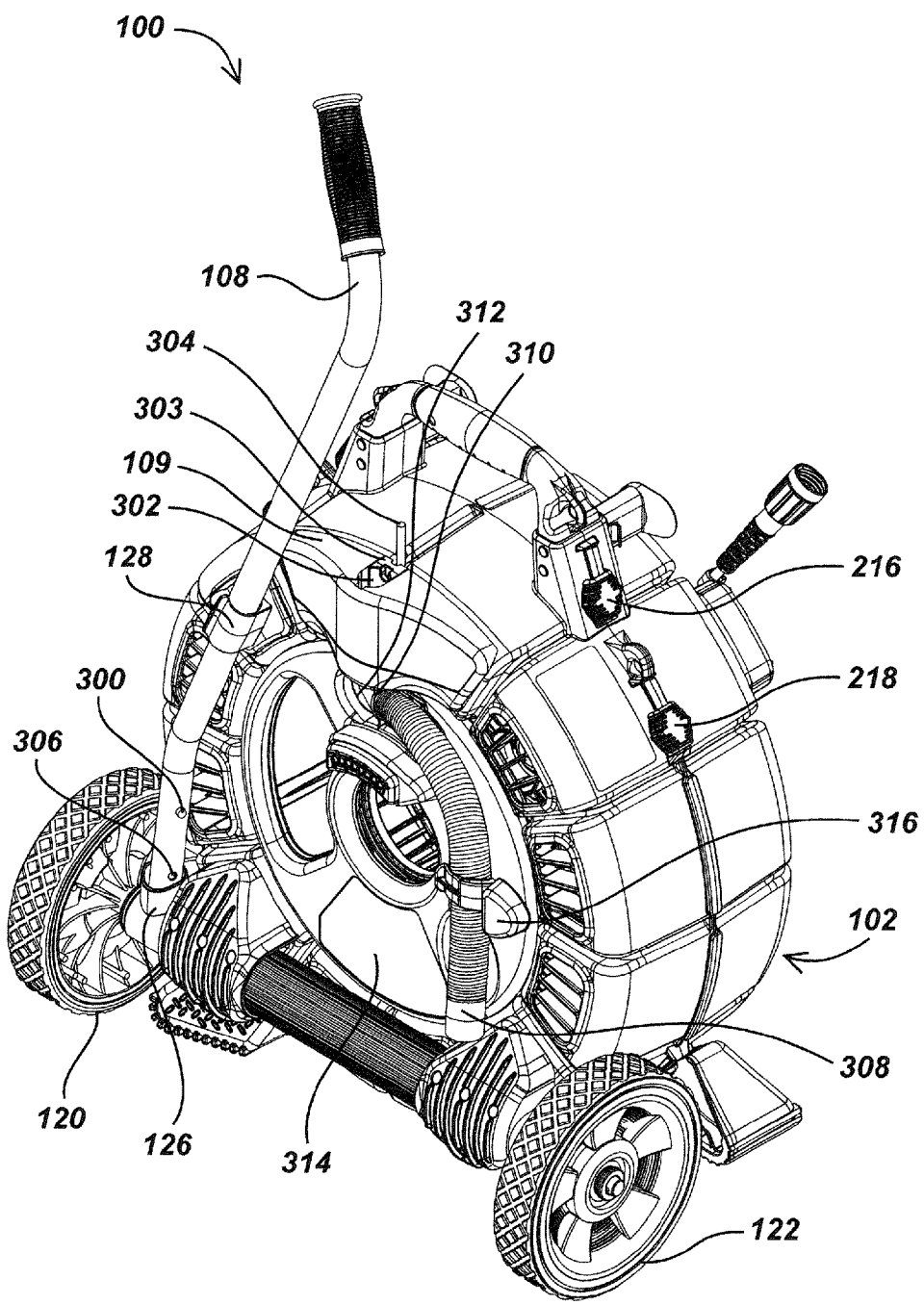
FIG. 3 is an enlarged perspective view of the wheeled pipe inspection system embodiment of FIGS. 1 and 2, illustrating one embodiment of a pull-handle in a stowed configuration.

An access port, such as access port 406, may be included on one or both the front and back sides of an outer housing to allow an operator to access a stored push-cable for deployment and retraction. In addition, accessories such as cameras that are mounted to the push-cable may be accessed for deployment through access port 406, thereby allowing for storage of the camera or other accessory on or internal to the outer housing assembly. In this configuration where the access port 406 is formed on the front of housing 102, a camera may be deployed through a port such as port 310 (as shown in FIG. 3).

Embodiments of pipe inspection systems may include fixed or detachable wheel assemblies. For example, in some embodiments, a fixed wheel assembly may be used, wherein the wheel attachment elements, such as axles, mounting bosses, and the like, are permanently fixed to or molded or formed into the outer housing assembly or to another structure such as a frame.

Figure 8:
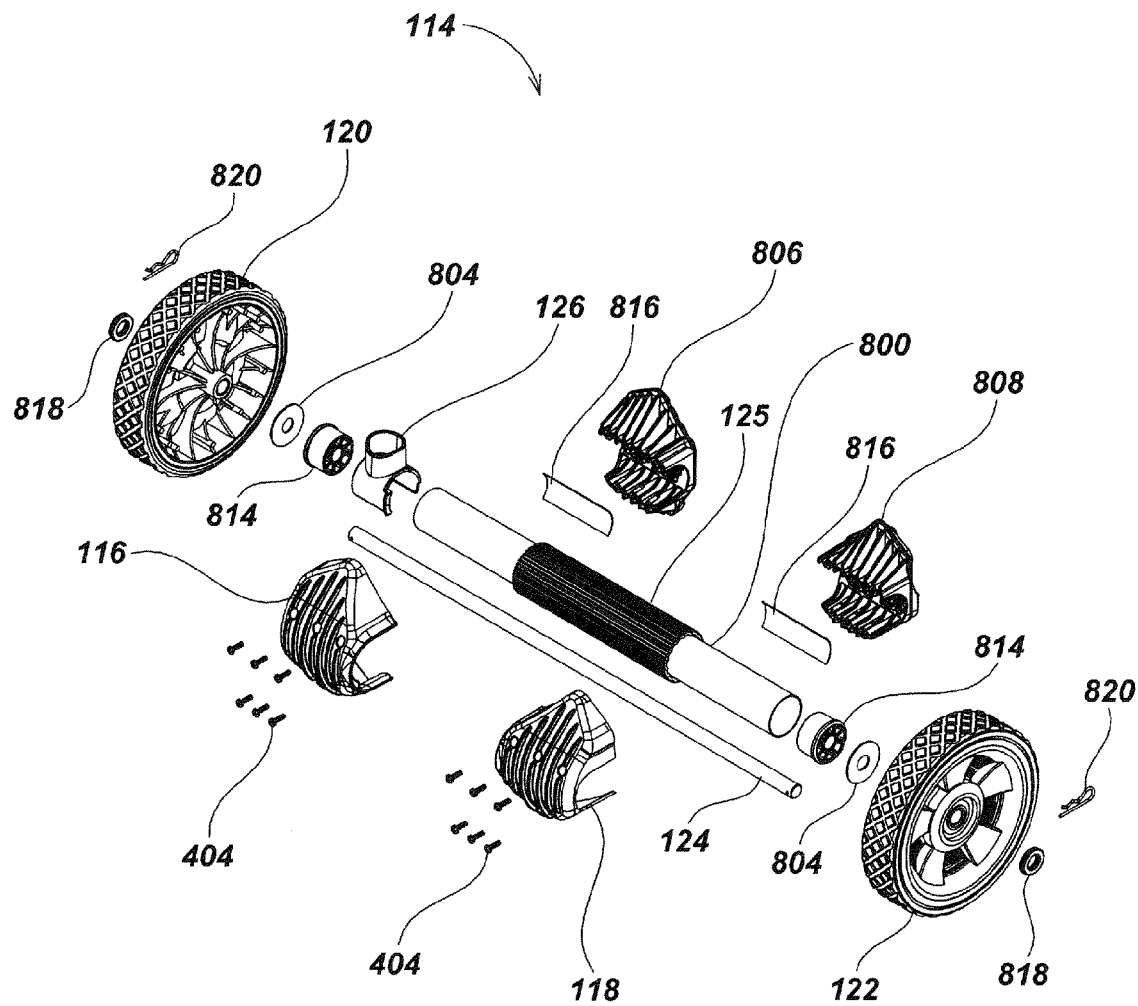
FIG. 8 is an enlarged exploded view of a wheel assembly embodiment, illustrating details thereof.

Alternately, in some embodiments, a detachable wheel assembly may be used to provide for removal of the wheel assembly and/or addition of a wheel assembly to a non-wheeled pipe inspection system (such as, for example, a pipe inspection system lacking wheels and/or a push-/pull-handle). For example, in one embodiment, detachable wheel assembly embodiment 114 (further described subsequently with respect to FIG. 8) may be mounted to the lower portion of the front clamshell housing element 105, using, for example, one or more axle caps, such as a left axle cap 116 and a right axle cap 118. Wheel assembly 114 may include an axle, such as axle 124, to provide support for one or more wheels, such as a left wheel 120 and right wheel 122. The axle 124 may be disposed within an axle tube 800 (as shown in FIG. 8), which may be enclosed by a shield or sleeve, such as axle tube sleeve 125, which may be disposed between the left axle cap 116 and the right axle cap 118, for providing wear and abrasion protection to system 100. The wheel assembly 114 may be mounted using connectors such as screws, bolts, rods, etc., that pass through the housing via vents 106.

Figure 2:
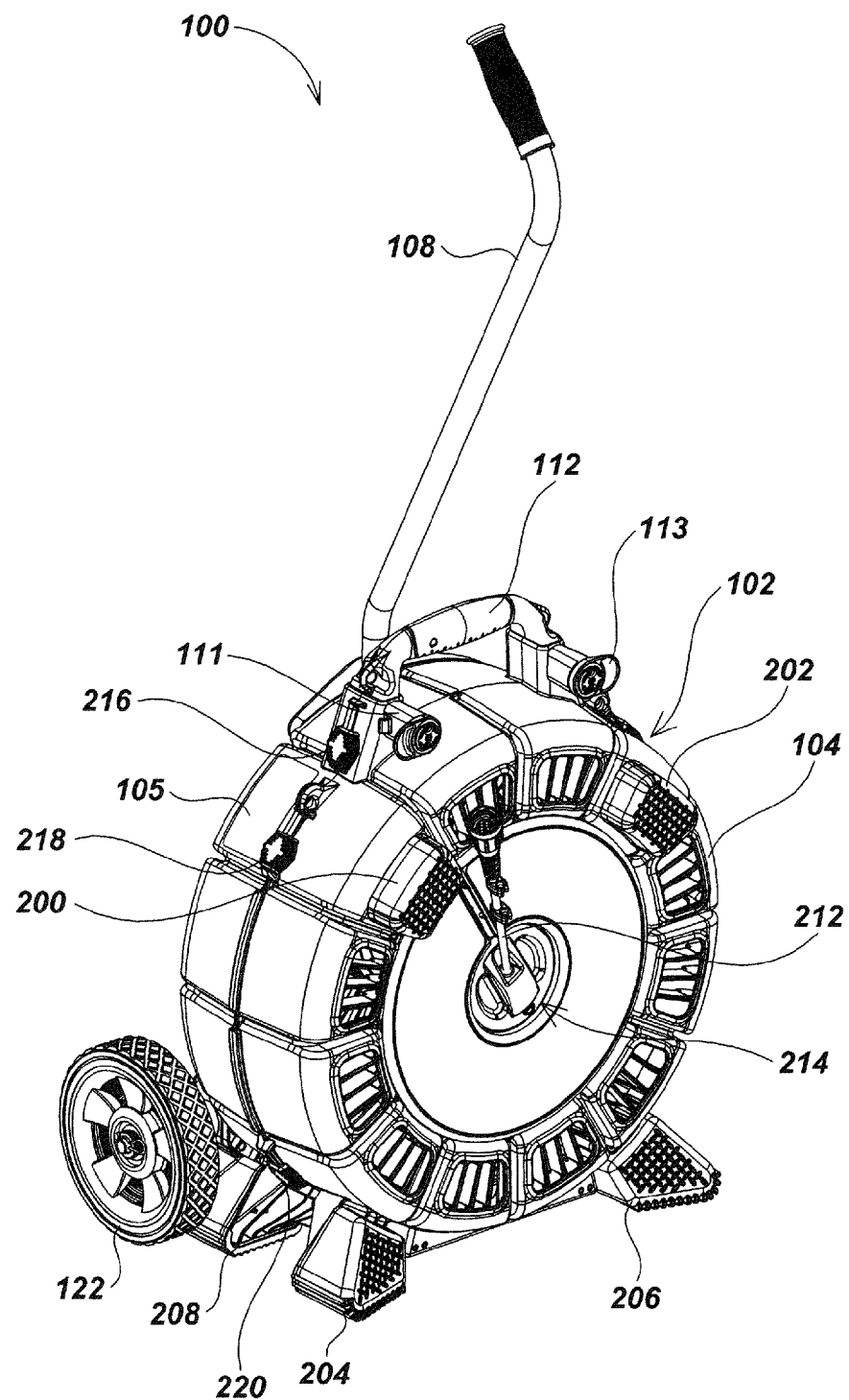
FIG. 2 is a perspective view of the wheeled pipe inspection system embodiment of FIG. 1.
Figure 4:
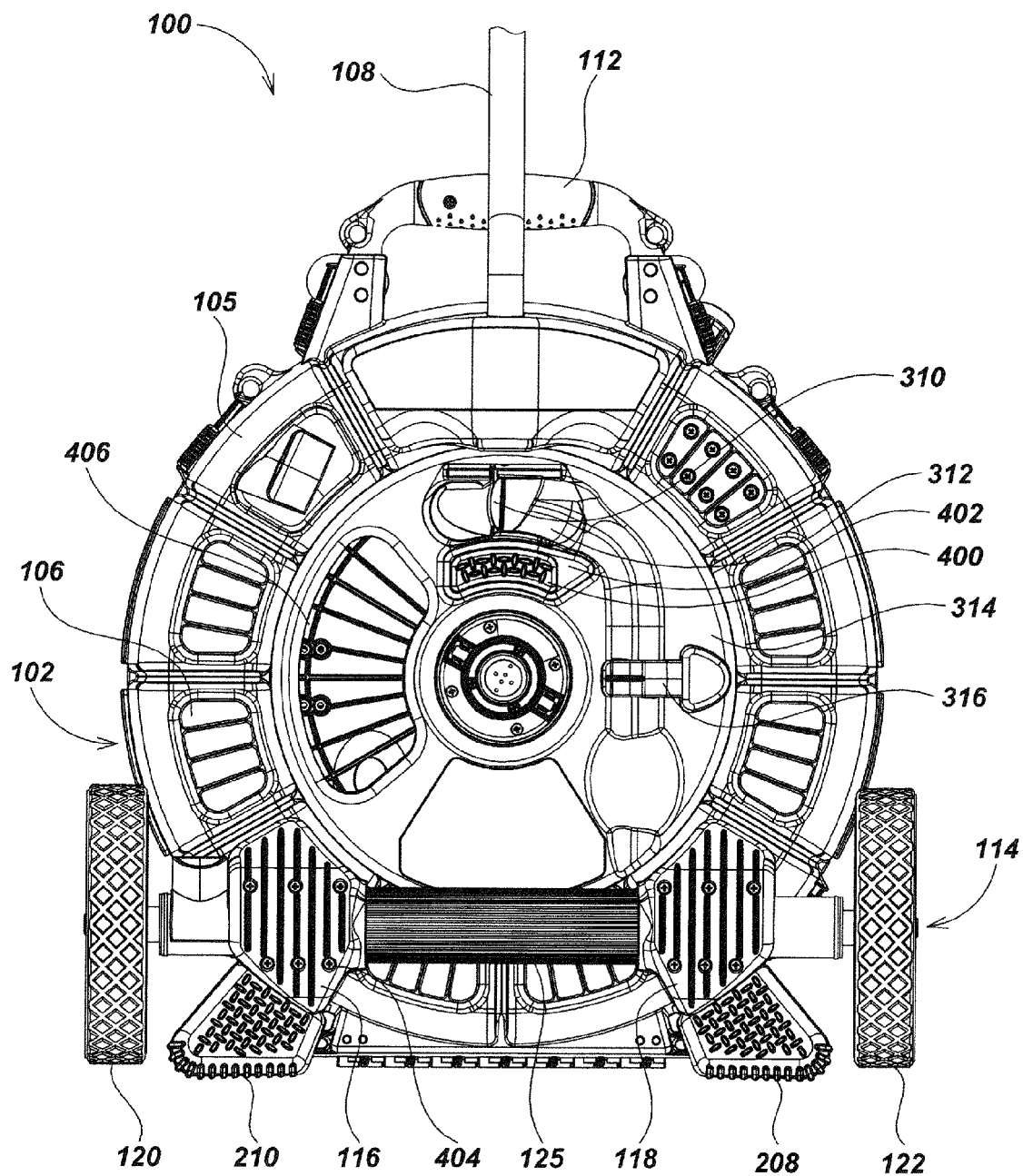
FIG. 4 is a detailed front view of the wheeled pipe inspection system embodiment of FIGS. 1 through 3.

FIG. 2 is a rear perspective view illustrating additional details of the wheeled pipe inspection system embodiment 100. Pipe inspection system embodiments may include one or more feet or pedestal elements for supporting and protecting the system during use or storage. For example, in an exemplary embodiment, an upper right rear foot 200 and an upper left rear foot 202 may be disposed on or within the outer housing assembly, such as on a surface of rear clamshell housing 104. Alternately, or in addition, one or more pedestal elements, such as rear left lower foot 206 and rear right lower foot 204, front right lower foot 208, and front left lower foot 210 (as shown in FIG. 4), may be disposed at the bottom surface of clamshell housing 102.

A system connector cable for carrying signals such as analog or digital electrical or optical signals, battery data signals, and/or electrical power, such as system connector cable 212, may be coupled to a removable slip-ring assembly 214, which may be disposed in an opening in the outer housing assembly, such as an opening in the center of rear clamshell housing 104. One or more sliding latches, such as an upper right sliding latch 216, a middle right sliding latch 218, and a lower right sliding latch 220, may be used for locking the mated halves (front clamshell housing element 105 and rear clamshell housing 104) of clamshell housing 102. Other mechanisms may alternately be used to couple elements of the outer housing assembly in various embodiments.

Referring to FIG. 3, details of wheeled pipe inspection system embodiment 100, in a configuration where pull-handle 108 is stowed, are illustrated. As noted previously, pull-handle 108 may be seated into the handle stowage cup 126 and retained by the handle stowage clip 128.

The pull-handle 108 may include a handle mounting alignment mechanism for aligning pull-handle positioning and restraining pull-handle motion. The housing assembly may include a seating mechanism for securing the pull-handle during use, while readily allowing removal for stowage. For example, the handle mounting alignment mechanism may include an alignment pin 300 on pull-handle 108, which, when deployed, may drop into a seating mechanism, such as formed groove 302 on the handle accessory mount 109, for preventing rotation of the pull-handle 108. The formed groove 302 may be backed by a molded insert 303. In other embodiments, alternate alignment mechanisms, such as keyed slots, hinges, or other alignment mechanisms known or developed in the art may be used.

In an exemplary embodiment, a spring-loaded toggle 304 may move a lower pin (not shown in FIG. 3) into a lower hole 306 on the pull-handle 108 when it is fully inserted, to prevent the handle 108 from slipping upward when pulled, as well as preventing rotation. When the spring-loaded toggle 304 is pressed in, the lower pin (not shown) is withdrawn, allowing the pull-handle 108 to be removed from the groove 302 in the handle accessory mount 109.

One or more sliding latches, such as right upper sliding latch 216, right middle sliding latch 218, and/or right lower sliding latch 220 (see FIG. 2) may be used for locking the halves of the clamshell housing 102 together. A push-cable, which may be spooled on a drum (not shown), which may be coupled to a pipe-inspection camera 308, may be fed from the inside of the outer clamshell housing 102 through an opening, such as a cable feed opening 310, which may be lined with a formed wear insert 312, or other friction-reduction mechanism, such as a bearing to aid in deploying and retracting the push cable.

A camera stowage mechanism, such as camera stowage clip 316, may be disposed on the outer housing, such as on a plastic front plate 314, which may be mounted on the front surface of front clamshell housing element 105. The pipe-inspection camera 308 may be stored under the camera stowage clip 316 when not in use and/or elsewhere on system 100.

FIG. 4 illustrates details of wheeled pipe inspection system embodiment 100, shown in a front perspective view. A front bumper 400, which may be constructed of rubber or other similar or equivalent materials, may be disposed centrally below the cable feed opening 310 on a raised bumper section 402, which may be a molded feature of the front plate 314. In combination with the front feet 208 and 210, the front bumper 400 may protect the front surface from abrasion, fluid or dirt infiltration, and/or other hazards from contact with the ground.

The wheel assembly 114 may be mounted to the front clamshell housing element 105 with the left axle cap 116 and the right axle cap 118, which may be attached with fasteners, such as screws 404 to a mounting plate (not shown in FIG. 4). An access port or opening 406 may be formed in the housing to allow an operator to manually lead the camera 308 (as shown in FIG. 3) through the cable feed opening 310 when preparing the system 100 for use.

Figure 5:
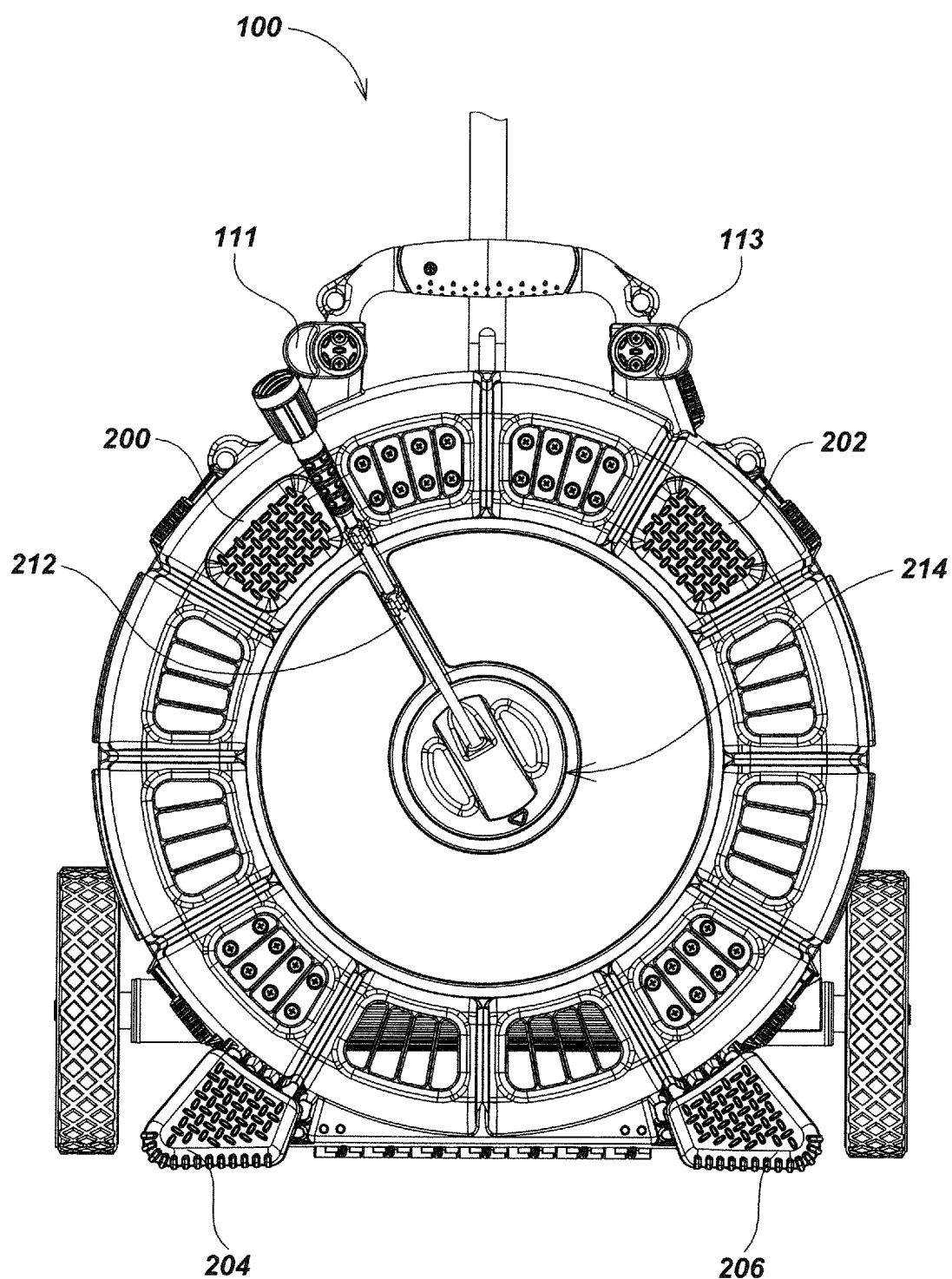
FIG. 5 is a detailed rear view of the wheeled pipe inspection system embodiment of FIGS. 1 through 4.

Referring to FIG. 5, a rear view of the wheeled pipe inspection system embodiment 100 is illustrated. In an exemplary embodiment, the system connector cable 212 may emerge from the removable slip-ring assembly 214. The system connector cable 212 may alternately be longer than shown in FIG. 5, and excess system cable may be stowed using the right cord wrap 111 and the left cord wrap 113. The slip-ring assembly 214 may be constructed in accordance with embodiments described in, for example, U.S. patent application Ser. No. 12/704,808, entitled PIPE INSPECTION SYSTEM WITH REPLACEABLE CABLE STORAGE DRUM, filed Feb. 12, 2010, the entire content of which is incorporated by reference herein. Non-skid material, such as textured rubber or other similar material, may be disposed on the surface of one or more feet, such as rear left lower foot 206, rear right lower foot 204, rear left upper foot 202 and rear right upper foot 200 to prevent slippage and protect the surface of housing 102 when operated in a horizontal orientation (as shown in, for example, FIG. 6).

Figure 6:
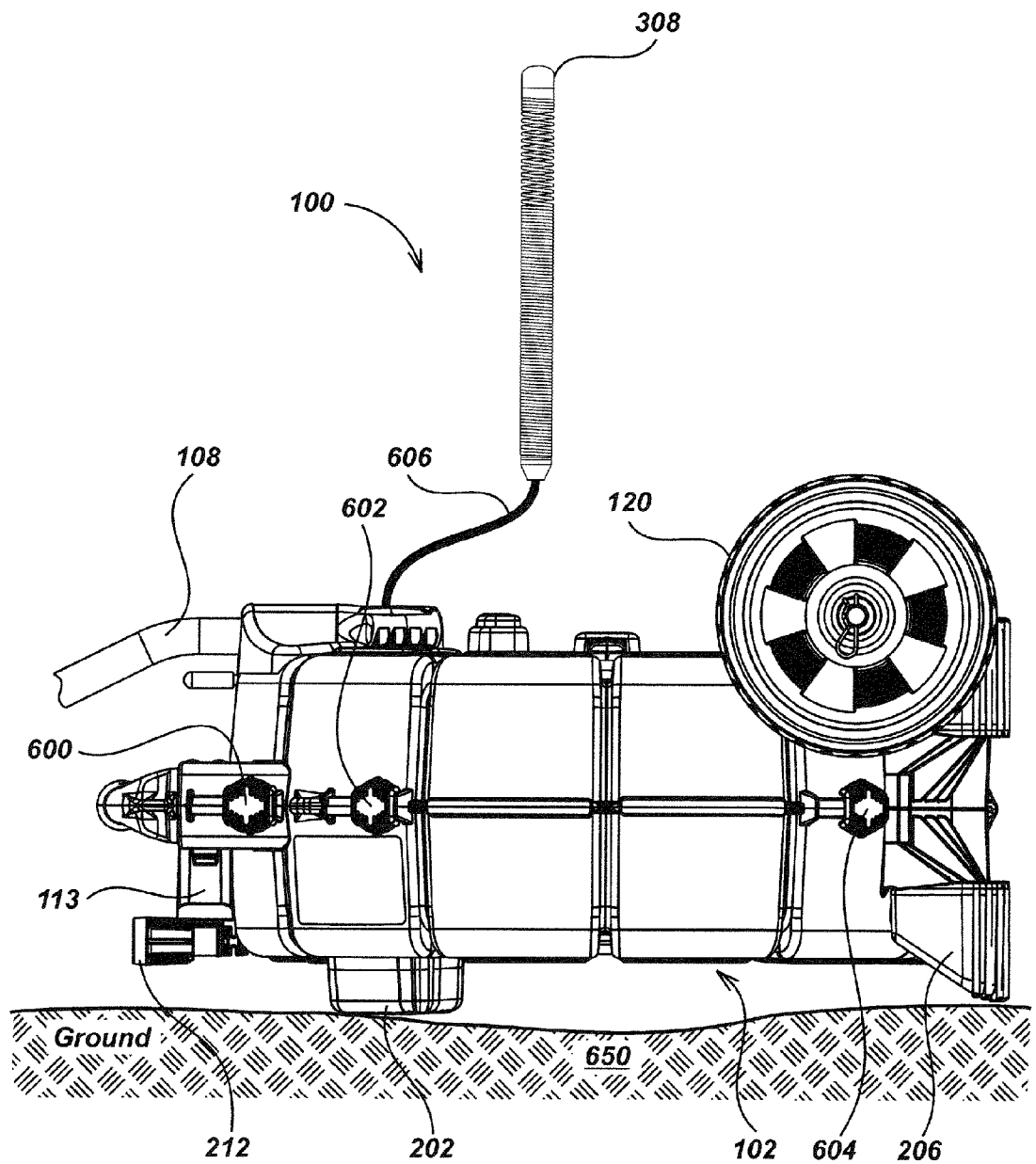
FIG. 6 is a side view of the wheeled pipe inspection system embodiment of FIGS. 1 through 5 when deployed in a horizontal orientation.

Referring to FIG. 6, a side view illustrates details of the wheeled pipe inspection system embodiment 100 in a horizontal orientation, laid down or resting on the ground or another surface 650. In an exemplary embodiment, the pipe inspection system 100 may be lowered to a horizontal orientation using the pull-handle 108. In this orientation, the pipe inspection system is supported on feet or pedestal elements, such as the rear left lower foot 206, rear right lower foot 204 (shown in FIG. 5), rear left upper foot 202 and the rear right upper foot 200, which may be configured to provide clearance for the system connector cable 212 to lead out to a system monitor and/or camera control unit (not shown) between the ground 650 and the housing 102. Corresponding latches (not shown) may be used on the other side of the outer housing in a similar fashion.

Operating the pipe inspection system 100 in a horizontal orientation may provide advantages such as stability when the system is used on various terrains, such as for example, sloped roofs or irregular terrain, and may provide other advantages such as ease of operator use or viewing of images or other information shown on displays or monitors of the pipe inspection system 100 (see FIG. 4). The camera 308 and the associated push-cable 606 in this orientation may be payed out from the upper face of the housing 102, and the camera 308 and/or attached push-cable may be accessed for retrieval or paying out via access window 406 (not shown), which may be done from the top of system 100 in the orientation shown in FIG. 6.

One or more latches, such as a left upper sliding latch 600, a left middle sliding latch 602, and a left lower sliding latch 604 may be used to secure the halves of the clamshell housing 102. Other attachment mechanisms may alternately be used to secure elements of the outer housing in different embodiments.

Figure 7:
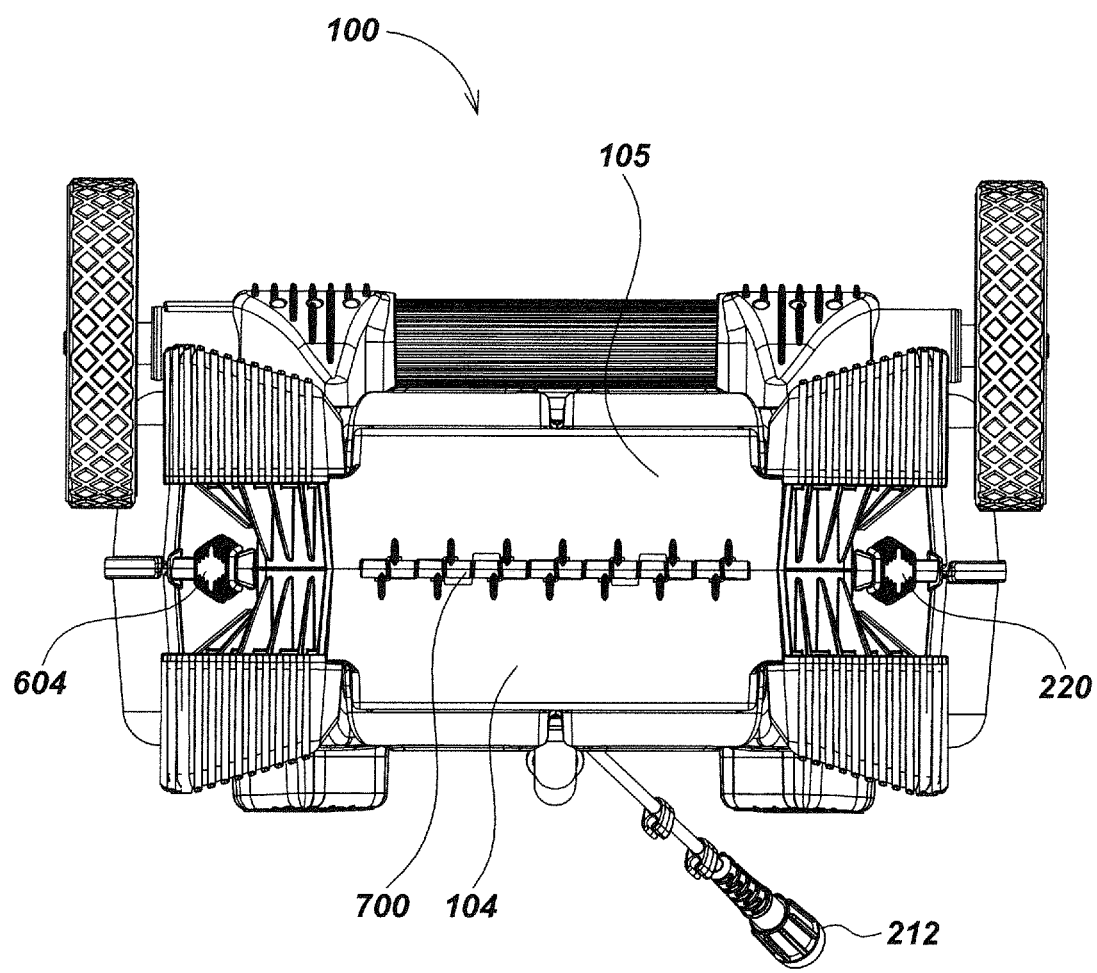
FIG. 7 is a bottom view of the wheeled pipe inspection system embodiment FIGS. 1 through 6.

Turning to FIG. 7, a bottom view of the wheeled pipe inspection system embodiment 100 illustrates additional details. In an exemplary embodiment, a central hinge 700 may be used for joining the front clamshell housing element 105 and the rear clamshell housing 104, which may be disposed on the bottom surface of clamshell housing 102, for allowing the clamshell housing 102 (as shown in FIGS. 1-3, and 6) to be opened to access a replaceable cable storage drum (not shown), or for cleaning, maintenance, and repair. The left lower sliding latch 604 and right lower sliding latch 220 (in addition to middle and upper sliding latches on right and left sides) may be used for securing and/or releasing the halves of clamshell housing 102.

FIG. 8 is an enlarged exploded view illustrating details of detachable wheel assembly embodiment 114. In an exemplary embodiment, axle 124 may be disposed within an axle tube 800, which in turn may be shielded by the axle tube sleeve 125. A pair of shock isolators, such as axle tube isolators 814, may be disposed at the ends of axle tube 800 for providing shock dampening at each end.

Wheel assembly embodiment 114 may include very high bond (VHB) tape segments 816 positioned between the axle tube 800 and the left axle mounting block 806, and/or between the axle tube 800 and the right axle mounting block 808. When compressed in assembly, the VHB tape segments 816 may act to prevent any lateral displacement of the axle tube 800. One or more washers, such as washers 804, may be positioned between axle tube isolators 814 and the wheels 120 and 122, which may be mounted to the ends of axle 124. The pull-handle stowage cup 126 may be disposed at the left end of the axle tube 800.

When assembled, the wheel assembly 114 may be mounted by seating the left axle cap 116 and the right axle cap 118 over the axle tube 800. One or more fasteners, such as retaining screws 404, may be used for securing left axle cap 116 and right axle cap 118 to retaining plates (not shown in FIG. 8), such that the wheel assembly 114 may be tightly secured to the front clamshell housing element 105 (as shown in FIG. 1). For example, screws 404 may be lead through formed holes in the left axle cap 116 and right axle cap 118, and through mating holes in left axle mounting block 806 and right axle mounting block 808, and then through one of the vent openings such as, for example, vents 106 (as shown in FIG. 1), where they may then be attached to or through the retaining plates. In some embodiments, quick disconnection mechanisms, such as screws with handles or wing nuts, latching mechanisms, or other quick-release attachment mechanisms may be used to further reduce the time and effort required to remove or attach the wheel assembly.

Figure 9:
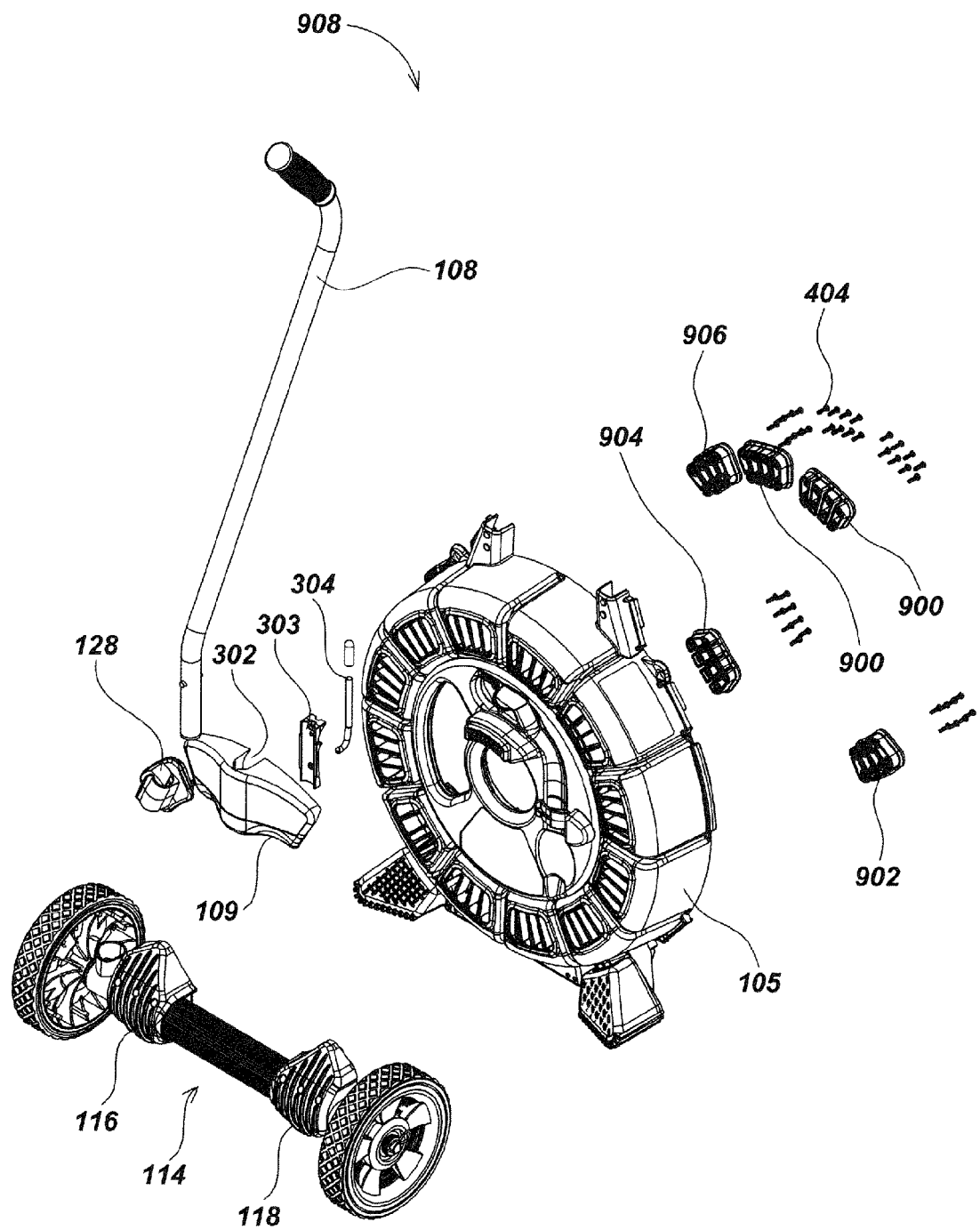
FIG. 9 is a front perspective exploded view of a front half assembly embodiment, illustrating details of an attachment mechanism of the wheel assembly embodiment of FIG. 8 and a front clamshell housing.

FIG. 9 is a front perspective exploded view of a front half assembly embodiment 908, illustrating details of an attachment mechanism of the wheel assembly 114 and a front clamshell housing element 105. As shown in FIG. 9, the front clamshell housing element 105 corresponds with a commercially available cable reel housing provided by SeeScan, Inc., assignee of the instant application. The pull-handle 108 and related attachment elements, as well as the wheel assembly 114 and related attachment elements, may be used to modify the commercially available housing to include wheels and a pull-handle as shown.

In an exemplary embodiment, one or more retaining plates, such as a pair of handle accessory mount retaining plates 900, a right axle assembly retaining plate 902, a left axle assembly retaining plate 904, and/or a handle stowage clip retaining plate 906, may be used for attaching various components to the front clamshell housing element 105. For example, the wheel assembly 114 may mate to the rear half assembly 908 with the right axle assembly retaining plate 902 and the left axle assembly retaining plate 904. The handle stowage clip 128 may similarly be secured by fasteners or other connectors, such as screws 104, pins, bolts, and the like, leading through one or more of vents 106 and attaching to the handle stowage clip retaining plate 906. Other quick-release attachment mechanisms may alternately be used to secure the wheel assembly 114 to the outer housing assembly.

Figure 10:
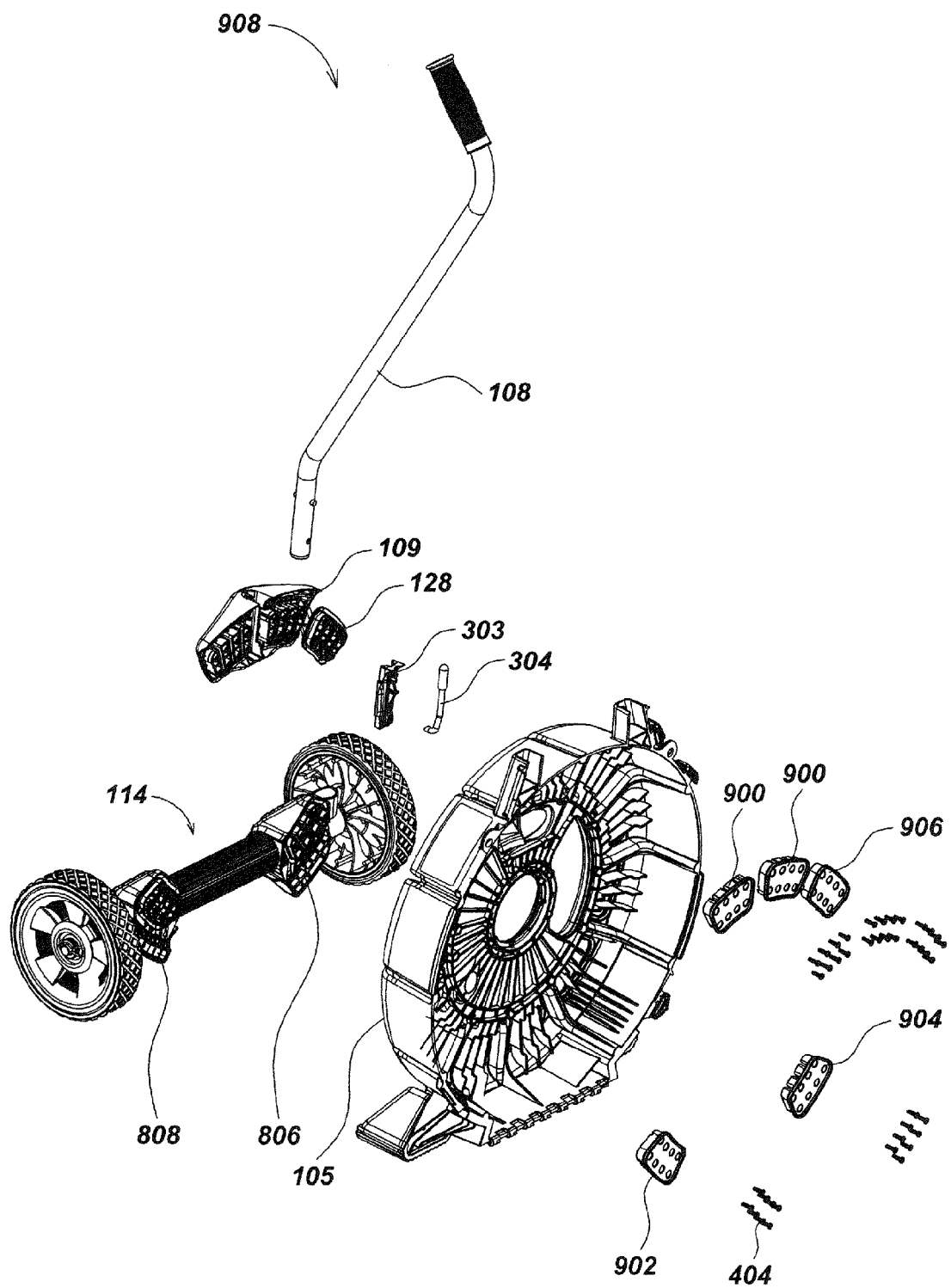
FIG. 10 is an exploded view of the front half assembly embodiment of FIG. 9, illustrating details from the rear side thereof.

Referring now to FIG. 10, additional embodiments of attachment details of the wheel assembly and pull-handle are illustrated. For example, the wheel assembly 114 may be retained by attachment hardware, such as screws 404, which connect the right axle assembly retaining plate 902 and the left axle assembly retaining plate 904 to the right axle mounting block 808 and the left axle mounting block 806 respectively, passing through apertures or vents 106 on the front clamshell housing element 105. The handle accessory mount 109 may be similarly attached by the two handle accessory mount retaining plates 900. The handle stowage clip 128 may be similarly attached with the handle stowage clip retaining plate 906. In an exemplary embodiment, the pull-handle and wheel assembly are attached through the outer housing assembly with hardware positioned within existing openings or cavities in the outer housing assembly, thereby allowing simple retrofit of non-wheeled pipe inspection systems.

Figure 11:
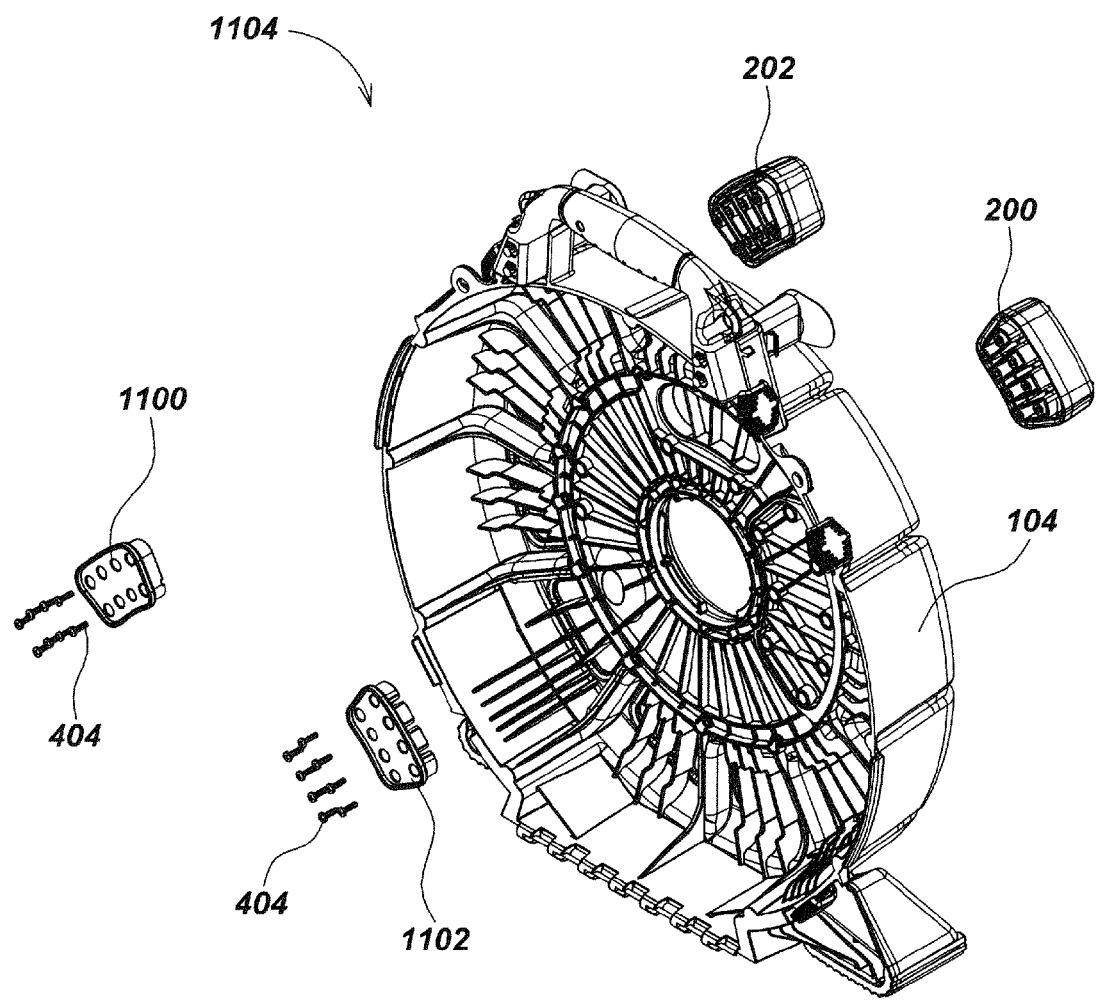
FIG. 11 is an enlarged perspective view of a rear half assembly embodiment, illustrating the attachment mechanism for a pair of upper feet mounted to the inside of a rear clamshell housing.

FIG. 11 is an enlarged plan view of details of a rear half clamshell assembly embodiment 1104, illustrating an attachment mechanism for components mounted to the inside of rear clamshell housing 104. In an exemplary embodiment, one or more feet, such as rear left upper foot 202 and the rear right upper foot 200, may be secured to the rear clamshell housing 104 by a pair of corresponding retaining plates, such as, for example, an upper left foot retaining plate 1100 and an upper right foot retaining plate 1102.

The attachment mechanisms described in the preceding examples may provide flexibility for configuring pipe inspection systems, such as wheeled pipe inspection system 100, with various accessories and components. For example, a mounting deck for a laptop or monitor used for processing images captured by a pipe-inspection camera 308 (as shown in FIG. 3) attached to a push-cable 606 (as shown in FIG. 6) may be attached in a fashion similar to the pull-handle and wheel assembly, such as using mounting hardware passing through vents such as vent 106.

Figure 12:
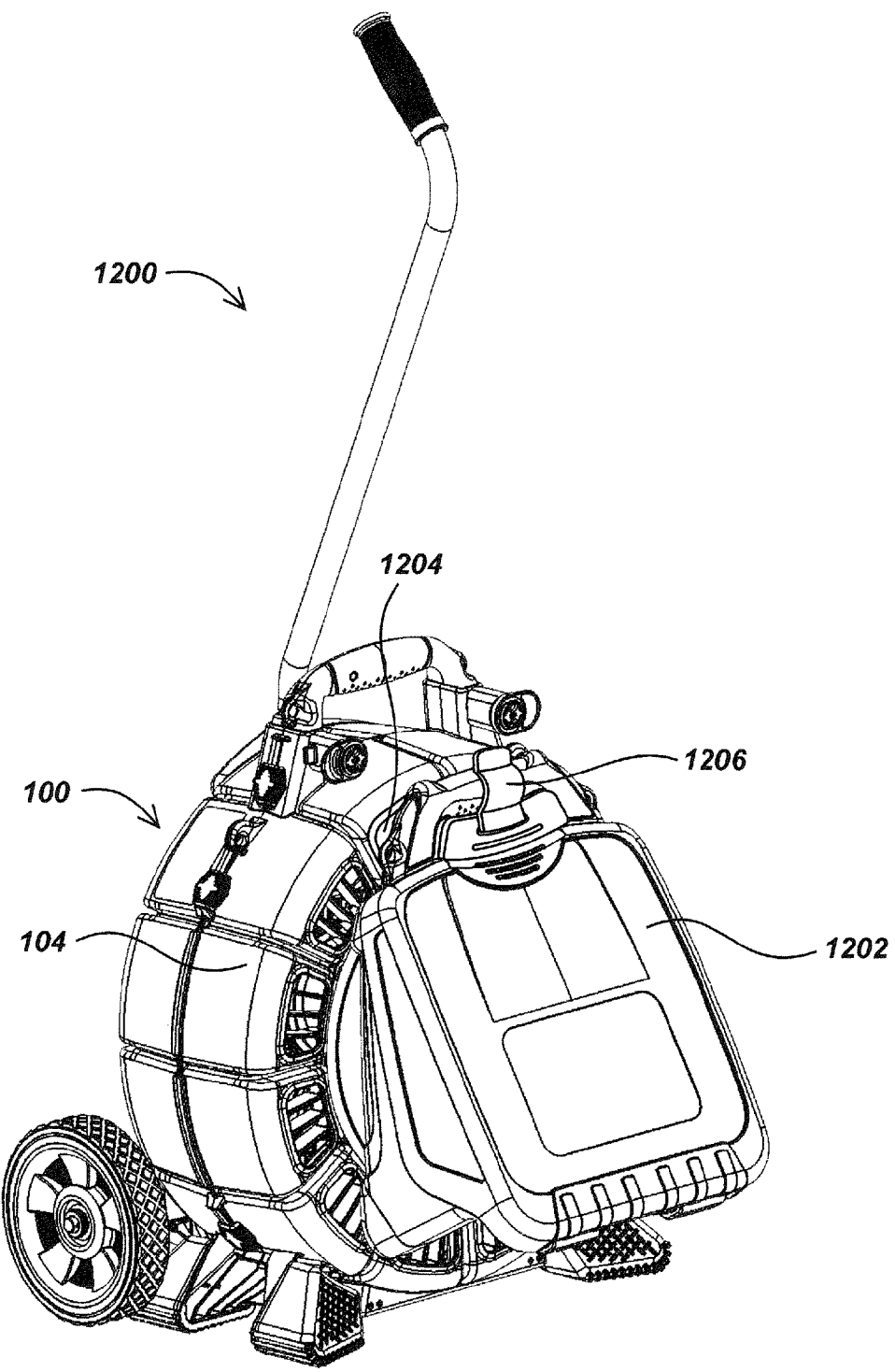
FIG. 12 is a rear perspective view of an alternative embodiment wheeled pipe inspection system configured with a portable camera control unit.

Referring to FIG. 12, details of an alternative embodiment of a pipe inspection system 1200 are illustrated. In an exemplary embodiment, system 1200 may include a portable monitor and camera control device, such as portable camera control unit (CCU) 1202, which may include one or more computer processors or processing elements, camera control and monitoring elements, such as displays, keypads or other input or control mechanisms, data transmission and storage components, as well as other computer control, processing, and storage elements, and may be incorporated with a wheeled pipe inspection system, such as pipe inspection system embodiment 100, to facilitate simultaneous transport of both the CCU 1202 and the pipe inspection system 100.

For example, a portable CCU 1202, which may include a built-in monitor or display device, such as an LCD panel (not shown), along with one or more processing elements and associated electronics components may be removably attached to the external surface of the rear clamshell housing 104 of the pipe inspection system 100 with a mounting element, such as a purpose-designed CCU mounting block 1204, which may be configured for retaining the handle of the portable CCU 1202 with one or more fasteners or clips, such as spring-loaded clip 1206. The CCU mounting block 1204 may be mounted to the rear clamshell housing 104 with a retaining plate (not shown in FIG. 12), which may be similar to those shown in the preceding examples (such as, for example, retaining plates 900, 902, 904, and 906 as shown in FIGS. 9 and 10). In operation, the closed portable CCU 1202 may be secured by the spring-loaded clip 1206, and supported by the CCU mounting block 1204. The portable CCU 1202 may be detached from the clamshell housing, such as clamshell housing 102 shown in FIGS. 1-4, and 6, for set up and use by depressing the spring-loaded clip 1206.

Figure 13A:
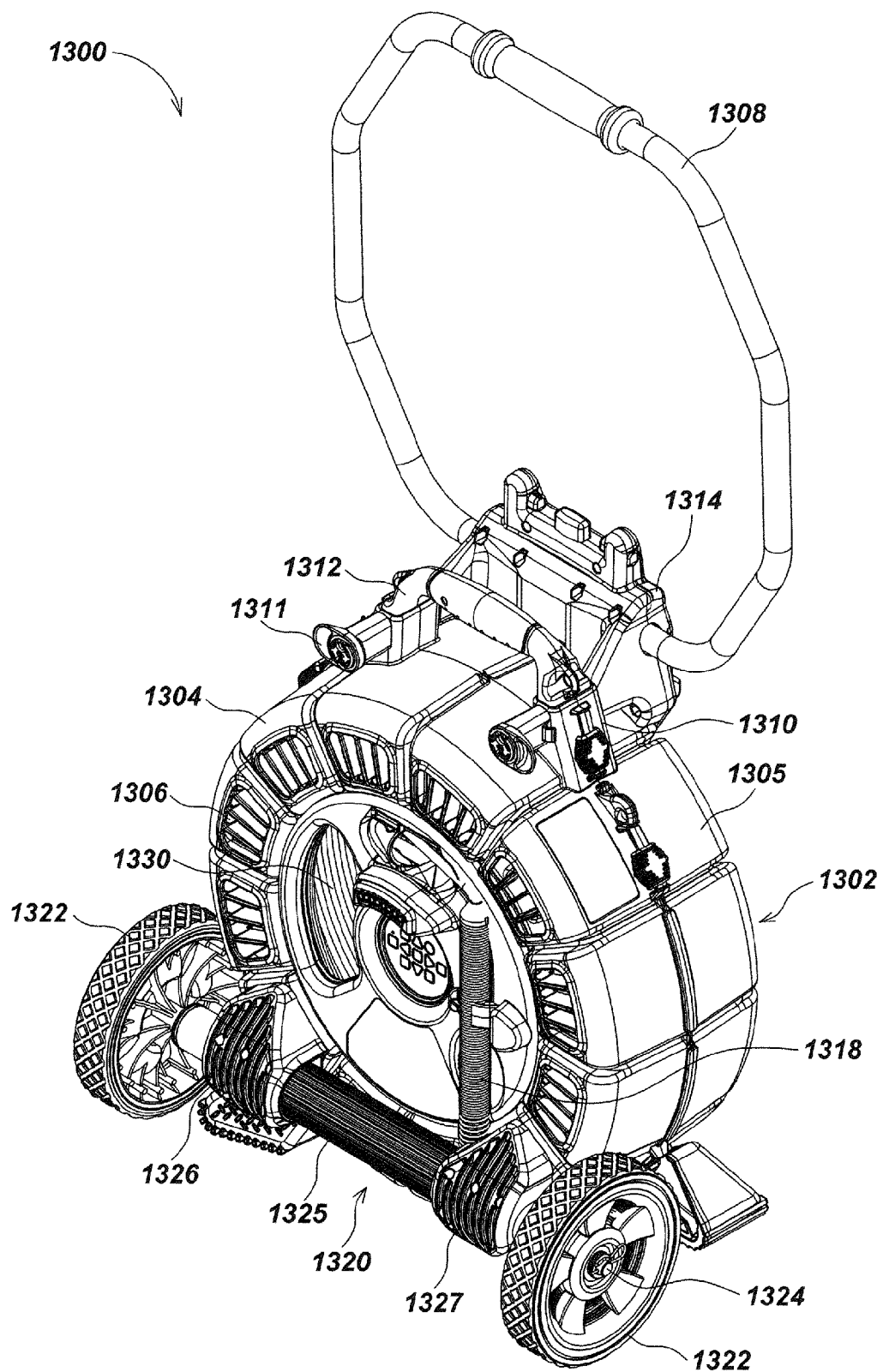
FIG. 13A illustrates details of an alternate embodiment of a wheeled pipe inspection system with a pull-handle configured in an upright position.
Figure 13B:
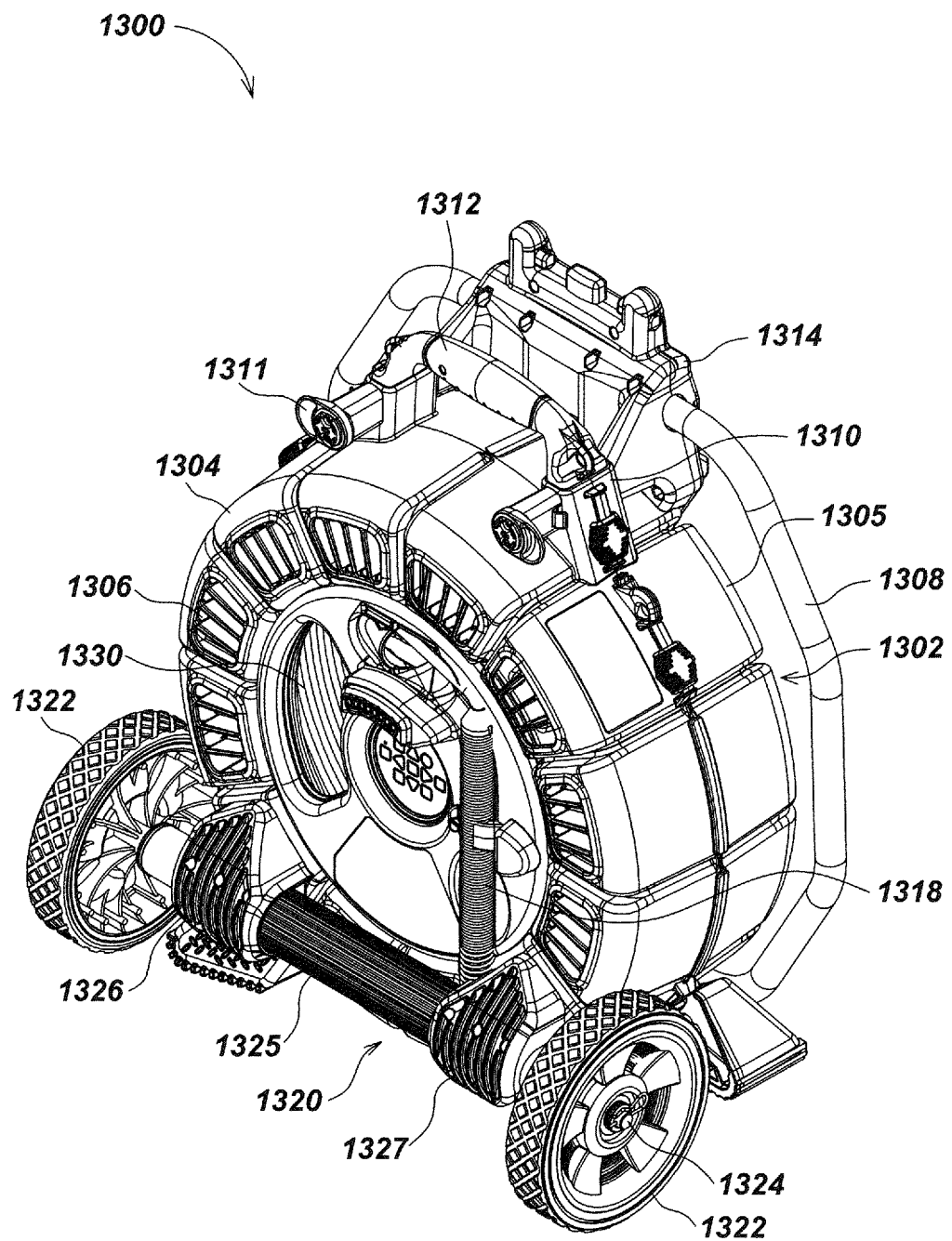
FIG. 13B illustrates details of the wheeled pipe inspection system embodiment of FIG. 13A with the pull-handle in a stowed position.
Figure 13C:
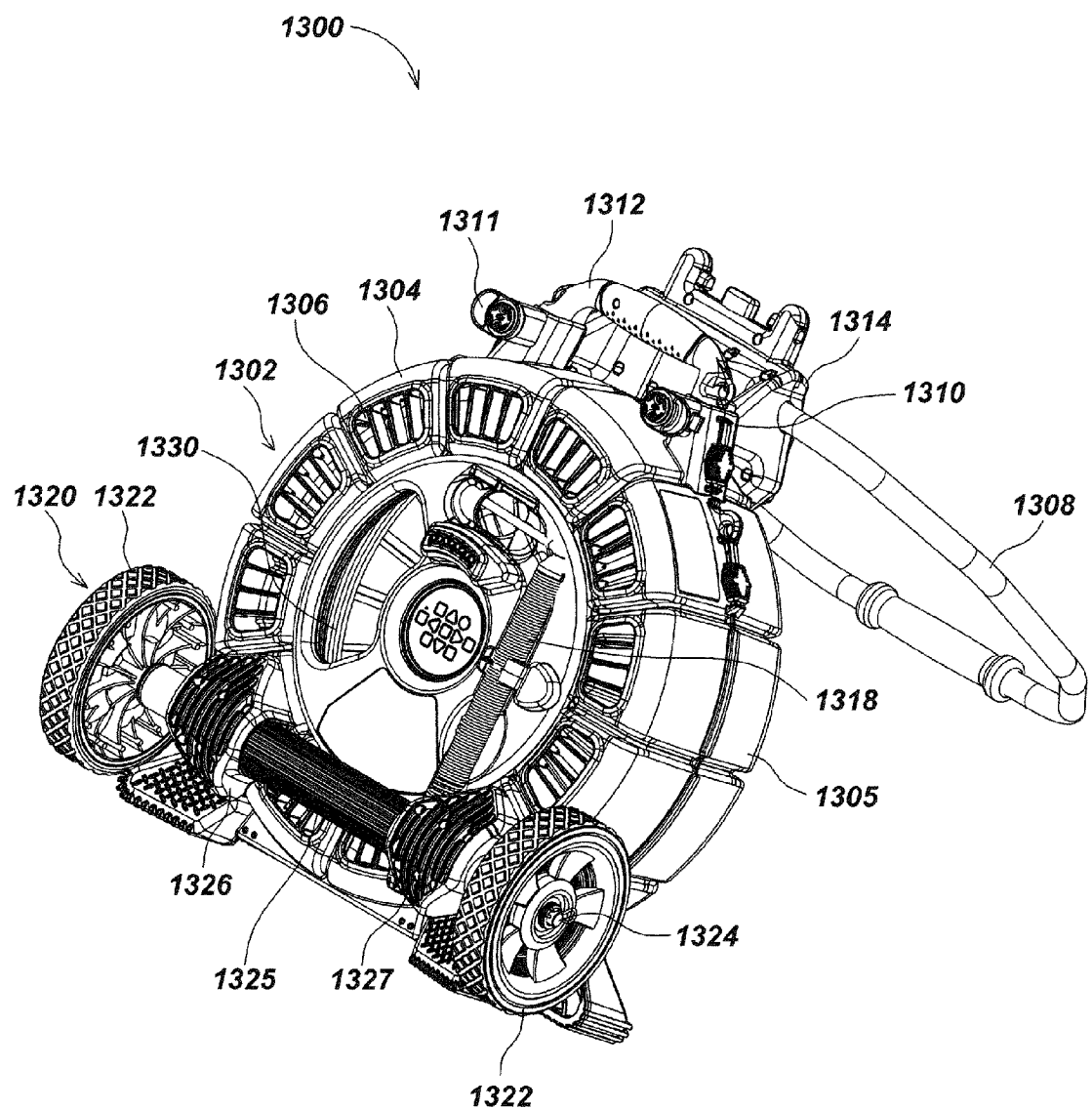
FIG. 13C illustrates details of the wheeled pipe inspection system embodiment of FIG. 13A in kickstand mode.

Referring to FIGS. 13A, 13B, and 13C, an embodiment of a wheeled pipe inspection system 1300 in accordance with aspects of the present disclosure is shown. In an exemplary embodiment, wheeled pipe inspection system 1300 may include a cable storage drum 1302 and a pull-handle 1308, which may be configured in an upright position. Pipe inspection system 1300 may include an outer housing assembly, such as a front clamshell housing element 1304 and rear clamshell housing element 1305, or a housing of a similar or equivalent configuration for providing an enclosure, which may be configured to store a push-cable for deployment in, or retrieval from, a pipe or other object or cavity. In addition, pipe inspection system 1300 may include one or more vents 1306 and one or more access ports in the housing assembly, a detachable wheel assembly 1320, feet or pedestal elements, and a handle assembly, such as further described below.

Various elements of pipe inspection system 1300 may be constructed in accordance with details of pipe inspection system and apparatus embodiments described in, for example, U.S. patent application Ser. No. 13/214,208, filed Aug. 21, 2011, entitled ASYMMETRIC DRAG FORCE BEARINGS FOR USE WITH PUSH-CABLE STORAGE DRUMS, which includes details of embodiments of bearings and related components that may be used in a system such as system 1300, U.S. patent application Ser. No. 12/704,808, filed Feb. 12, 2010, entitled PIPE INSPECTION SYSTEM WITH REPLACEABLE CABLE STORAGE DRUM, which includes details of embodiments of storage drums, housings, and related components that may be used in a system such as system 1300, U.S. patent application Ser. No. 12/399,859, filed Mar. 6, 2009, entitled PIPE INSPECTION SYSTEM WITH REPLACEABLE CABLE STORAGE DRUM, which includes details of embodiments of storage drums, housings, and related components that may be used in a system such as system 1300, U.S. patent application Ser. No. 12/371,540, filed Feb. 13, 2009, entitled PUSH-CABLE FOR PIPE INSPECTION SYSTEM, which includes details of embodiments of push-cables, storage drums for the push-cables, housings, and related components that may be used in a system such as system 1300, and U.S. Provisional Patent Application Ser. No. 61/152,662, filed Feb. 13, 2009, entitled HIGH PERFORMANCE PIPE INSPECTION SYSTEM, that includes various details of embodiments of components that may be used in a system such as system 1300, each of which is incorporated by reference herein. Various embodiments of the present invention may be implemented with elements that are the same as or similar to the embodiment details disclosed in these applications, with additional wheel assemblies, housings, pull-handles, and/or other features as are described subsequently herein.

Still referring to FIG. 13A, front clamshell housing element 1304 and rear clamshell housing element 1305 may be mated or coupled to enclose a push-cable storage drum (not shown in FIG. 13A) for storing a push-cable, which may be coupled to other components such as a camera element, pipe clearing elements, such as cutting tools or jetting tools, and/or other components configured to be deployed on a push-cable. The housing elements may be coupled by a hinge mechanism, pins, latches, clamps, adhesives, and/or other attachment mechanisms. In some embodiments, one or more alternate housing assembly configurations may be used, such as housing assemblies including additional housing elements (beyond those shown) and/or alternate element connection mechanisms.

Cable storage drum 1302 may include a front side, corresponding to a side where a push-cable 1330 and accessories such as a camera 1318 are deployed, and a back or rear side, corresponding to a side opposite the front side.

A detachable wheel assembly 1320 may be mounted to the front side of the cable storage drum 1302 in the exemplary embodiment shown in FIG. 1. In other embodiments, wheel assemblies may be mounted to the back side or to other positions on the outer housing. For example, in one embodiment, a detachable wheel assembly embodiment 1320 may be mounted to the lower portion of the front clamshell housing 1304, using, for example, one or more axle caps, such as a left axle cap 1326 and a right axle cap 1327. Wheel assembly 1320 may include an axle, such as axle 1324, to provide support for one or more wheels, such as left and right wheels 1322. The axle 1324 may be disposed within an axle tube 800 (such as shown in FIG. 8), which may be enclosed by a shield or sleeve, such as axle tube sleeve 1325, which may be disposed between the left axle cap 1326 and right axle cap 1327, for providing wear and abrasion protection to system 1300. The wheel assembly 1320 may be mounted using connectors such as screws, bolts, rods, etc., that pass through the housing via vents 1306.

A lifting mechanism, such as lifting handle 1312, may be coupled to the cable storage drum 1302, such as by using a pair of mount supports 1310 or other attachment mechanisms, such as screws, adhesives, and the like. One or more cord wraps, such as right and left cord wraps 1311 as shown, may be coupled to mount supports 1310 and/or elsewhere on the outer housing assembly for stowing a system connection cable (not shown in FIG. 13A), which may connect the pipe inspection system 1300 to a camera control unit, monitor, power supply, computing system, or other device or system (not shown in FIGS. 13A-13C).

Pull-handle 1308 may be used for moving, positioning, raising or lowering, and/or otherwise manipulating the pipe inspection system during transport and use. Pull-handle 1308 may be secured between two halves which, when fitted together around handle 1308, form a pull-handle mount 1314. Pull-handle 1308 may include a hand grip, which may be disposed on the upper middle section of handle 1308. Alternate pull-handle embodiments of pull-handle 1308 may be a single handle tubular pull-handle (such as shown in FIG. 1). In certain embodiments, the pull-handle 1308 may be configured to be foldable onto the back side of the housing to allow different positioning depending on a particular inspection operation. For example, FIG. 13B shows the pull-handle 1308 a stowed position.

Referring to FIG. 13C, the system 1300 may be tilted and the pull-handle 1308 may be configured to be partially folded to provide a kick stand-like support to facilitate control, cable deployment or retraction, and/or display viewing in embodiments using a display or monitor device.

Figure 14:
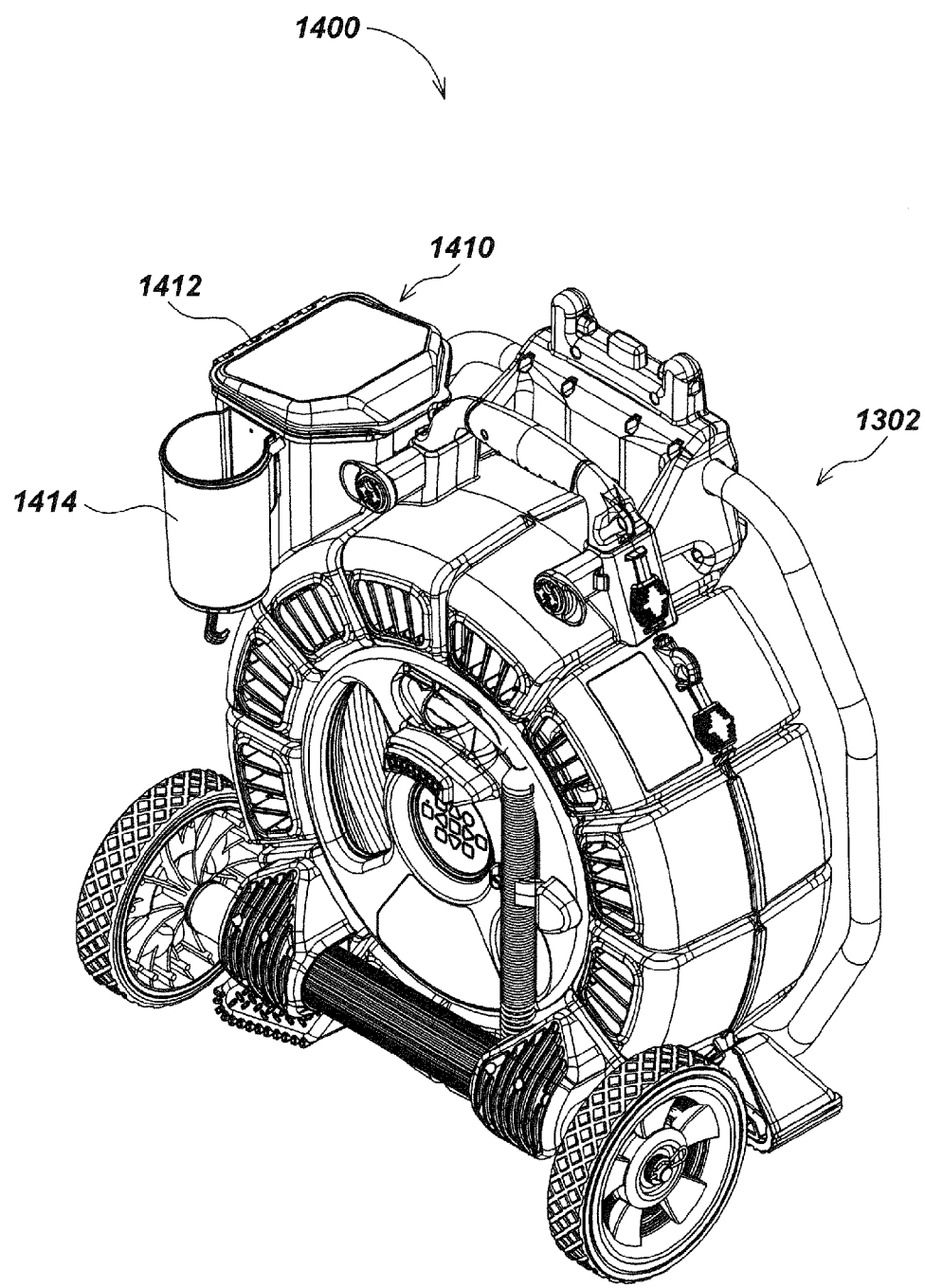
FIG. 14 illustrates details of the wheeled pipe inspection system embodiment of FIGS. 13A-C configured with one or more stow bin assemblies.

FIG. 14 illustrates details of a wheeled pipe inspection system embodiment 1400. Wheeled pipe inspection system embodiment 1400 may include the cable storage drum assembly 1302 (FIG. 13A) configured with a stow bin assembly embodiment 1410. In an exemplary embodiment, stow bin assembly 1410 may include a stow bin compartment 1412 coupled to a spray can holder 1414 for holding paint or other disposables used during inspection operations. Spray can holder may additionally be used to stow tools and other items. Stow bin assembly 1410 may have holes in the bottom for retaining screwdrivers or other tools, and/or may have other mounting elements for retaining items used during inspection operations.

Figure 15:
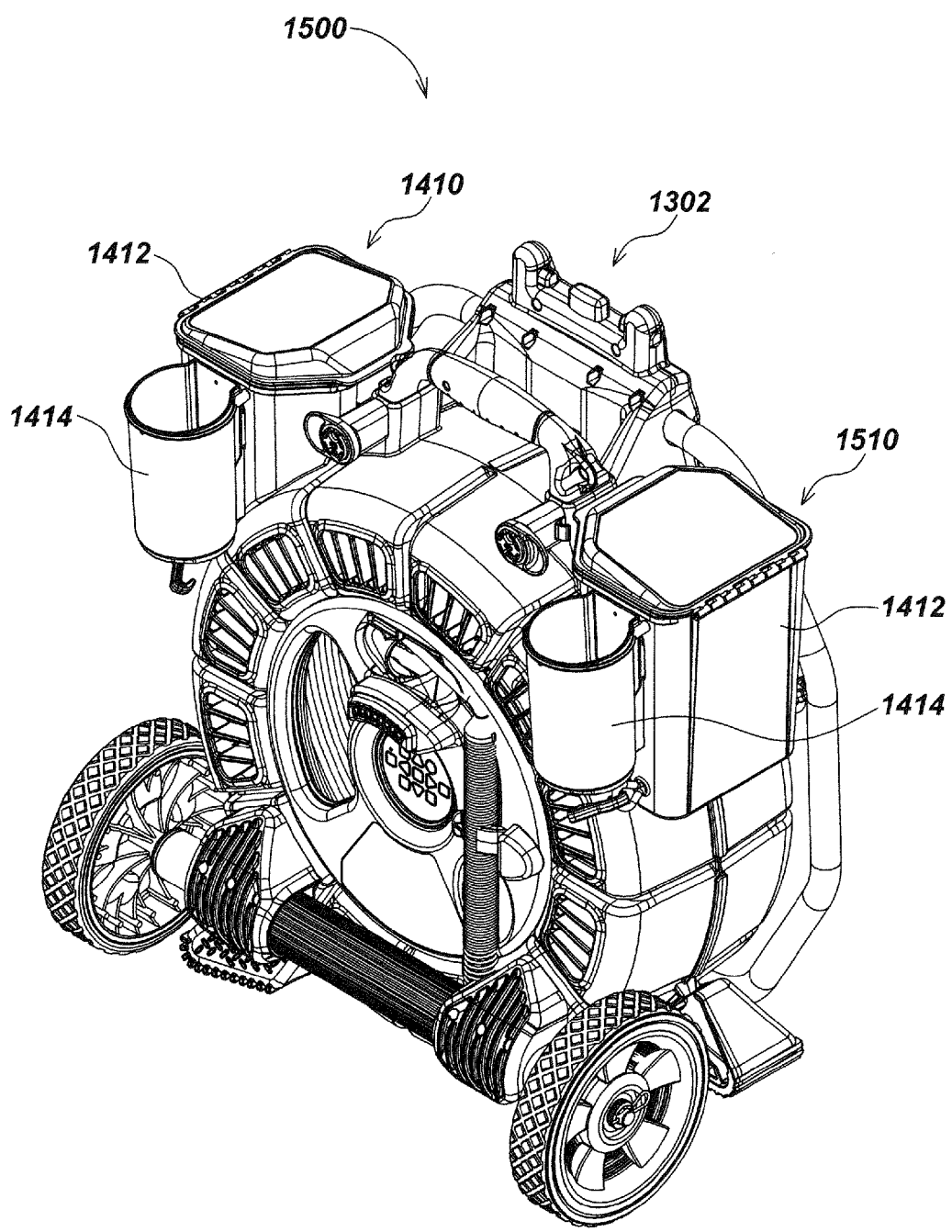
FIG. 15 illustrates details of the wheeled pipe inspection system embodiment of FIGS. 13A-C configured with two or more stow bin assemblies.

FIG. 15 illustrates details of a wheeled pipe inspection system embodiment 1500. Wheeled pipe inspection system embodiment 1500 may include the cable storage drum assembly 1302 (FIG. 13A) configured with two stow bin assemblies, such as, for example, left stow bin assembly 1410 and a right stow bin assembly 1510. Stow bin assembly 1510 may include stow bin compartment 1412 coupled to spray can holder 1414.

Figure 16:
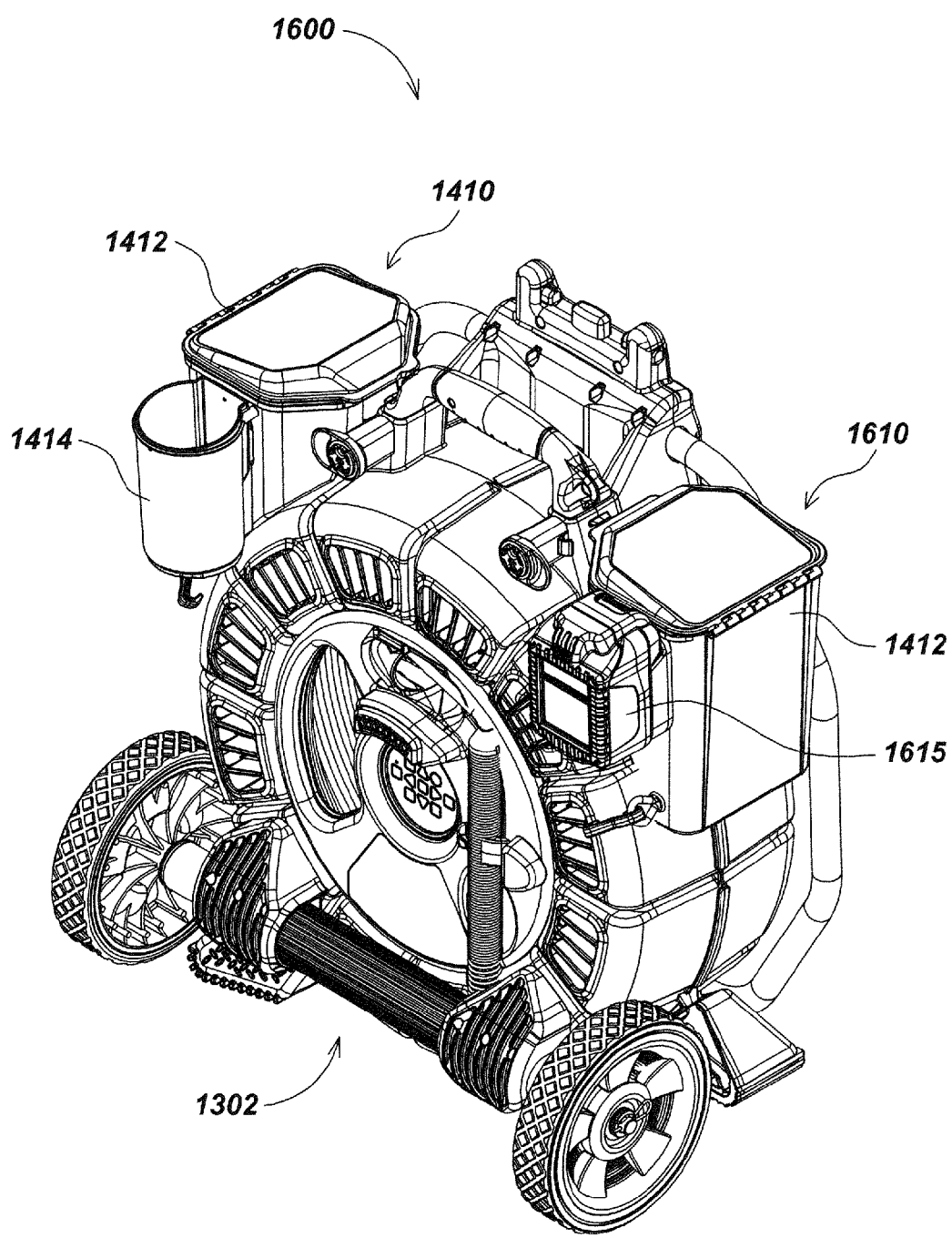
FIG. 16 illustrates details of the wheeled pipe inspection system embodiment of FIGS. 13A-C configured with two stow bin assemblies.

FIG. 16 illustrates details of a wheeled pipe inspection system embodiment 1600. Wheeled pipe inspection system embodiment 1600 may include the cable storage drum assembly 1302 (FIG. 13A) configured with two stow bin assemblies, such as, for example, left stow bin assembly 1410 and right stow bin assembly 1610. A Lucid battery 1615, which may be a battery as described in co-assigned U.S. patent application Ser. No. 13/534,721, filed Jun. 25, 2012, entitled MODULAR BATTERY PACK APPARATUS, SYSTEMS, & METHODS or co-assigned U.S. patent application Ser. No. 61/663,617, filed Jun. 25, 2012, entitled MODULAR BATTERY PACK APPARATUS, SYSTEMS, AND METHODS, INCLUDING VIRAL DATA AND/OR CODE TRANSFER, incorporated by reference herein, may be coupled to the stow bin assembly and/or may be attached to other elements of the pipe inspection system 1600.

Figure 17:
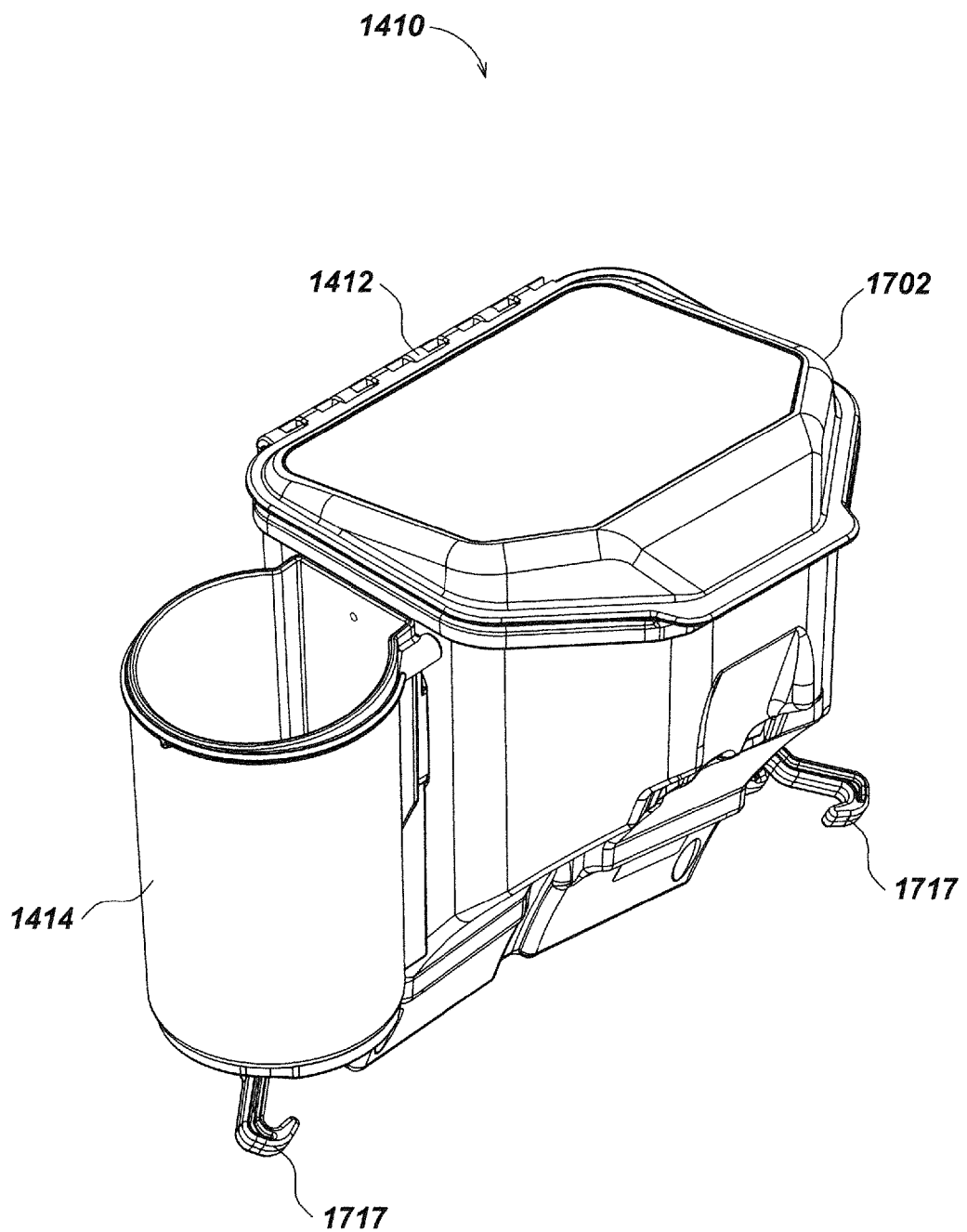
FIG. 17 illustrates details of an embodiment of the stow bin assembly of FIGS. 14-16.

FIG. 17 illustrates details of an embodiment of the stow bin assembly embodiment 1410 (FIGS. 14-16). The stow bin 1412 may include a lid 1702 hinged to the outer edge of the stow bin 1412 to cover the inner compartment. The stow bin assembly may include one or more clips or hooks, such as hooks 1717, which may be used for tightly securing the stow bin assembly to the outer housing of the cable storage drum 1302 (see FIG. 13A). For example, the hooks 1717 may be snapped or hooked onto one of the vents 1306 (FIG. 13A) formed in the outer housing of the cable storage drum 1302.

Figure 18:
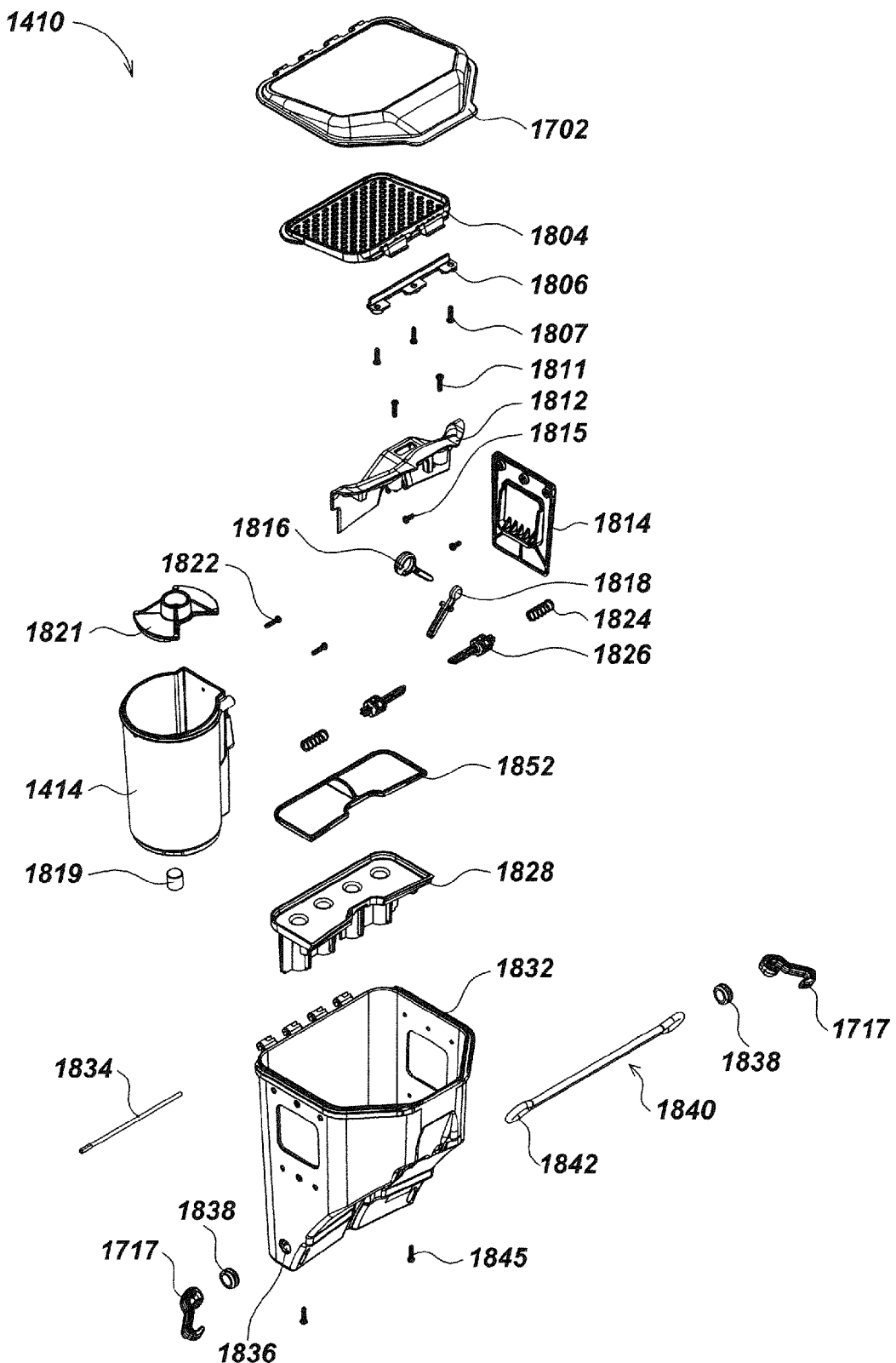
FIG. 18 is an exploded view of the stow bin assembly embodiment of FIG. 17.

FIG. 18 is an exploded view of the stow bin assembly embodiment 1410 (FIG. 14). Stow bin assembly 1410 may include a stow bin shell 1832 coupled with a stow bin lid 1702. Stow bin lid 1702 may swing open and closed along a hinge pin 1834 in the hinge formed (not shown in FIG. 18) between stow bin shell 1832 and stow bin lid 1702 when mated together. A hinged cover pouch 1804 may be disposed beneath the lid 1702 and secured by retainer 1806 and one or more fasteners, such as screws 1807 to provide a secondary compartment within stow bin 1412 for storing ancillary items, such as business cards or memory cards, and the like. Stow bin assembly 1410 may also include a latch shroud 1812, which may be mounted inside the stow bin 1412 with one or more fasteners, such as screws 1811. Stow bin assembly 1410 may also include a pair of nested press tabs, such as press tab socket 1816 and a press tab ball 1818, which may be coupled to one another to form a button. In assembly, the rounded button formed by the nested press tabs 1816 and 1818 may be retained in a slot of the latch shroud 1812. The opposite end of each tab 1816 and 1818 may be set against a shoulder of a slide pin, such as a pair of slide pins 1826. One or more springs, such as coil springs 1824 hold the slide pins 1826 in the inward, locked position. When the button is pressed downward, the tabs exert an outward force to retract the slide pins 1826 from their locked position.

Still referring to FIG. 18, spray can holster 1414 (FIGS. 14-17) may be coupled to the side of stow bin shell 1832 with one or more fasteners, such as screws 1822. Spray can holster 1414 may include a can holder insert 1821 coupled with a magnet 1819 to provide additional stability and reduced vibration and or movement when a spray can made with a conductive material, such as metal, is placed into the spray can holster 1414. Spray can holster 1414 may optionally be used to stow tools and other objects used for a pipe inspection. An outside cover 1814 may be coupled to one side of stow bin shell 1832 with one or more fasteners, such as screws 1815. A stow tray 1828 and tray pad 1852 may be stacked and secured inside the bottom of stow bin shell 1832 with one or more fasteners, such as screws 1845.

An O-ring, such as elastomer O-ring 1840, may include a loop at each end, such as loops 1842. Elastomer O-ring may be fed through a pair of holes 1836 formed in the stow bin shell 1832, and loops 1842 may be secured with a pair of grommets 1838. Hooks 1717 (FIG. 17) may each be fastened to one or more loops 1842.

Figure 19:
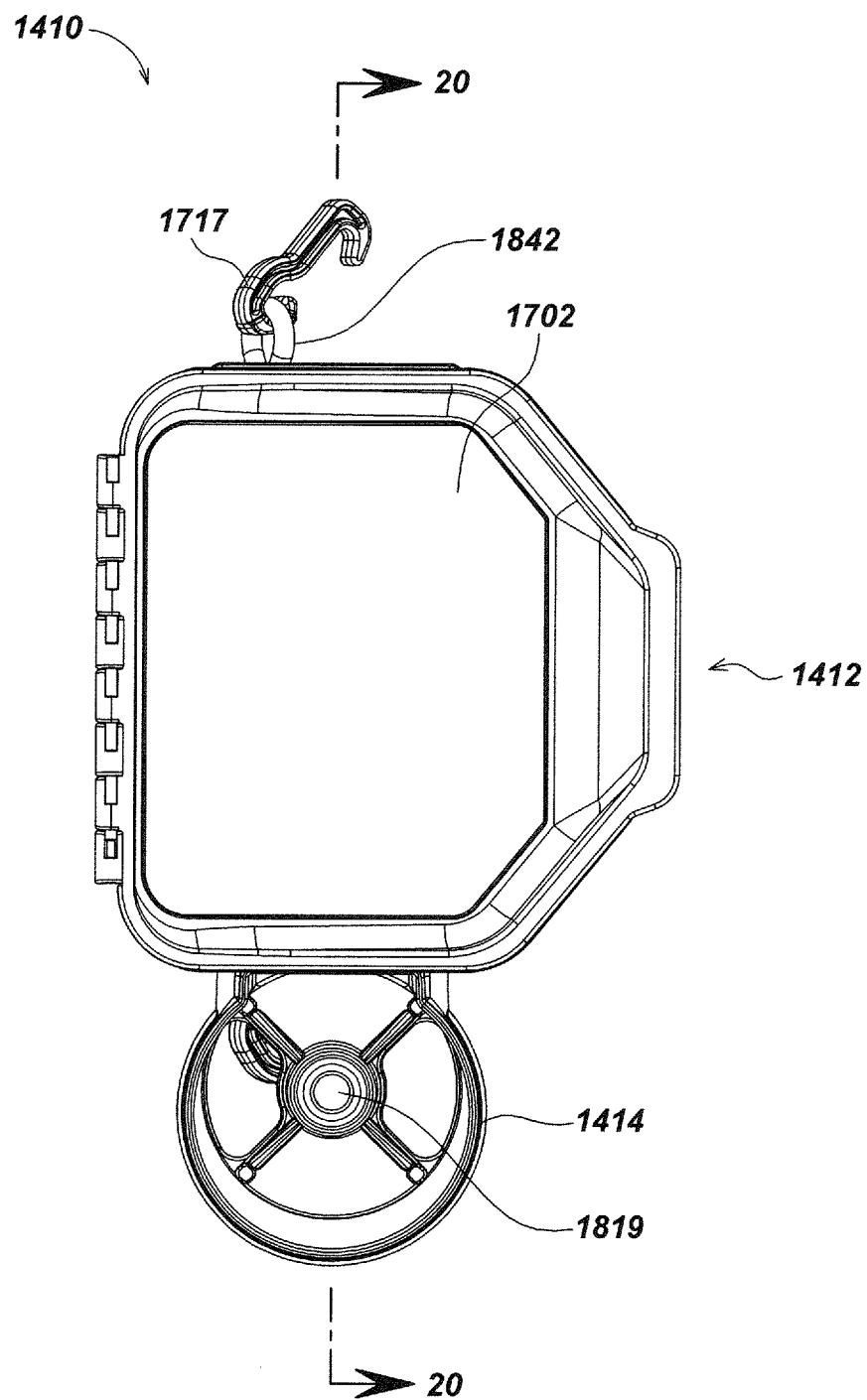
FIG. 19 is a top view of the stow bin assembly embodiment of FIG. 17.

FIG. 19 is a top view of the stow bin assembly embodiment 1410 (FIG. 14). In this view, the assembly of the hook 1717 (FIGS. 17 and 18) and loop 1842 (FIG. 18) on O-ring 1840 (not shown in FIG. 19) is shown. The hinged lid 1702 (FIGS. 17 and 18) and the nestled magnet 1819 (FIG. 18) disposed in spray can holster 1414 is also shown in greater detail.

Figure 20:
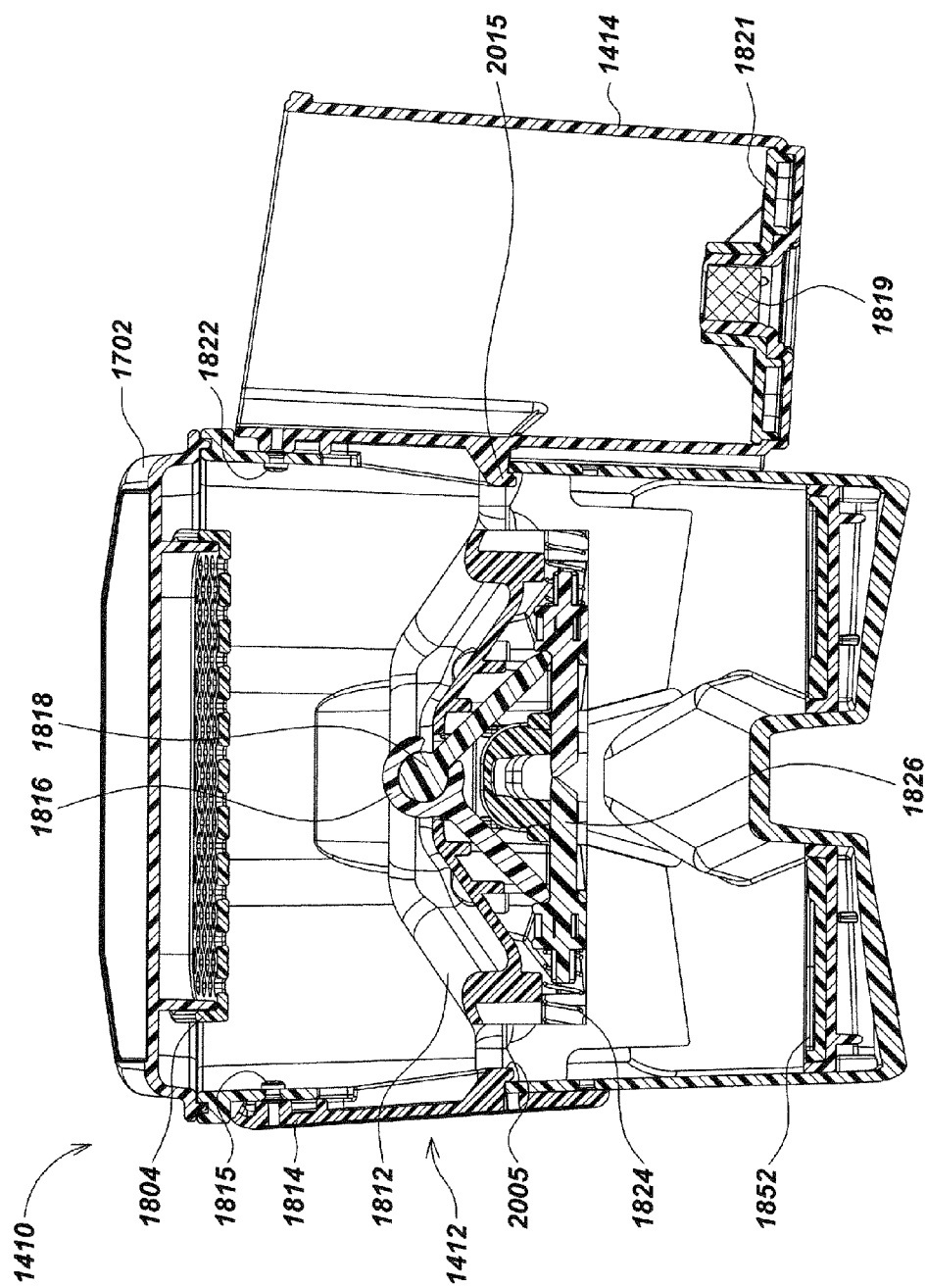
FIG. 20 is a section view of the stow bin assembly embodiment, taken through line 20-20 of FIG. 19.

Referring to FIG. 20, a section view of the stow bin assembly embodiment 1410 (FIGS. 14-19) taken through line 20-20 of FIG. 19, illustrates additional details. In an exemplary embodiment, stow bin assembly 1410 may include elements, such as the outside cover 1814 (FIG. 18), which may include a lip element 2005 for latching onto stow bin 1410 (FIGS. 14-19). Screws 1815 (FIG. 18) may be used to further secure outside cover 1814 (FIG. 18) to stow bin 1410 (FIGS. 14-19). Spray can holster 1414 may include a lip element 2015 for latching onto the stow bin 1410 (FIGS. 14-19). Screws 1822 (FIG. 18) may be used to further secure spray can holster 1414 (FIG. 18) to stow bin 1410 (FIGS. 14-19).

In an exemplary embodiment, stow bin assembly 1410 mounts to a lug or eyelet (not shown in FIG. 20) on the housing of the cable storage drum 1302 (FIGS. 13A-16). One or more springs 1824 hold the pair of slide pins 1826 in the inward, locked position, as shown. Two nested press tabs, such as press tab socket 1816 and press tab ball 1818 form a rounded button. The rounded button of the tabs 1816 and 1818 may be retained in a slot of the latch shroud 1812, which covers the latching mechanism. The opposite end of tabs 1816 and 1818 may be set against a shoulder of each of the slide pins 1826 (FIG. 18). When the rounded button is pressed downward, the tabs 1816 and 1818 exert an outward force to retract the slide pins 1826 (FIG. 18) from their locked position.

The stow bin assembly 1410 may be installed on the outer housing of the cable storage drum 1310 (FIGS. 13A-16) by pressing the button to retract the slide pins 1826 (FIG. 18) while setting the stow bin 1412 over the lug (not shown) disposed on the outer housing of the cable storage drum 1302 (FIGS. 13A-16). When the button is released, the slide pins 1826 (FIG. 18) engage the lug (not shown in FIG. 20) and hold the stow bin 1412 to the outer housing of the cable storage drum 1302 (FIGS. 13A-16). The slide pins 1824 (FIG. 18) may include angled, ramped ends that optionally cause them to retract when the stow bin 1412 is forcibly pressed against the mounting lug (not shown in FIG. 20). A channel in the interfacing surface (not shown) of the stow bin 1412 closely engages protruding features of the outer housing of the cable storage drum 1302 (FIGS. 13A-16).

Additional mounting stability may be provided by stretching the elastomer O-ring 1840, which may include loops 1842, such that the hooks 1717 engage the vents 1306 (FIGS. 13A-13C) and/or slots disposed on the outer housing of the cable storage drum 1302 (FIGS. 13A-16). To remove the stow bin 1410 (FIGS. 14-19), the hooks 1717 (FIGS. 17-19) may be disengaged, and the button may be pressed to retract the slide pins 1826 (FIG. 18) from the mounting lug (not shown in FIG. 10) on the outer housing of the cable storage drum 1302 (FIGS. 13A-16).

Figure 21:
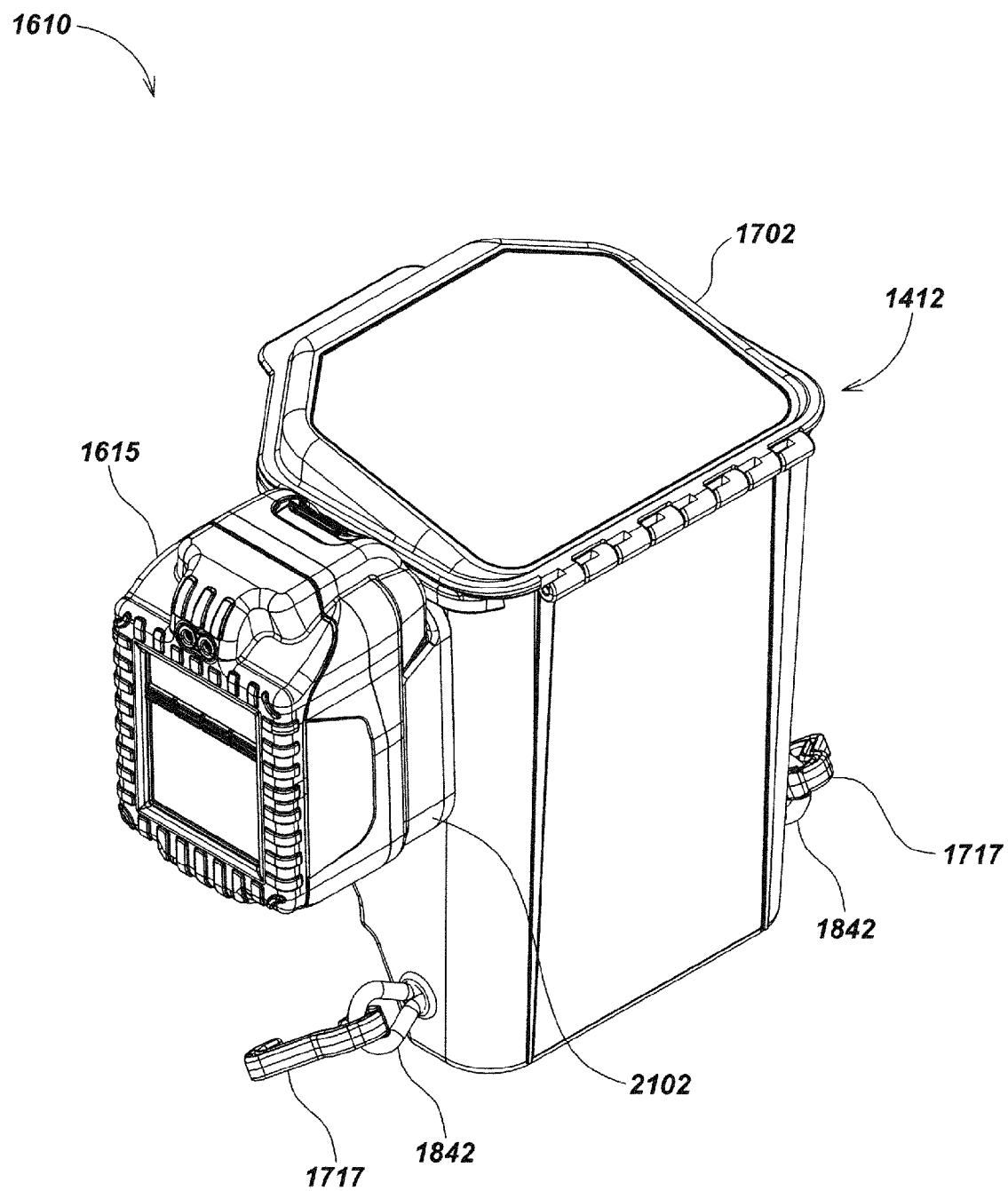
FIG. 21 illustrates details of an alternate embodiment of a stow bin assembly.

FIG. 21 illustrates details of an alternate embodiment stow bin assembly 1610 (FIG. 16). For example, in certain embodiments, stow bin assembly may include a battery shoe, such as a Lucid battery shoe 2102 coupled to stow bin shell 1832 (FIG. 18). A battery, such as Lucid battery 1615 (FIG. 16) may be mounted to Lucid shoe 2102. Lucid battery 1615 (FIG. 16) may be used to provide power to pipe inspection system 1300 (FIGS. 13A-13C) and/or associated battery usage data, or may be stowed for later use. In some embodiments, battery data may be provided to a wireless transmission module, such as a WiFi or other wireless module within the pipe inspection system, such as within the hub area. A wired battery data connection may be provided through a data cable and slip-ring assembly, such as slip-ring assembly 214 of FIG. 2.

Figure 22:
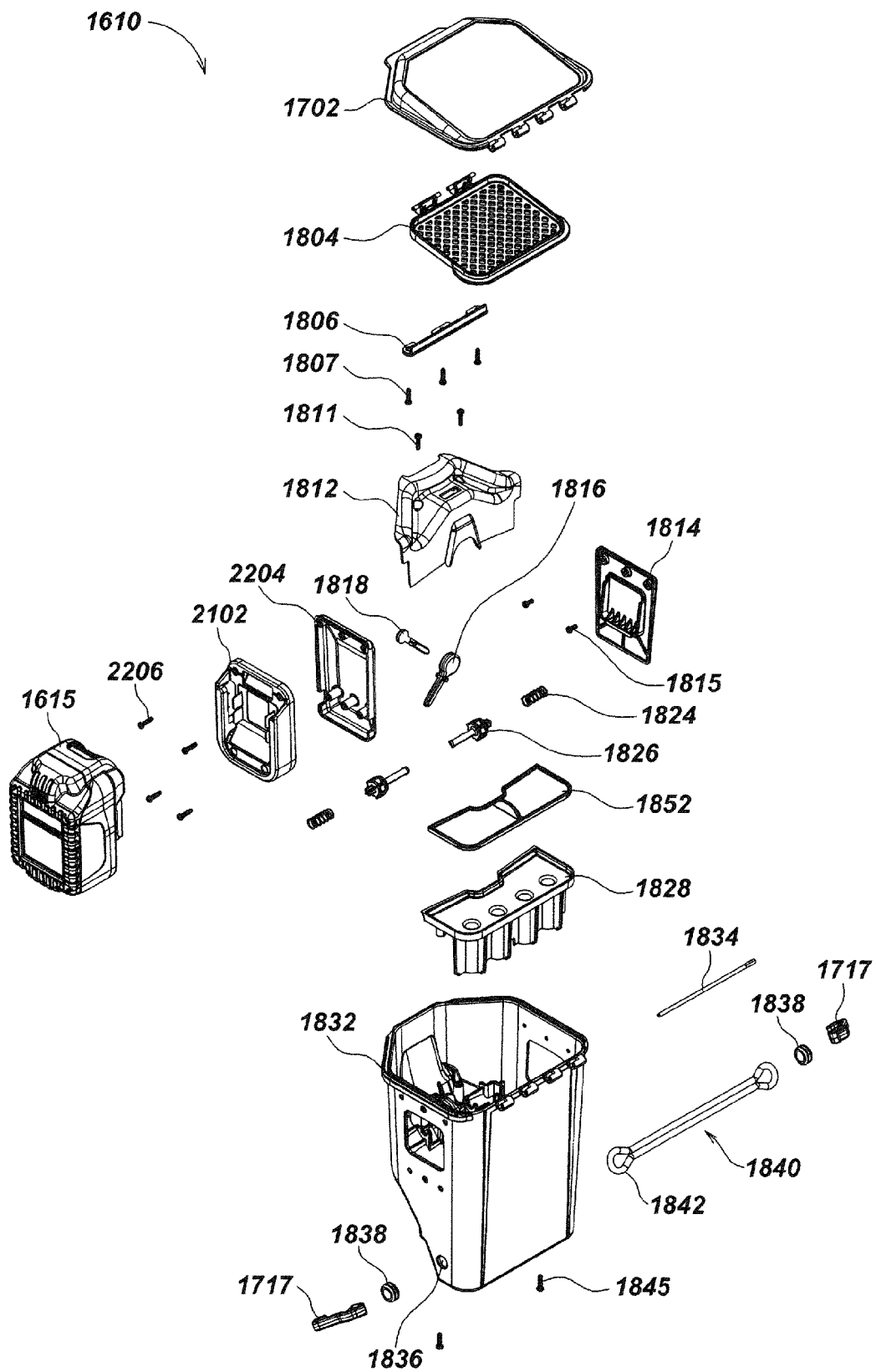
FIG. 22 is an exploded view of the alternate embodiment stow bin assembly of FIG. 21.

FIG. 22 is an exploded view of the alternate embodiment stow bin assembly 1610 of FIG. 21. Stow bin assembly 1610 may include a stow bin shell 1832 coupled with a stow bin lid 1702. Stow bin lid 1702 may swing open and closed along a hinge pin 1834 in the hinge formed (not shown in FIG. 22) between stow bin shell 1832 and stow bin lid 1702 when mated together. A hinged cover pouch 1804 may be disposed beneath the lid 1702 and secured by retainer 1806 and one or more fasteners, such as screws 1807 to provide a secondary compartment within stow bin 1412 for storing ancillary items, such as business cards or memory cards, and the like.

Stow bin assembly 1610 may also include a latch shroud, which may be mounted inside the stow bin 1412 with one or more fasteners, such as screws 1811. Stow bin assembly 1410 may also include a pair of nested press tabs, such as press tab socket 1816 and a press tab ball 1818, which may be coupled to one another to form a button. In assembly, the rounded button formed by the nested press tabs 1816 and 1818 may be retained in a slot of the latch shroud 1812. The opposite end of each tab 1816 and 1818 may be set against a shoulder of a slide pin, such as a pair of slide pins 1826. One or more springs, such as coil springs 1824 hold the slide pins 1826 in the inward, locked position. When the button is pressed downward, the tabs exert an outward force to retract the slide pins 1826 from their locked position.

A Lucid battery shoe 2102 (FIG. 21) may be coupled to stow bin 1412 with one or more elements. The battery shoe and associated Lucid battery and related components may be as described in co-assigned U.S. patent application Ser. No. 13/534,721, filed Jun. 25, 2012, entitled MODULAR BATTERY PACK APPARATUS, SYSTEMS, & METHODS and U.S. patent application Ser. No. 61/663,617, filed Jun. 25, 2012, entitled MODULAR BATTERY PACK APPARATUS, SYSTEMS, AND METHODS, INCLUDING VIRAL DATA AND/OR CODE TRANSFER which are incorporated by reference herein. For example, Lucid battery shoe 2102 (FIG. 21) may be mounted to an inside cover 2204, which may be mounted inside stow bin 1412. One or more fasteners, such as screws 2206, may be used to secure the Lucid shoe 2102 (FIG. 21) to the stow bin 1412, supported by inside cover 2204 A rechargeable battery, such as Lucid battery 1615 (FIGS. 16 and 21) may be mated with Lucid battery shoe 2102 (FIG. 21). The Lucid battery shoe 2102 may also be mounted in other locations on the portable inspection system in alternate embodiments.

An outside cover 1814 may be coupled to one side of stow bin shell 1832 with one or more fasteners, such as screws 1815. A stow tray 1828 and tray pad 1852 may be stacked and secured inside the bottom of stow bin shell 1832 with one or more fasteners, such as screws 1845. An O-ring, such as elastomer O-ring 1840, may include a loop at each end, such as loops 1842. Elastomer O-ring may be fed through a pair of holes 1836 formed in the stow bin shell 1832, and loops 1842 may be secured with a pair of grommets 1838. Hooks 1717 (FIG. 17) may each be fastened to one or more loops 1842.

Figure 23:
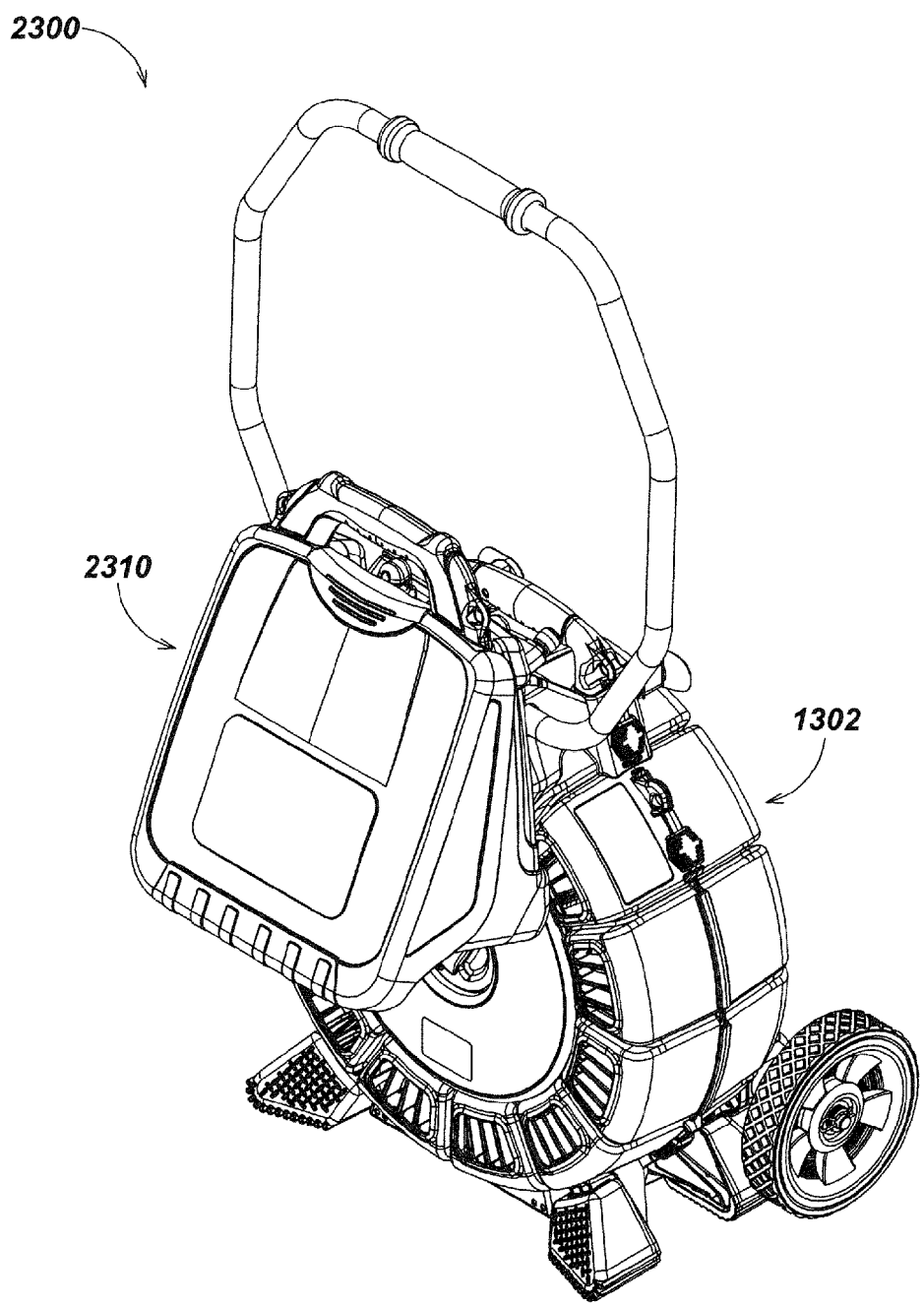
FIG. 23 is a wheeled pipe inspection system configured with a portable camera control unit.

FIG. 23 illustrates a wheeled pipe inspection system embodiment 2300 which may include a portable camera control unit 2310 configured with a cable storage drum 1302. For example, a portable CCU 2310, which may include a built-in monitor or display device, such as an LCD panel (not shown), may be removably attached to the external surface of the rear cable storage drum 1302 with a mounting element, such as pull-handle mount 1314 (FIGS. 13A-13C). For example, portable CCU 2310 may be hung onto the top of handle mount 1314 (FIGS. 13A-13C). The CCU 2310 and/or other inspection system components may be powered by a Lucid battery and associated shoe and related components such as described previously herein.

Figure 24:
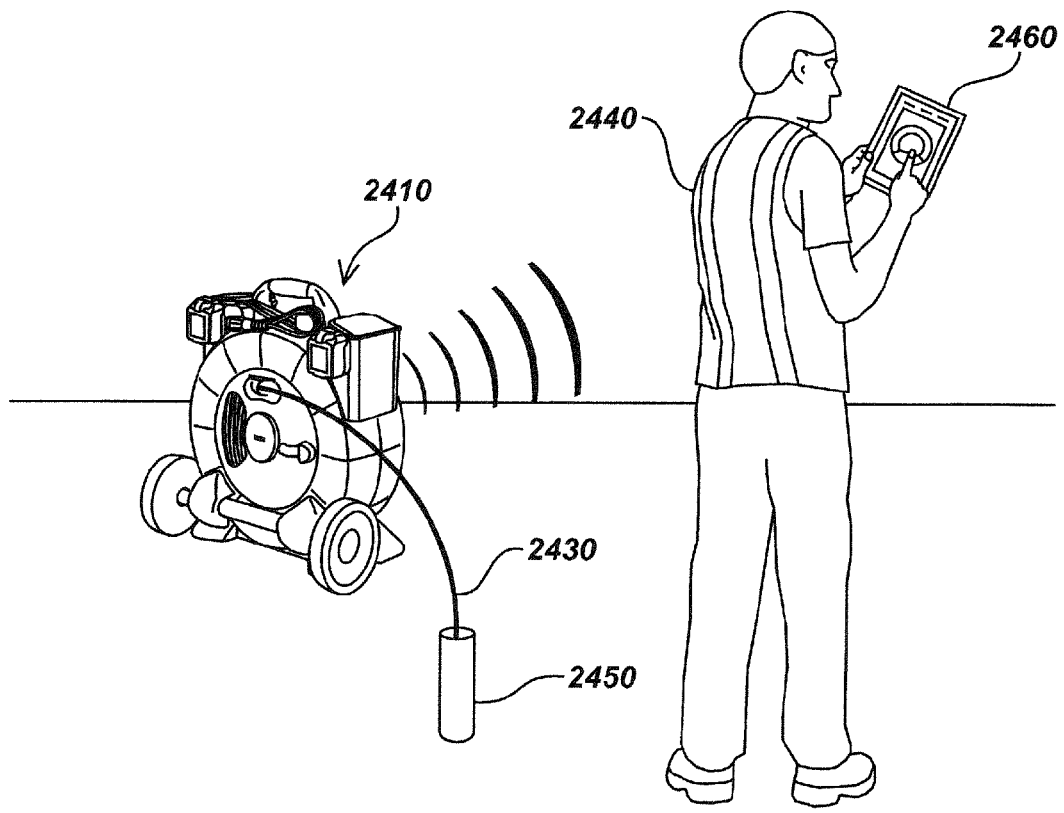
FIG. 24 illustrates a user performing a pipe inspection using an exemplary embodiment of a portable pipe inspection system.
Figure 24:
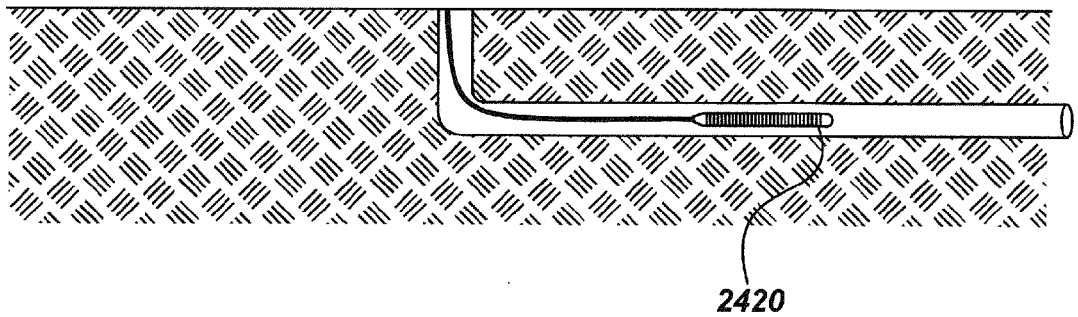

FIG. 24 illustrates a user performing a pipe inspection with a portable pipe inspection system, which may include a cable storage drum 2410. In an exemplary embodiment, cable storage drum 2410 may include an inspection camera 2420 (or other inspection camera device) attached to the end of a push-cable 2430. A user 2440 may insert the push cable 2430, which may be attached or integral to inspection camera 2420, into a pipe 2450. A wireless local area network connection may be established between the cable storage drum 2410 and an electronic computing device 2460 (e.g., a tablet, notebook computer, smart phone, etc.) using a variety of wireless technologies such as, for example, WLAN and Bluetooth. The computing device 2460 may then be used to view data from and control aspects of the inspection camera 2420.

Figure 25A:
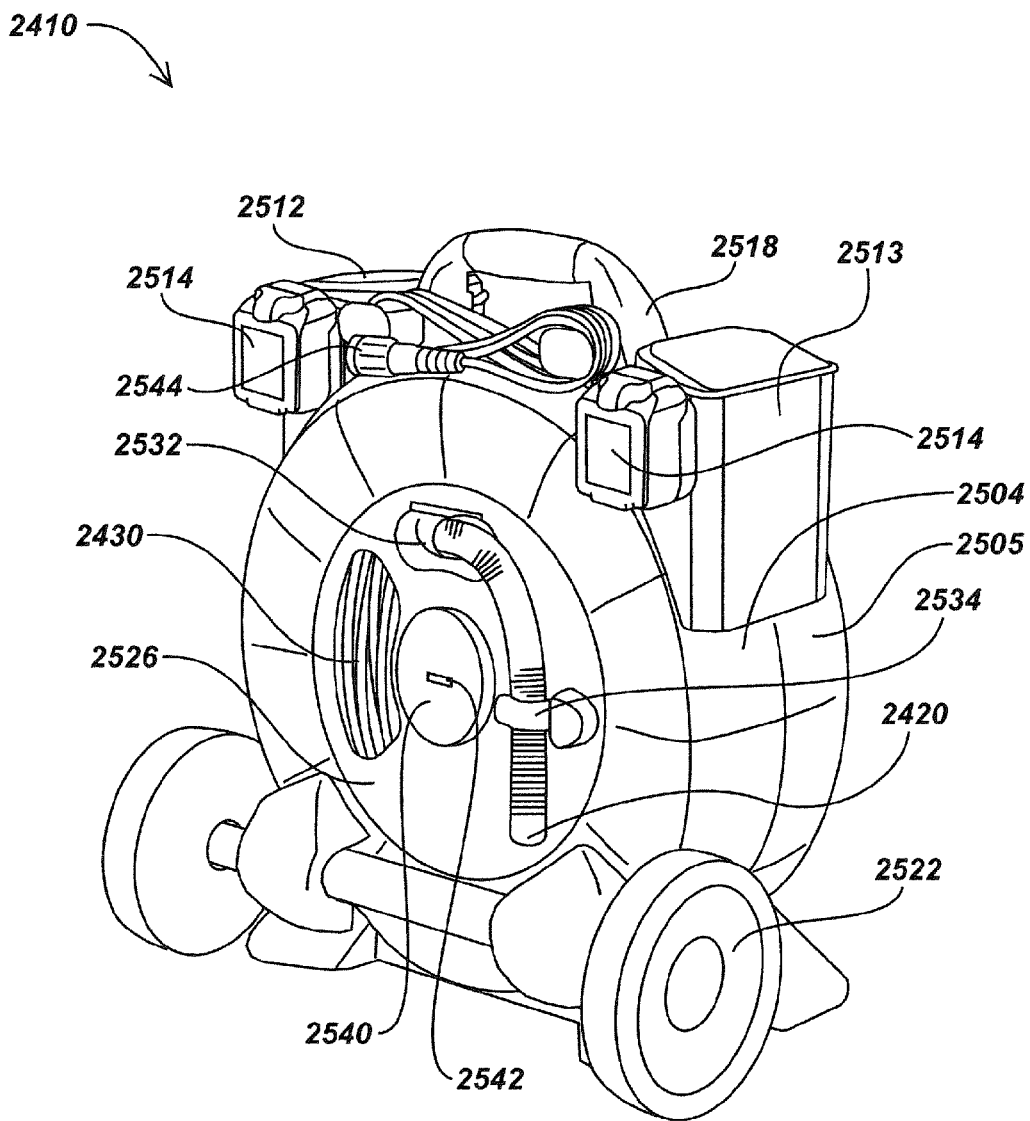
FIG. 25A illustrates details of the pipe inspection system embodiment of FIG. 24.
Figure 25B:
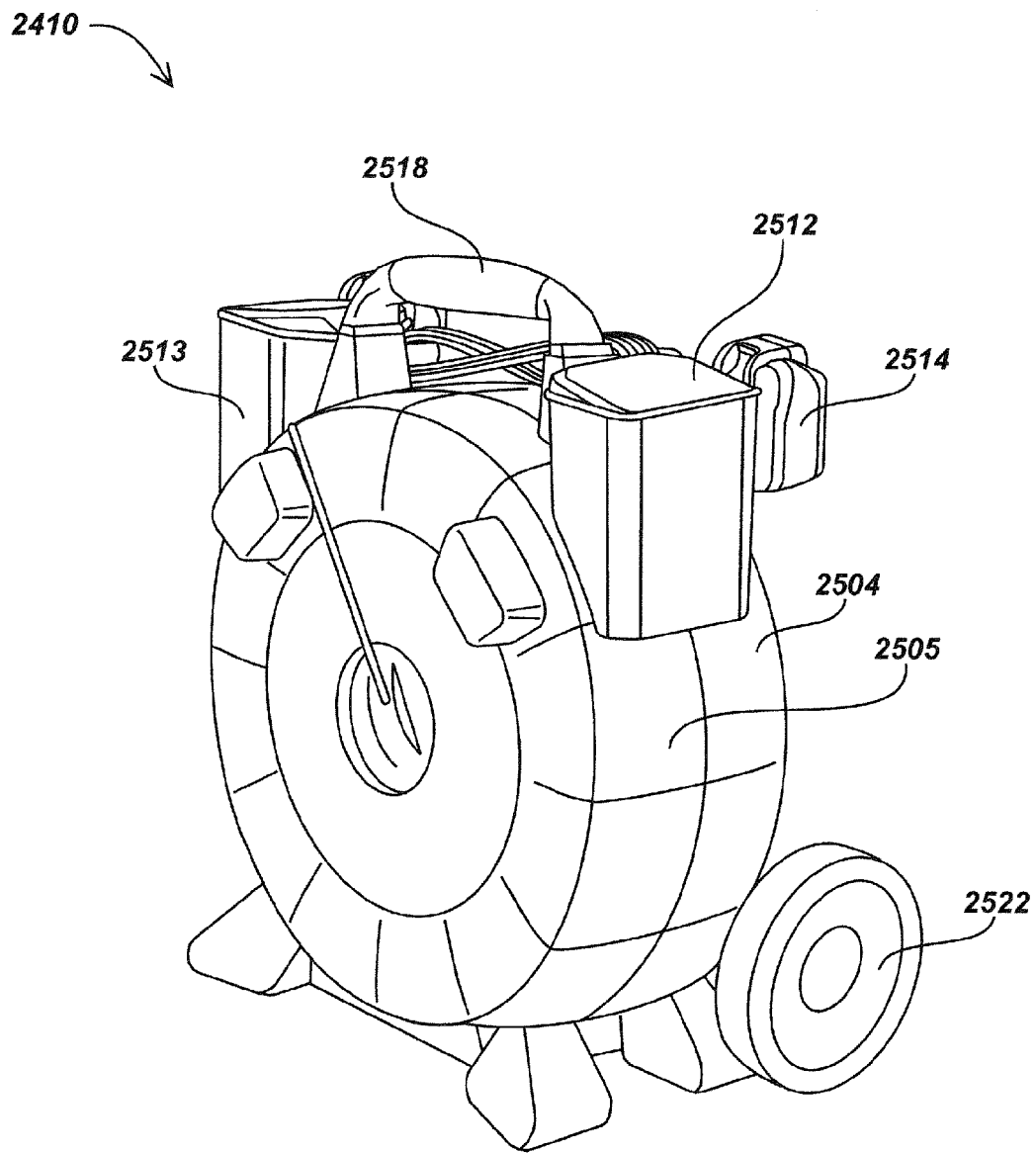
FIG. 25B illustrates details of the pipe inspection system embodiment of FIGS. 24 and 25A.

FIGS. 25A and 25B illustrate details of the pipe inspection system embodiment of FIG. 24. For example, the cable storage drum 2410 may include a front shell half 2504 and a back shell half 2505. A handle, such as handle 2518, may be disposed on top of the cable storage drum 2410. A wired connector 2544 may optionally be included to connect a computing device in accordance with various aspects and features disclosed herein. For example, the wired connector 2544 may allow a computing device to connect to a local area network (LAN) connection hosted by the cable storage drum 2410, or may alternatively allow the cable storage drum 2410 to connect to a LAN hosted by the computing device. The LAN may be an Ethernet connection or other wired network connection device.

The wired connector 2544 may also permit connection of a traditional camera control unit (not shown) to the cable storage drum 2410. Various aspects and details regarding camera control units as used with pipe inspection systems are described in co-assigned patent applications, including, for example, U.S. Patent Application Ser. No. 61/607,510, entitled DUAL SENSED LOCATING SYSTEMS & METHODS, filed Mar. 6, 2012; U.S. Patent Application Ser. No. 61/602,065, entitled DOCKABLE TRIPODAL CAMERA CONTROL UNIT, filed on Feb. 22, 2012; U.S. Patent Application Ser. No. 61/430,932, entitled PORTABLE CAMERA CONTROLLER PLATFORM FOR USE WITH PIPE INSPECTION SYSTEM, filed on Jan. 7, 2011; and U.S. Provisional Patent Application Ser. No. 61/152,662, entitled HIGH PERFORMANCE PIPE INSPECTION SYSTEM, filed Feb. 13, 2009. The content of each of these applications is hereby incorporated by reference herein in its entirety for all purposes.

A wheel assembly 2522 may be located at the bottom of the cable storage drum 2410 to facilitate transport. A central hub plate 2526 may be secured to the sides of the cable storage drum 2410 that largely conceal some or all of the push-cable 2430 and the inspection camera 2420 when in use or not in use. One or more cable feed holes 2532 may be formed through the central hub plate 2526 such that, when the cable storage drum 2410 is in use, may allow the push-cable 2430 and the inspection camera 2420 to pass through. A camera stowage clip 2534 may be formed on the surface of the central hub plate 2526 such that an inspection camera may be stored under the camera stowage clip 2534 when not in use.

The cable storage drum 2410 may also include a wireless transceiver module 2540 enabled to transmit and receive signals via wireless LANs such as WiFi, or other wireless connections such as Bluetooth, cellular data connections, or other wireless data communication technology. In some embodiments, a wired transceiver module (e.g., in the alternative to the wired connector 2544) may replace or be used in conjunction with the wireless transceiver module 2540 to establish a wired local area network connection between one or more computing devices and a smart cable storage drum such as the cable storage drum 2410. A USB port 2542 or other suitable wired input/output port may also be included to permit additional data exchange.

The cable storage drum 2410 may include one or more stow bins, such a left stow bin 2512 and a right stow bin 2513, to serve as a connector for one or more batteries, such as Lucid batteries 2514 for providing electrical power to the cable storage drum 2410. A lid on top of stow bins 2512 and 2513 may provide access to storage for tools, extra batteries, or other job-related items within the stow bins 2512 and 2513. Various aspects and details regarding Lucid batteries, which may be used with pipe inspection systems are described in co-assigned patent applications, including, for example U.S. patent application Ser. No. 13/532,721, entitled MODULAR BATTERY PACK APPARATUS, SYSTEMS, AND METHODS, filed Jun. 25, 2012, and U.S. Patent Application Ser. No. 61/663,617, entitled MODULAR BATTERY PACK APPARATUS, SYSTEMS, AND METHODS, INCLUDING VIRAL DATA AND/OR CODE TRANSFER, filed Jun. 25, 2012, the contents of which are incorporated by reference herein. In some embodiments, different types of batteries and/or a wired connection to the electrical grid may be used to provide power to a cable storage drum, such as cable storage drum 2410.

Figure 26:
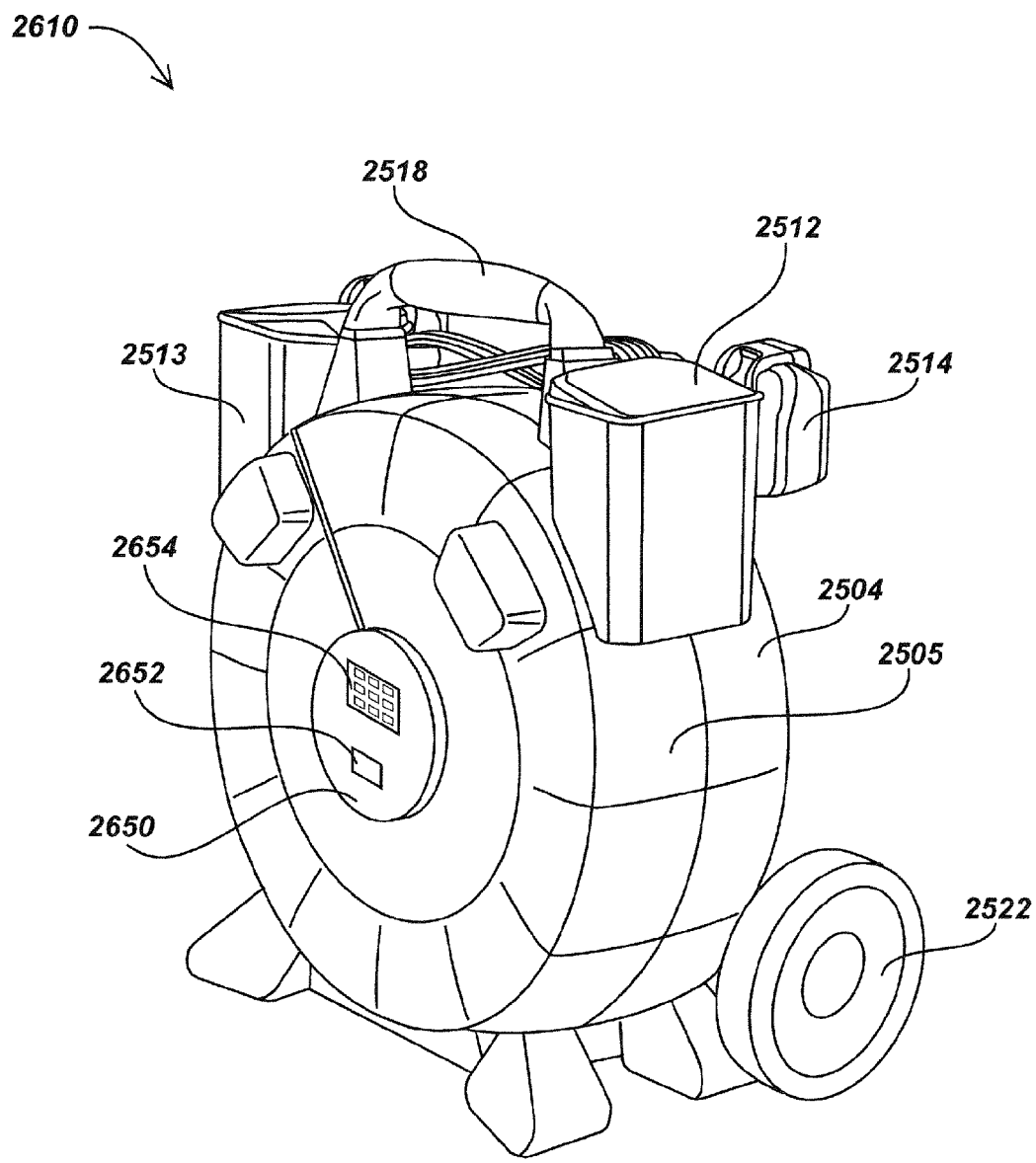
FIG. 26 illustrates details of an embodiment of a user interface device configured with a pipe inspection system.

FIG. 26 illustrates details of an alternate embodiment cable storage drum 2610 configured with a user interface device. For example, cable storage drum 2610 may include a slip-ring hub 2650 that may be used to house various electronics and controls. For example, a small keypad 2654 and USB or other communication port 2652 may be integrated with the slip-ring hub 2650. The slip-ring hub 2650 may house a network transceiver (e.g., a WLAN transceiver), a compressor, and other components.

Figure 27:
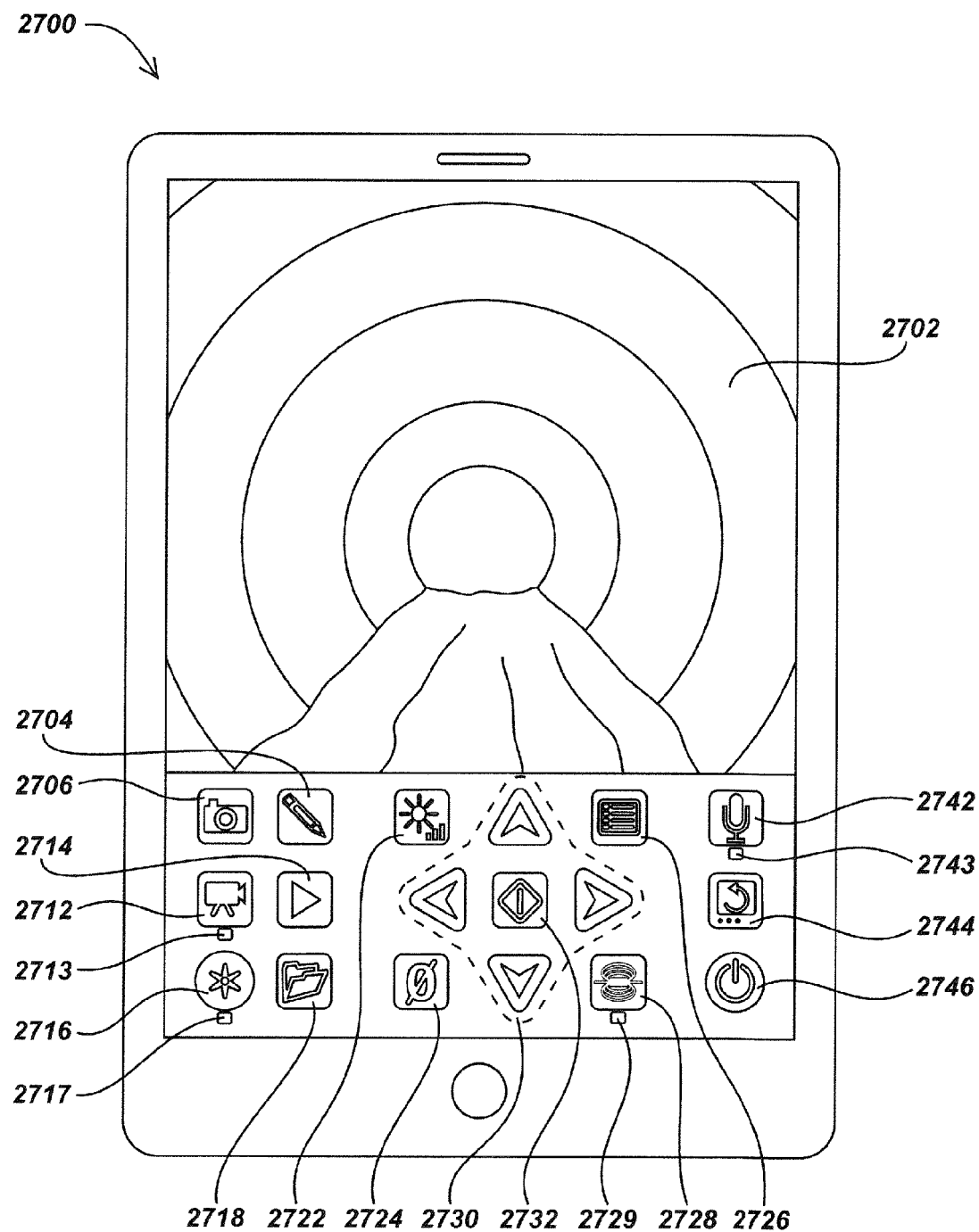
FIG. 27 illustrates details of an embodiment of a user interface device.

FIG. 27 illustrates details of an embodiment of a control interface 2700 for a computing device, such as the computing device 2460 of FIG. 24. As shown, the control interface 2700 may include a viewing area 2702 for viewing video and/or other data. The control interface 2700 may also include various on-screen controls and menu options that are selectable by a user operating a touchscreen display input, mouse, keyboard or other mechanisms for selecting a presented control/menu option.

Examples of controls and menu options may include: a Photo Button 2706 which, when selected, causes the inspection camera 2420 (FIG. 24) to capture a snapshot of the present camera view; a Video Button 2712 which, when selected, may start and stop video recording at the inspection camera 2420 (FIG. 24); and an Auto-logging Button 2716 which, when selected, may start and stop the capture of a series of timed still images from the inspection camera 2420 (FIG. 24). Upon activation of the Auto-logging Button 2716, auto-log mode may be turned on at the drum 2410 (FIG. 24), and audio inputted by the user may also be captured.

Furthermore, the control interface 2700 may include: a Photo Tag Button 2704, which may trigger the inspection camera 2420 (FIG. 24) to capture a snapshot of the camera view and then open an editing screen area for enabling annotation of the photo with text and/or audio comments by a user; a Job Review Button 2714, which may open a review screen area for reviewing captured video, snapshots, and/or audio elements, and/or for allowing notation to be added to video; and a Job Manager Button 2718, which may open a menu that permits the user to generate a report, select an existing report file to view from a listing of existing files (e.g., stored locally or at an external database), and/or eject or otherwise disconnect a device from the cable storage drum 2410 (FIG. 24), such as for example, a USB device from the USB port 2542 (FIG. 25A).

The control interface 2700 may also include: an LED Brightness Button 2722, which may provide for an adjustment of the level of illumination from LEDs on the inspection camera; and a Zero Button 2724, which may allow a user to reset the zero-point of a cable distance counter on the smart cable storage drum or to cancel the use of a relative zero point.

A series of Arrow Buttons 2730 may also be included and be used to traverse menus and screens shown on the display of the computing device 2460 (FIG. 24). A Select Button 2732 may be used to activate a selection in such a menu. Other controls include: a Menu Button 2726, which provides configuration choices to a user; a Sonde Button 2728, which may start and stop operation of a sonde transmitter; a Microphone Button 2742, which may activate audio recording for use in recording descriptive commentary; an Image Flip Button 2744, which may be used to flip the vertical orientation of the screen image while mirroring the screen image horizontally for use when the camera has been rotated within a pipe; and a Power Button 2746, which may be used to activate the inspection camera 2420 (FIG. 24) and/or other inspection devices, for instance, from a sleeping state after a period of non-use.

Along with the various controls, a series of indicators may appear on-screen to notify a user of various parameters and statuses associated with the inspection camera 2420 (FIG. 24) and/or other components of the cable storage drum 2410 (FIG. 24). These indicators may include: a Video Indicator 2713, which may be located under the Video Button 2712, and may be used to indicate the state of video capture in progress or captured video under processing; an Auto-log Indicator 2717, which may be located under the Auto-logging Button 2716, and may be used to indicate that auto-logging is in progress; a Microphone Indicator 2743, which may be located under the Microphone Button 2742, and may be used to indicate when audio recording is in progress; and a Sonde Indicator 2729, which may be located under the Sonde Button 2728, and may be used to indicate the state of a Sonde when transmitting or not transmitting. Other functions and features may be incorporated into the user interface to permit control of other inspection devices.

One of skill in the art will appreciate various methods for receiving user control input, including user control inputs via voice-activation. Similarly, other kinds of switching devices may be used than those described herein while keeping within both the spirit and scope of the invention.

Figure 28:
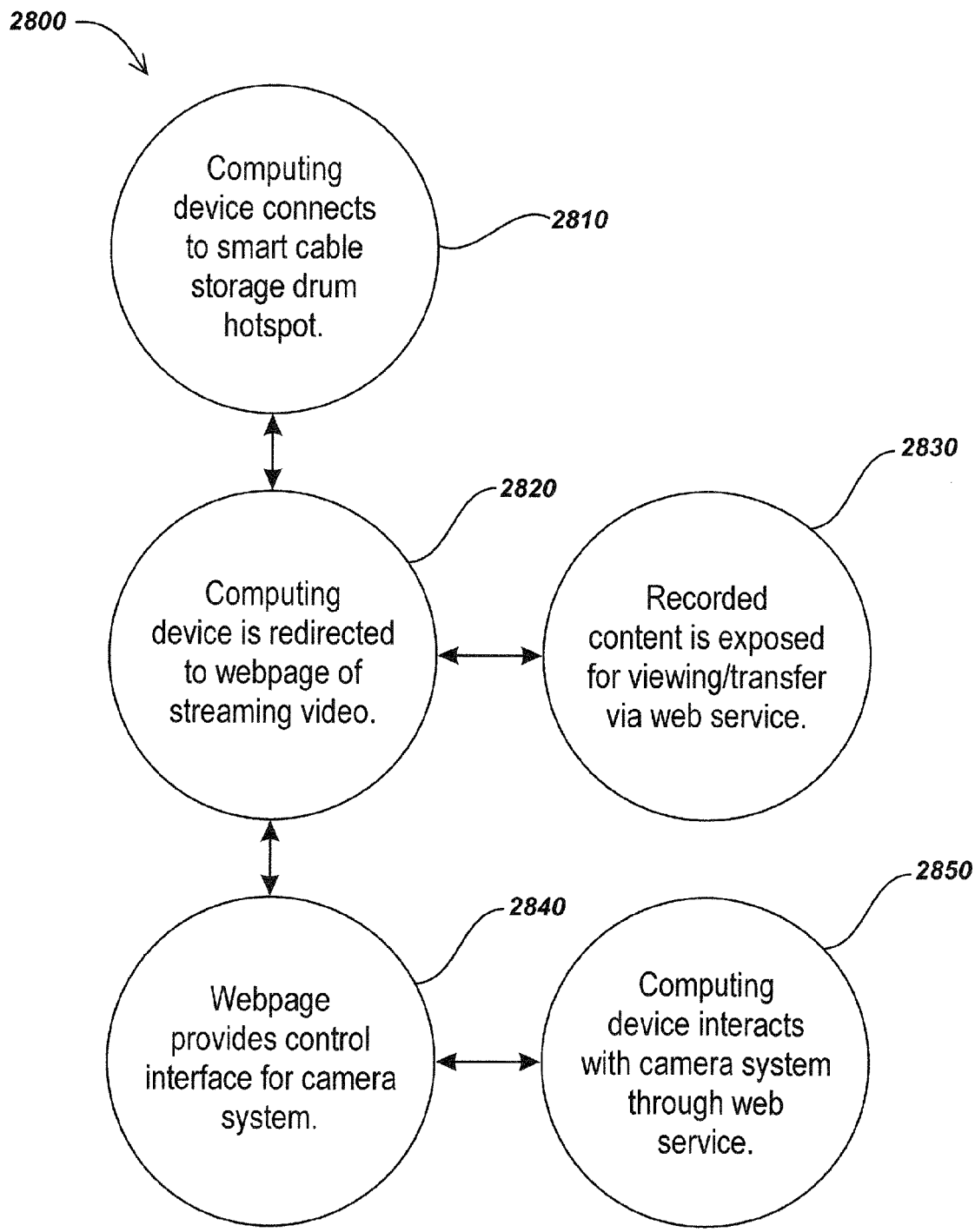
FIG. 28 is a flow chart illustrating an exemplary method for communicating data and instructions between a user interface device and a cable storage drum.

FIG. 28 is a flow chart illustrating an embodiment of a process 2800 for using a computing device (e.g., the computing device 2460 of FIG. 24) to view content from a smart cable storage drum, and to control certain aspects of the smart cable storage drum (e.g., the cable storage drum 2410 of FIG. 24). At stage 2810, the computing device may connect to a local area network associated with the cable storage drum (e.g., via a WLAN hotspot). At stage 2820, the computing device may access and download a webpage configured to present information, such as, for example, video or other visual representation, captured by an inspection camera (e.g., the inspection camera 2420 of FIG. 24) inside a pipe or other hard-to-access area. At stage 2830, any recorded content may be received from the inspection camera and made available for viewing via a suitable web service. At stage 2840, the webpage from stage 2820 may provide a control interface. Activation of one or more controls of the control interface may control certain operations of the inspection camera system. At a stage 2850, the computing device may interact with the inspection camera system through the web service.

Figure 29:
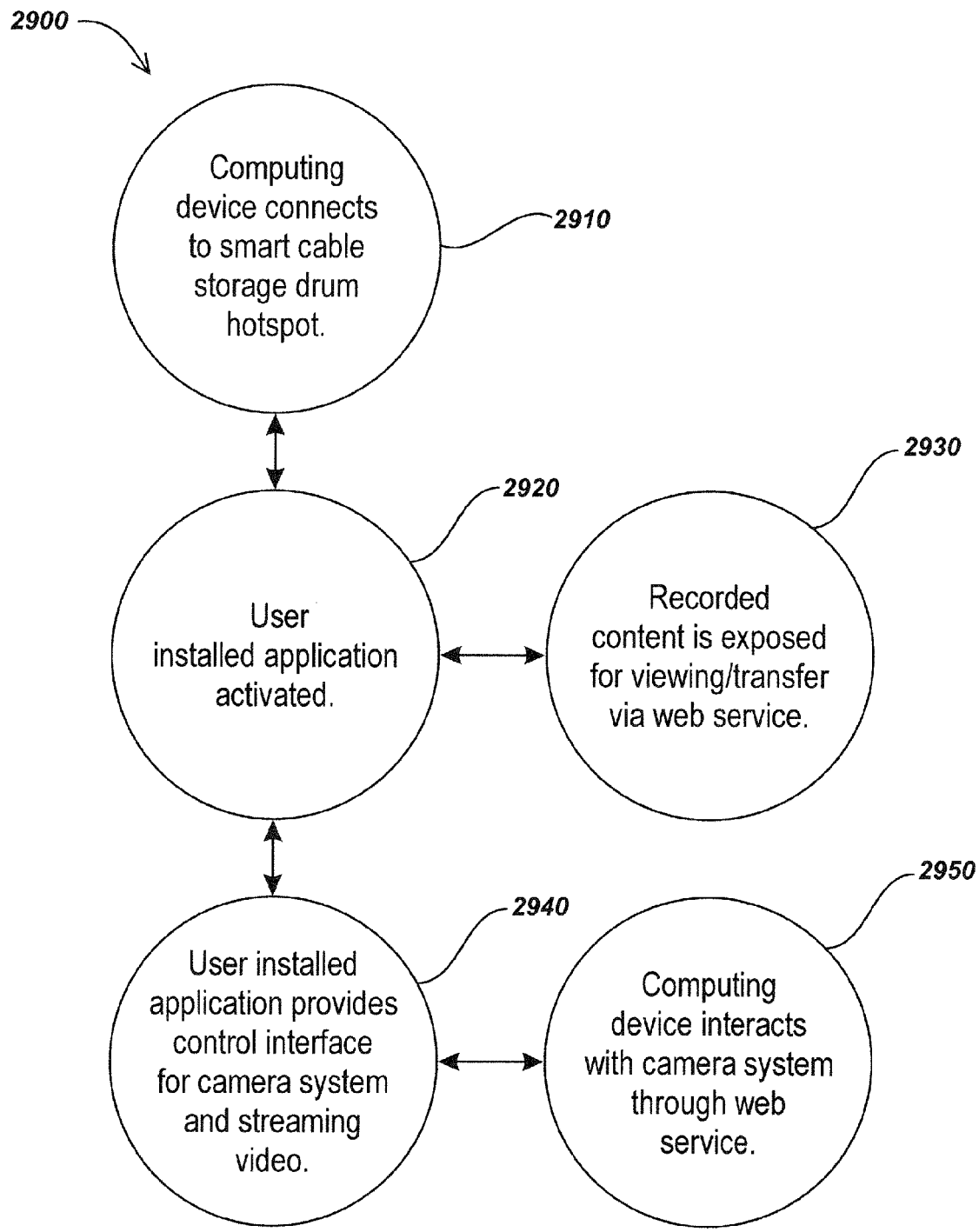
FIG. 29 is a flow chart illustrating an alternate method for communicating data and instructions between a computing device and a cable storage drum.

FIG. 29 is a flow chart illustrating an embodiment of a process 2900 for using a computing device (e.g., the computing device 2460 of FIG. 24) to view content from a smart cable storage drum, and to control certain aspects of the smart cable storage drum (e.g., the cable storage drum 2410 of FIG. 24). At stage 2910, the computing device may connect to a local area network associated with the cable storage drum (e.g., via a WLAN hotspot). At stage 2920, the computing device may activate an installable software application configured to present information, such as, for example, video or other visual representation, captured by an inspection camera (e.g., the inspection camera 2420 of FIG. 24) inside a pipe or other hard-to-access area. At stage 2930, any recorded content may be received from the inspection camera (e.g., via a suitable web service or the network) and made available by the software application for viewing. At stage 2940, the software application from stage 2920 may provide a control interface. Activation of certain controls of the control interface may control certain operations of the inspection camera system. At stage 2950, the computing device may interact with the inspection camera system through the web service or network.

One of skill in the art will appreciate various methods for receiving user control input, including user control inputs via voice-activation. Similarly, other kinds of switching devices may be used than those described herein while keeping within both the spirit and scope of the invention.

FIG. 28 is a flow chart illustrating an embodiment of a process 2800 for using a computing device (e.g., the computing device 2460 of FIG. 1) to view content from a smart cable storage drum, and to control certain aspects of the smart cable storage drum (e.g., the cable storage drum 2410 of FIG. 24). At stage 2810, the computing device may connect to a local area network associated with the cable storage drum (e.g., via a WLAN hotspot). At stage 2820, the computing device may access and download a webpage configured to present information, such as, for example, video or other visual representation, captured by an inspection camera (e.g., the inspection camera 2420 of FIG. 24) inside a pipe or other hard-to-access area. At stage 2830, any recorded content may be received from the inspection camera and made available for viewing via a suitable web service. At stage 2840, the webpage from stage 2820 may provide a control interface. Activation of one or more controls of the control interface may control certain operations of the inspection camera system. At a stage 2850, the computing device may interact with the inspection camera system through the web service.

FIG. 29 is a flow chart illustrating an embodiment of a process 2900 for using a computing device (e.g., the computing device 2460 of FIG. 1) to view content from a smart cable storage drum, and to control certain aspects of the smart cable storage drum (e.g., the cable storage drum 2410 of FIG. 24). At stage 2910, the computing device may connect to a local area network associated with the cable storage drum (e.g., via a WLAN hotspot). At stage 2920, the computing device may activate an installable software application configured to present information, such as, for example, video or other visual representation, captured by an inspection camera (e.g., the inspection camera 2420 of FIG. 24) inside a pipe or other hard-to-access area. At stage 2930, any recorded content may be received from the inspection camera (e.g., via a suitable web service or the network) and made available by the software application for viewing. At stage 2940, the software application from stage 2820 may provide a control interface. Activation of certain controls of the control interface may control certain operations of the inspection camera system. At stage 2950, the computing device may interact with the inspection camera system through the web service or network.

FIGS. 28 and 29 illustrate flow charts describing two exemplary processes for enabling a computing device to view content from a smart cable storage drum, and to control certain aspects of a smart cable storage drum. One of skill in the art will appreciate various alternative processes for enabling such a computing device to view content from various resources in a system, including one or more inspection devices, other computing devices, and remote databases. Having access to content from various system resources enables a user of the computing device to enrich content received from an inspection device, correlate content from multiple resources, and better coordinate the efforts of one or more users in the system. Moreover, having access to content using one or more networks permits one or more users on the network(s) to view, manipulate, control the capture of, and manage the distribution of content from various locations and at various times.

For example, an electronic computing device, such as a personal computer, tablet device, smart phone, or other computing device, may access inspection data from a cable storage drum via a wired or wireless network (e.g., LAN, WLAN, cellular network, Internet, etc.), which may include a network hub disposed on or within the portable inspection device, such as within a hub of the cable storage drum or elsewhere in the cable storage drum. The computing device may also access related data from another system resource (e.g., another cable storage drum or inspection device, another computing device, or a backend database). Similarly, the cable storage drum may access the related data from the same resources. The computing device may then display the inspection data and/or the related data. A user at the computing device may also edit the displayed data and/or create data, and may distribute those edits and create data to the other resources in the system. The user may also control, over the network, any of the networked resources. Similarly, other users may also control any of the networked resources.

Figure 30:
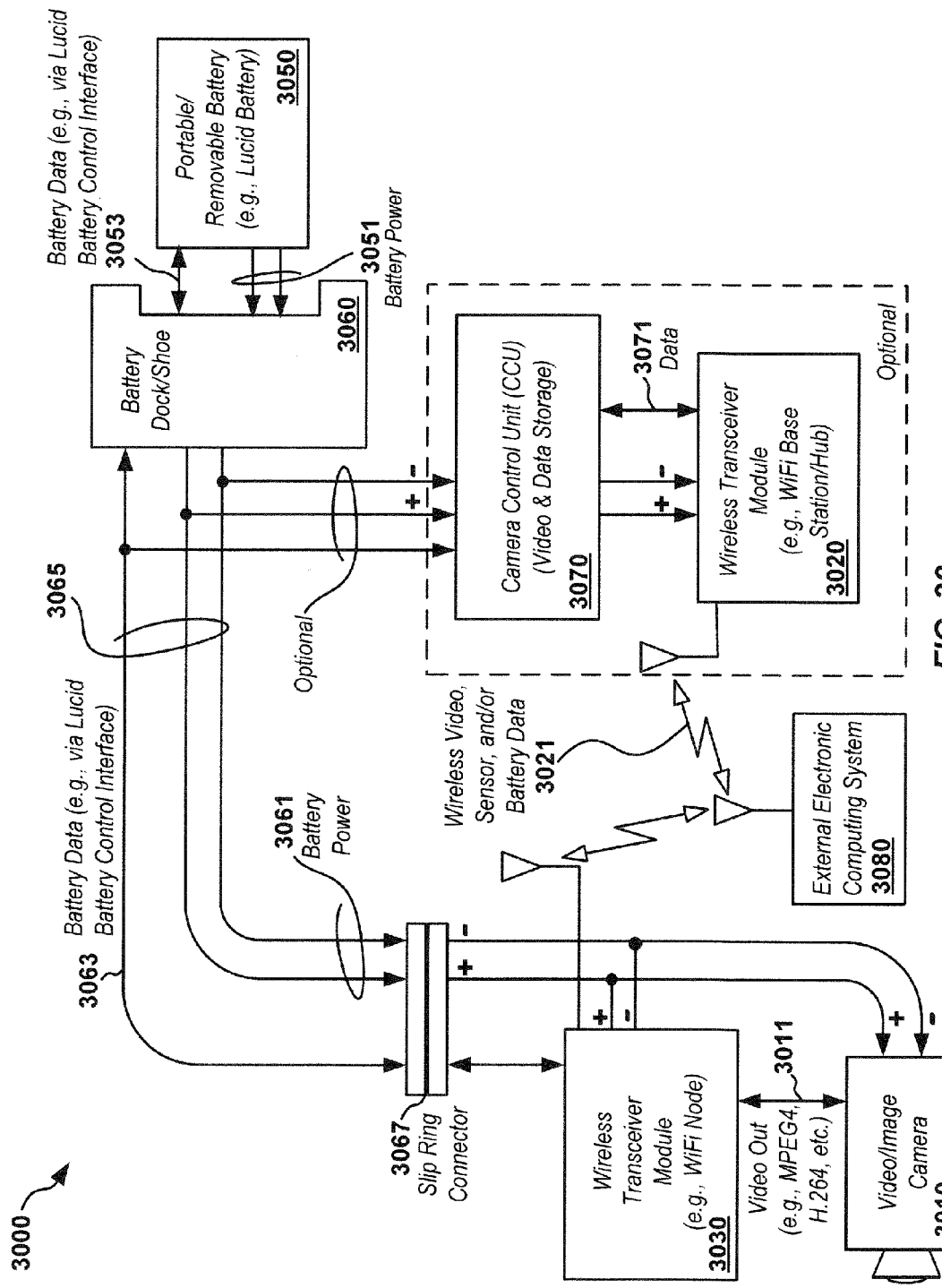
FIG. 30 illustrates details of an embodiment of connections between a Lucid battery and a wireless transceiver module in a portable inspection system such as shown in FIG. 1.

FIG. 30 illustrates details of an embodiment 3000 of a data transfer system between a battery and battery shoe disposed on or within the portable inspection system and a wireless transceiver disposed therein, such as in the hub or elsewhere in the inspection system. A battery 3050, which may be a standard rechargeable or single use battery or, in an exemplary embodiment, an intelligent or Lucid rechargeable battery such as described in U.S. patent application Ser. No. 13/532,721, entitled MODULAR BATTERY PACK APPARATUS, SYSTEMS, AND METHODS, filed Jun. 25, 2012, and U.S. Patent Application Ser. No. 61/663,617, entitled MODULAR BATTERY PACK APPARATUS, SYSTEMS, AND METHODS, INCLUDING VIRAL DATA AND/OR CODE TRANSFER, filed Jun. 25, 2012, may be coupled to a battery dock or shoe 3060 or other battery connection element. The battery may supply power to the portable inspection device through the shoe to power electronics, video cameras, such as camera 3010, wired or wireless transceivers, such as transceiver 3030, as well as other elements, such as a camera control unit (CCU) 3070, other wireless devices either in the portable inspection system or in other electronic computing devices, such as a second wireless transceiver 3020 as shown connected to the CCU 3070, and/or other components of the portable inspection system not shown in FIG. 30. In an exemplary embodiment, the wireless transceiver 3030 is a WiFi or other wireless LAN hub, node, or base station and is positioned in the cable storage drum, such as inside the cable storage drum hub, with the slip-ring connector 3067 used to provide electrical power and data signaling to the hub.

In operation, battery data may be provided from the battery 3050 through connection 3053 to the battery shoe 3060. The data may be passed directly through the shoe or may be modified by the shoe 3060 or other data format converter elements (not shown in FIG. 30) to reformat, change physical layer protocols, and the like, before being transferred through connection 3063 from the battery shoe 3060 to the wireless transceiver 3030 via an electrical connection (or optionally through other connections such as optical connections and/or wireless connections in alternate embodiments). Power may be supplied from the battery 3050 via power connection 3051 to shoe 3060, and then through electrical power connection 3061. Power may be further provided to camera 3010 and/or other devices through connection 3061 (not shown).

A slip-ring connector 3067 may be used in exemplary embodiments to provide power to the transceiver 3030 and/or camera 3010 through the hub while allowing the hub to rotate relative to the housing, however, in other embodiments alternate data connection mechanisms or direct wiring may be used between the battery shoe and transceiver. In an exemplary embodiment, a three wire connection 3065 as shown may be used to transfer both data and power between the battery shoe 3060 and transceiver 3030. However, other numbers of conductors may be used in various embodiment to provide either serial or parallel data as well as DC power (e.g., as positive and negative leads). Likewise, in an exemplary embodiment the slip-ring may be a three conductor slip-ring connector, but in alternate embodiments may include more than three connection paths depending on the provided power and data signaling (e.g., in embodiments with more than one voltage power supply, multi-conductor data signaling, etc.).

Image, audio, and/or video data and related information may be transferred from the camera 3010 to the wireless transceiver 3030. The video may be compressed in the camera in a video compression module (not shown) to compressed formats such as MPEG4, H.264, and the like to reduce required transmission bandwidth. Video, audio, images, battery data, and/or other data or information may be transmitted wirelessly via connection 3021 from transceiver 3030 to another wireless node, such as to optional wireless transceiver module 3020 or to other wireless nodes, such as nodes on other external electronic computing devices 3080 such as portable or notebook computers, tablets, smart phones, and the like. In an exemplary embodiment, the CCU 3070 as shown may be replaced by functionality implemented on the external electronic computing device 3080, which may communicate wirelessly with transceiver 3030 to send and receive data, video, images, audio, control signaling, battery status and charge information, and the like. In embodiments where a CCU such as CCU 3070 is used, the CCU may receive battery data directly from the dock/shoe 3060 (connection not shown) and/or may receive data wirelessly from transceiver 3030 through transceiver 3020 or via other wired or wireless connections (not shown).

A data connection 3071 may be included between transceiver module 3020 and CCU 3070, which may be used to provide video data to a display, storage, and/or wired or wireless transmitter on the CCU for providing the data to external electronic computing devices and/or CCU 3070. The external computing device 3080 and/or CCU 3070, may also provide a display, such as on the LCD or other display device, of the received video, and may further provide a display of battery data or information provided from transceiver 3030, as well as other data or information generated by the portable inspection system. Audio from the camera 3010, and/or other audible outputs, such as battery status or charge level information, or other system information, may be provided by a speaker or headphone output of the CCU 3070 and/or external computing device 3080.

Figure 31:
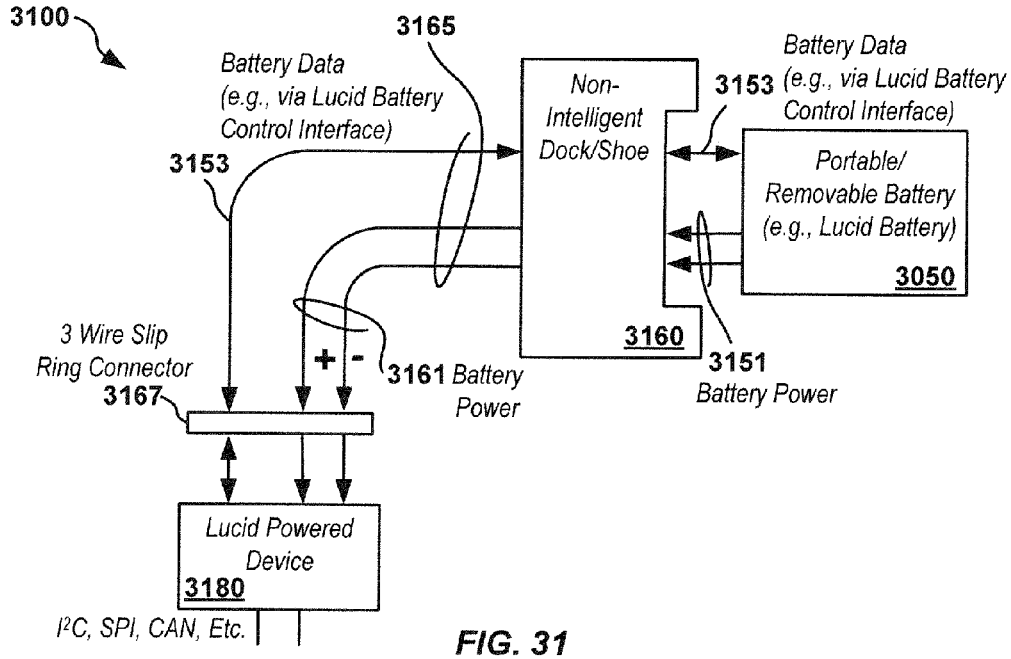
FIG. 31 illustrates details of an embodiment of a Lucid battery connection to a non-intelligent battery dock/shoe.

FIGS. 31-34 illustrate details of example embodiments of data transfer systems as may be used with various combinations of battery types (e.g., intelligent or non-intelligent or "dumb" batteries and corresponding battery docks/shoes). For example, FIG. 31 illustrates an embodiment 3100 of a three wire connection 3165 between a non-intelligent shoe 3160 having a portable intelligent battery 3050 connected to it. In this case, battery data is transferred from connection 3153 directly through the shoe (if a direct connection is available in the particular shoe in use) and then transferred, along with DC power via connections 3151 and 3161 to the optional slip-ring connection 3267, which may correspond with slip ring 3167 of FIG. 30 (or data may be transferred directly to a transceiver and/or other connected devices if no slip-ring is used). Embodiment 3100 assumes that the transceiver is configured to receive battery data in the format and protocol of the battery (e.g., a Lucid enabled or other intelligent battery data format). The other half of the slip ring connector 3167 may provide further connections of power and data to an intelligent (e.g., Lucid) compatible device) 3180, which may be a compatible wireless node such as transceiver 3030, and/or other components such as camera or other electronics or powered elements (not shown). Slip-ring connector 3167 may be a three conductor connector in an exemplary embodiment, but other connector types and configurations with different numbers of conductors may be used in various embodiments.

Figure 32:
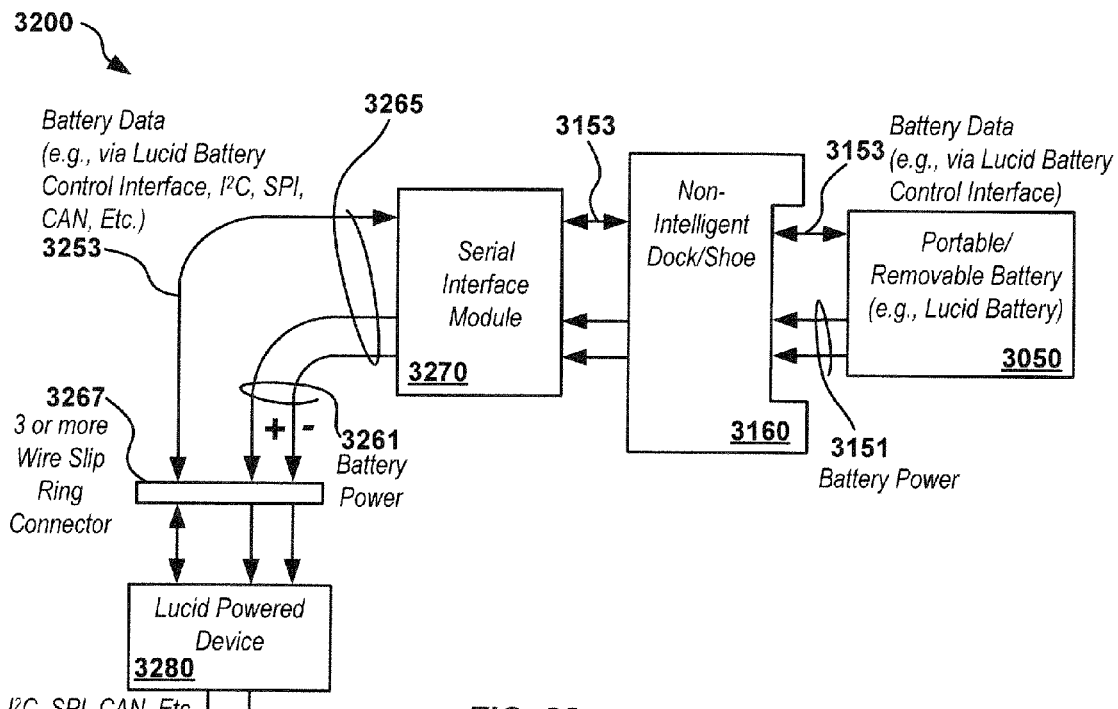
FIG. 32 illustrates details of an embodiment of a Lucid battery connection to a non-intelligent battery dock/shoe with a data format converter.

FIG. 32 illustrates an alternate embodiment 3200 of a three wire connection 3265 between a non-intelligent shoe 3160 having a portable intelligent battery 3050 connected to it. In this case, a serial interface module 3270, which is a protocol converter configured to convert battery data in a format such as the "Lucid" battery format described in U.S. patent application Ser. No. 13/532,721, entitled MODULAR BATTERY PACK APPARATUS, SYSTEMS, AND METHODS, filed Jun. 25, 2012, and U.S. Patent Application Ser. No. 61/663,617, entitled MODULAR BATTERY PACK APPARATUS, SYSTEMS, AND METHODS, INCLUDING VIRAL DATA AND/OR CODE TRANSFER, filed Jun.

25, 2012, to a format compatible with a standard input of the wireless transceiver, such as an I²C, SPI, CAN, or other serial or parallel interface. In this case, battery data is transferred from connection 3153, along with DC power via connections 3261 to the optional slip-ring connection 3267, which may correspond with slip ring 3167 of FIG. 30 (or data may be transferred directly to a device 3380, such as a camera or transceiver and/or other connected devices if no slip-ring is used). Converter 3270 may be placed on the other side of slip-ring connector 3167 in alternate embodiments.

Power may be passed directly through the converter 3270 and/or may be modified and provided via power connection 3261. The other half of the slip ring connector 3267 may provide further connections of power and data to an intelligent (e.g., Lucid compatible device) 3280, which may be a compatible wireless node such as transceiver 3030, and/or other components such as camera or other electronics or powered elements (not shown). Slip-ring connector 3267 may be a three conductor connector in an exemplary embodiment, but other connector types and configurations with different numbers of conductors may be used in various embodiments.

Figure 33:
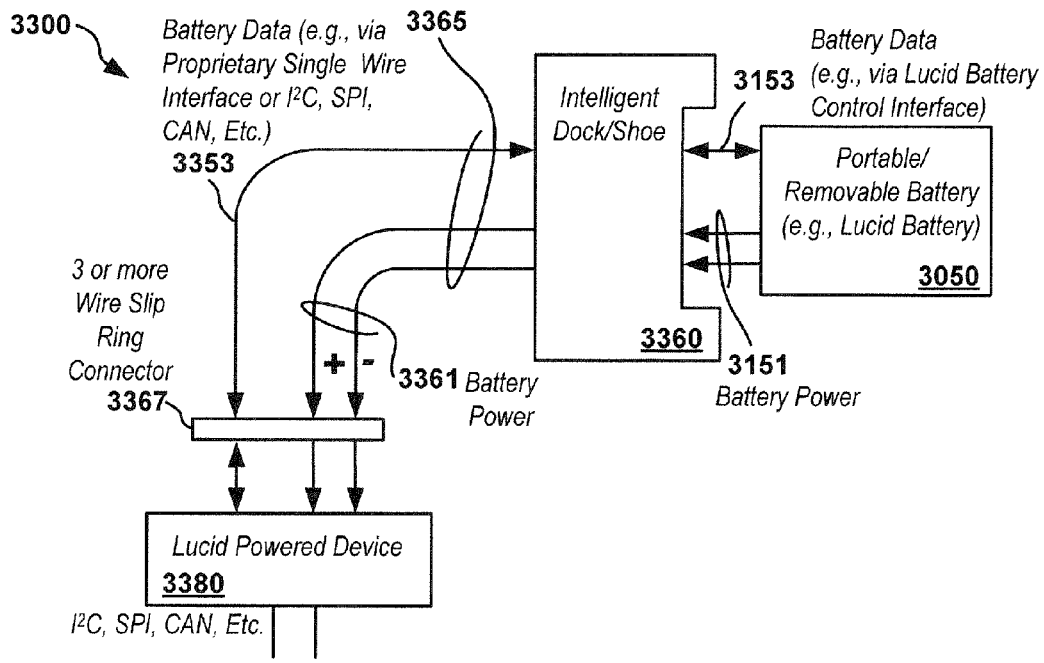
FIG. 33 illustrates details of an embodiment of a Lucid battery connection to an intelligent battery dock/shoe with Lucid battery data output.

FIG. 33 illustrates another embodiment 3300 of a three wire connection 3365 between an intelligent shoe 3360 having a portable intelligent battery 3050 connected to it. This configuration is similar to that of FIG. 31, except that the shoe 3360 is an intelligent shoe and is capable of providing additional functionality, such as described in U.S. patent application Ser. No. 13/532,721, entitled MODULAR BATTERY PACK APPARATUS, SYSTEMS, AND METHODS, filed Jun. 25, 2012, and U.S. Patent Application Ser. No. 61/663,617, entitled MODULAR BATTERY PACK APPARATUS, SYSTEMS, AND METHODS, INCLUDING VIRAL DATA AND/OR CODE TRANSFER, filed Jun. 25, 2012, over that of a non-intelligent or "dumb shoe." In this case, battery data is provide to the shoe 3360 through battery connection (e.g., contacts on battery and shoe) 3153. Data may then be provided via connection 3353 from the shoe, along with DC power via connections 3151 and 3361 to the optional slip-ring connection 3367 (or directly to a transceiver and/or other connected devices if no slip ring is used). The other half of the slip ring connector 3367 may provide further connections of power and data to an intelligent (e.g., Lucid compatible device) 3380, which may be a compatible wireless node such as transceiver 3030, and/or other components such as camera or other electronics or powered elements (not shown). Slip-ring connector 3367 may be a three conductor connector in an exemplary embodiment, but other connector types and configurations with different numbers of conductors may be used in various embodiments.

Figure 34:
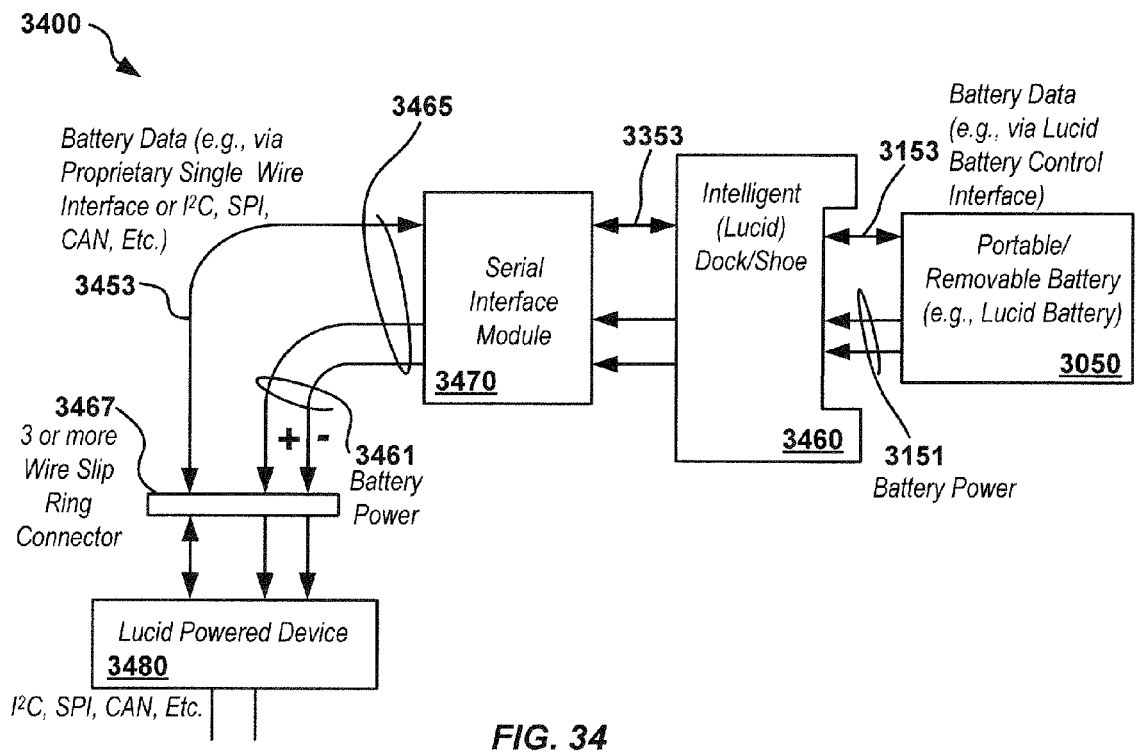
FIG. 34 illustrates details of an embodiment of a Lucid battery connection to an intelligent battery dock/shoe with a data format converter.

FIG. 34 illustrates yet another alternate embodiment 3400 of a three wire connection 3465 between an intelligent shoe 3460 (which may be same as shoe 3360) having a portable intelligent battery 3050 connected to it. In this case, a serial interface module 3470, which is a protocol converter configured to convert battery data in a format such as the "Lucid" battery format described in U.S. patent application Ser. No. 13/532,721, entitled MODULAR BATTERY PACK APPARATUS, SYSTEMS, AND METHODS, filed Jun. 25, 2012, and U.S. Patent Application Ser. No. 61/663,617, entitled MODULAR BATTERY PACK APPARATUS, SYSTEMS, AND METHODS, INCLUDING VIRAL DATA AND/OR CODE TRANSFER, filed Jun. 25, 2012, to a format compatible with a standard input of the wireless transceiver, such as an I²C, SPI, CAN, or other serial or parallel interface. In this case, battery data is transferred from connection 3453, along with DC power via connections 3461 to the optional slip-ring connection 3467, which may correspond with slip ring 3167 of FIG. 30 (or data may be transferred directly to a transceiver and/or other connected devices if no slip-ring is used). Converter 3470 may be placed on the other side of slip-ring connector 3467 in alternate embodiments.

Power may be passed directly through the converter 3470 and/or may be modified and provided via power connection 3461. The other half of the slip ring connector 3467 may provide further connections of power and data to an intelligent (e.g., Lucid compatible device) 3480, which may be a compatible wireless node such as transceiver 3030, and/or other components such as camera or other electronics or powered elements (not shown). Slip-ring connector 3467 may be a three conductor connector in an exemplary embodiment, but other connector types and configurations with different numbers of conductors may be used in various embodiments.

Battery data may be transferred from connection 3153 to connection 3353 to converter 3470, and then provided via connection 3453 to the slip ring and device 3480 (e.g., transceiver, camera, etc.).

Some embodiments have been described as providing a wireless hotspot or other suitable network node at the cable storage drum to which one or more external computers connect, therefore, it is contemplated that such a network node be provided (i.e., hosted) at one or more of the external computers, and that the cable storage drum (or inspection device) may connect to that node to carry out any number of the functions described herein.

In addition to the previously described embodiments of the wheeled pipe inspection system and corresponding components and elements, modifications and adaptations thereof will be apparent to persons skilled in the art.

Various other changes, additions, and/or alterations may be used in various embodiments. Other configurations for stowing a pull-handle may also be used in addition to or in place of the stowage element embodiments described herein.

In some configurations, the mechanism, elements, apparatus, or systems described herein may include means for implementing features or providing functions described herein. In one aspect, the aforementioned means may be a mechanism for attaching various accessories and components to a pipe inspection system.

The various illustrative functions and circuits described in connection with the embodiments disclosed herein with respect to wireless transmitters, receivers, battery monitoring functions, video and data transmission and signal processing, and/or other power supply, electronics, or signal processing functions may be implemented or performed in one or more processing elements including a general purpose processor, a digital signal processor (DSP), an application specific integrated circuit (ASIC), a field programmable gate array (FPGA) or other programmable logic device, discrete gate or transistor logic, discrete hardware components, memory devices, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, memory devices, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the scope of the present disclosure is not intended to be limited to the embodiments shown herein but is to be accorded the widest scope consistent with the principles and novel aspects and features disclosed herein.

The presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with appended Claims and their equivalents.

We claim:

1. An intelligent cable storage drum system for use in a pipe inspection system, comprising:
   a cable storage drum;
   a video push-cable disposed on the cable storage drum having a proximal end and a distal end for coupling to a camera; and
   a transceiver module operatively coupled to an output at the distal end of the camera for providing camera output signals to the transceiver module.

2. The system of claim 1, wherein the transceiver module is a wireless transceiver module.

3. The system of claim 1, wherein the transceiver module is a wired transceiver module.

4. The system of claim 1, further comprising a user control interface.

5. The system of claim 1, further comprising a video display for rendering output images or video from the camera.

6. The system of claim 1, wherein the transceiver module is configured to establish a two-way communication channel between the camera and one or more remote computing devices associated with the pipe inspection system for bidirectional transfer of data.

7. The system of claim 6, wherein the data comprises an audio or video data containing information pertaining to the cable storage drum, the pipe inspection system, or a power supply system associated therewith.

8. The system of claim 1, wherein the cable storage drum includes a processing element, and a non-transitory memory device coupled to the processing system for storing data.

9. The system of claim 6, wherein the data transferred from the camera to the one or more remote computing devices is rendered on a user interface of the one or more remote computing devices via a web browser or a software application installed thereon.

10. The system of claim 1, wherein the camera associated with the pipe inspection system is remotely controllable by a user via the user interface of the one or more remote computing devices.

11. The system of claim 1, further comprising an intelligent power supply system.

12. The system of claim 11, wherein the intelligent power supply system includes an intelligent battery shoe and an intelligent battery coupled to the battery shoe, wherein data from the intelligent battery is communicated to the transceiver module through the battery shoe.

13. The system of claim 12, wherein the intelligent battery shoe includes an electrical connection or an optical connection to the transceiver module.

14. The system of claim 1, further comprising an outer housing assembly configured to contain the cable storage drum.

15. The system of claim 1, wherein the outer housing assembly includes a plurality of vents.

16. The system of claim 14, further comprising a detachable wheel assembly configured to be removably attached to the outer housing assembly.

17. The system of claim 16, wherein the wheel assembly includes an axle, one or more axle caps disposed around the axle and a plurality of wheels coupled to the axle.

18. The system of claim 17, wherein the wheel assembly further includes one or more retaining plates and an attachment hardware to couple the axle caps and the retaining plates through the outer housing assembly.

19. The system of claim 18, wherein the attachment hardware couples the axle caps and the retaining plates through one or more vents in the outer housing assembly.

20. The system of claim 1, further comprising a pull-handle assembly including a detachable pull-handle and a handle accessory mount for removably attaching the pull-handle to an outer housing assembly of the pipe inspection system.

* * * * *

UNITED STATES PATENT AND TRADEMARK OFFICE
CERTIFICATE OF CORRECTION

PATENT NO. : 9,924,139 B2
APPLICATION NO. : 14/961754
DATED : March 20, 2018
INVENTOR(S) : Mark S. Olsson, James F. Kleyn and Michael E. Turgeon It is certified that error appears in the above-identified patent and that said Letters Patent is hereby corrected as shown below:

On the Title Page

Related U.S. Application Data should read as follows:
(60) Provisional application No. 61/654,713, filed on June 1, 2012, provisional application No. 61/559,107, filed on Nov. 13, 2011.

Signed and Sealed this
First Day of December, 2020

Andrei Iancu
*Director of the United States Patent and Trademark Office*